US011882222B2

(12) United States Patent
Ubbens et al.

(10) Patent No.: US 11,882,222 B2
(45) Date of Patent: Jan. 23, 2024

(54) MULTIDIRECTIONAL SYNCHRONIZATION OF CONFIDENTIAL DATA USING DISTRIBUTED LEDGERS

(71) Applicant: The Toronto-Dominion Bank, Toronto (CA)

(72) Inventors: Timothy Willem Ubbens, Toronto (CA); Arthur Carroll Chow, Markham (CA); Sidharth Kumar Varma, Burlington (CA); James Thomas Hensley, Whitby (CA); Alexey Shpurov, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 482 days.

(21) Appl. No.: 17/032,175

(22) Filed: Sep. 25, 2020

(65) Prior Publication Data
US 2022/0029822 A1    Jan. 27, 2022

Related U.S. Application Data

(60) Provisional application No. 63/055,600, filed on Jul. 23, 2020.

(51) Int. Cl.
*H04L 9/40*  (2022.01)
*H04L 9/32*  (2006.01)
(Continued)

(52) U.S. Cl.
CPC ............ *H04L 9/3247* (2013.01); *G06F 16/27* (2019.01); *G06F 21/602* (2013.01)

(58) Field of Classification Search
CPC ....... H04L 9/3247; G06F 16/27; G06F 21/602
See application file for complete search history.

(56) References Cited

U.S. PATENT DOCUMENTS

| 10,250,394 B1 | 4/2019 | Borne-Pons et al. |
| 10,318,938 B2 | 6/2019 | Jonhsrud et al. |
| (Continued) | | |

FOREIGN PATENT DOCUMENTS

| WO | WO2019120493 | 6/2019 |
| WO | WO2019140464 | 7/2019 |

*Primary Examiner* — Ghodrat Jamshidi
(74) *Attorney, Agent, or Firm* — Duane Morris LLP

(57) ABSTRACT

The disclosed embodiments include computer-implemented processes that, using a distributed notarized ledger, constrain an ability of multiple parties to simultaneously, or near simultaneously, update or modify elements of reference data maintained within a centralized data store. For example, an apparatus may receive, from a first computing system, a request to modify reference data maintained at a second computing system. The apparatus may approve the first requested modification to the reference data based on a notarization criterion maintained within an element of a notarized distributed ledger, and perform operations that record notarization data characterizing the approved modification within an additional element of the notarized distributed ledger. The apparatus may also transmit the notarization data to the first computing system, and the notarization data causing an application program executed by the first computing system to modify local reference data in accordance with the notarization data.

20 Claims, 15 Drawing Sheets

(51) Int. Cl.
*G06F 21/60* (2013.01)
*G06F 16/27* (2019.01)

(56) References Cited

U.S. PATENT DOCUMENTS

| | | | |
|---|---|---|---|
| 10,320,843 B1 | 6/2019 | Dobrek et al. | |
| 10,325,079 B1 | 6/2019 | Vukich et al. | |
| 10,346,406 B2 | 7/2019 | Booz et al. | |
| 10,409,783 B1 | 9/2019 | Miller et al. | |
| 10,445,698 B2 | 10/2019 | Hunn et al. | |
| 10,664,451 B1* | 5/2020 | Liao | G06F 16/1824 |
| 10,902,014 B1* | 1/2021 | Adogla | G06F 16/27 |
| 11,010,370 B2* | 5/2021 | Manamohan | G07C 13/00 |
| 2002/0016912 A1* | 2/2002 | Johnson | H04L 63/062 |
| | | | 713/165 |
| 2013/0262383 A1* | 10/2013 | Maeda | G06F 11/2094 |
| | | | 707/634 |
| 2014/0136838 A1* | 5/2014 | Mossbarger | H04L 63/0823 |
| | | | 713/156 |
| 2015/0007274 A1 | 1/2015 | Chang et al. | |
| 2016/0300234 A1 | 10/2016 | Moss-Pultz et al. | |
| 2016/0335533 A1 | 11/2016 | Davis et al. | |
| 2016/0342977 A1 | 11/2016 | Lam | |
| 2017/0213209 A1* | 7/2017 | Dillenberger | G06Q 20/3829 |
| 2017/0301047 A1 | 10/2017 | Brown et al. | |
| 2017/0352012 A1* | 12/2017 | Hearn | H04L 9/3239 |
| 2017/0352116 A1 | 12/2017 | Pierce et al. | |
| 2018/0039667 A1 | 2/2018 | Pierce et al. | |
| 2018/0225356 A1* | 8/2018 | Yue | G06F 16/2379 |
| 2018/0260125 A1 | 9/2018 | Botes et al. | |
| 2018/0268401 A1 | 9/2018 | Ortiz et al. | |
| 2019/0058595 A1 | 2/2019 | Hamasni et al. | |
| 2019/0098015 A1 | 3/2019 | Hookham-Miller | |
| 2019/0104196 A1 | 4/2019 | Li et al. | |
| 2019/0108482 A1 | 4/2019 | Vikas et al. | |
| 2019/0147190 A1 | 5/2019 | Marin | |
| 2019/0163887 A1 | 5/2019 | Frederick et al. | |
| 2019/0166117 A1 | 5/2019 | Kumar et al. | |
| 2019/0188706 A1 | 6/2019 | McCurtis | |
| 2019/0207957 A1 | 7/2019 | Espinosa et al. | |
| 2019/0220324 A1 | 7/2019 | Carver et al. | |
| 2019/0235946 A1* | 8/2019 | Guo | H04L 63/123 |
| 2019/0238316 A1 | 8/2019 | Padmanabhan | |
| 2019/0253240 A1 | 8/2019 | Treat et al. | |
| 2019/0272591 A1 | 9/2019 | Leonard et al. | |
| 2019/0288868 A1 | 9/2019 | Chow et al. | |
| 2020/0053213 A1* | 2/2020 | Kats | H04M 1/2757 |
| 2020/0320094 A1* | 10/2020 | Ouyang | G06F 16/256 |
| 2021/0067739 A1* | 3/2021 | Meganathan | H04N 7/18 |
| 2021/0078512 A1* | 3/2021 | Ghannam | H04W 4/40 |
| 2021/0184841 A1* | 6/2021 | Shpurov | H04L 9/3265 |
| 2021/0203635 A1* | 7/2021 | Shalikashvili | H04L 63/0263 |
| 2021/0258442 A1* | 8/2021 | Yoshimura | H04N 1/00938 |
| 2021/0328770 A1* | 10/2021 | Gaur | H04L 9/3273 |
| 2022/0029822 A1* | 1/2022 | Ubbens | H04L 9/3247 |
| 2022/0123945 A1* | 4/2022 | Yang | H04L 9/3247 |
| 2022/0143511 A1* | 5/2022 | Na | A63F 13/69 |

* cited by examiner

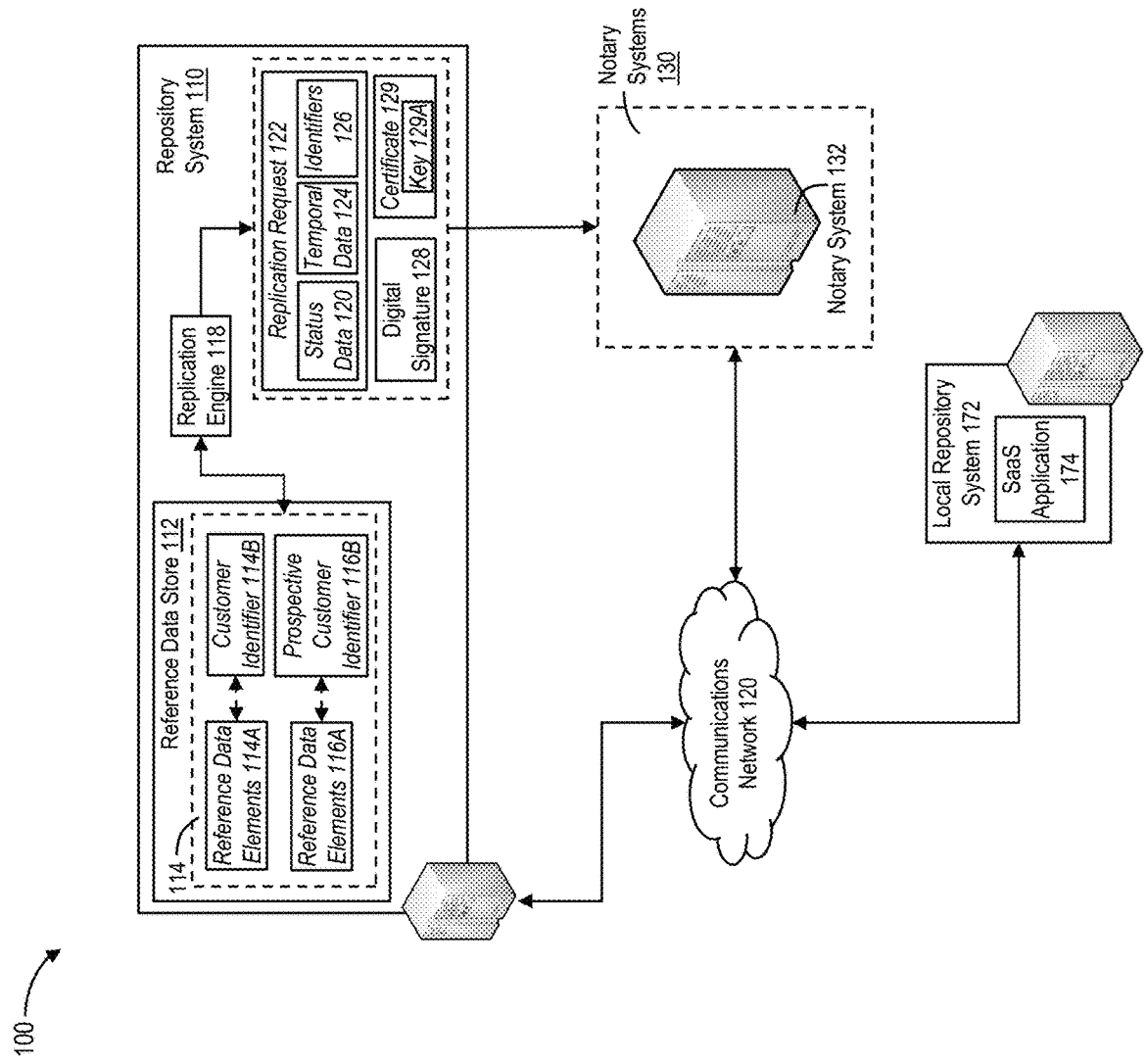

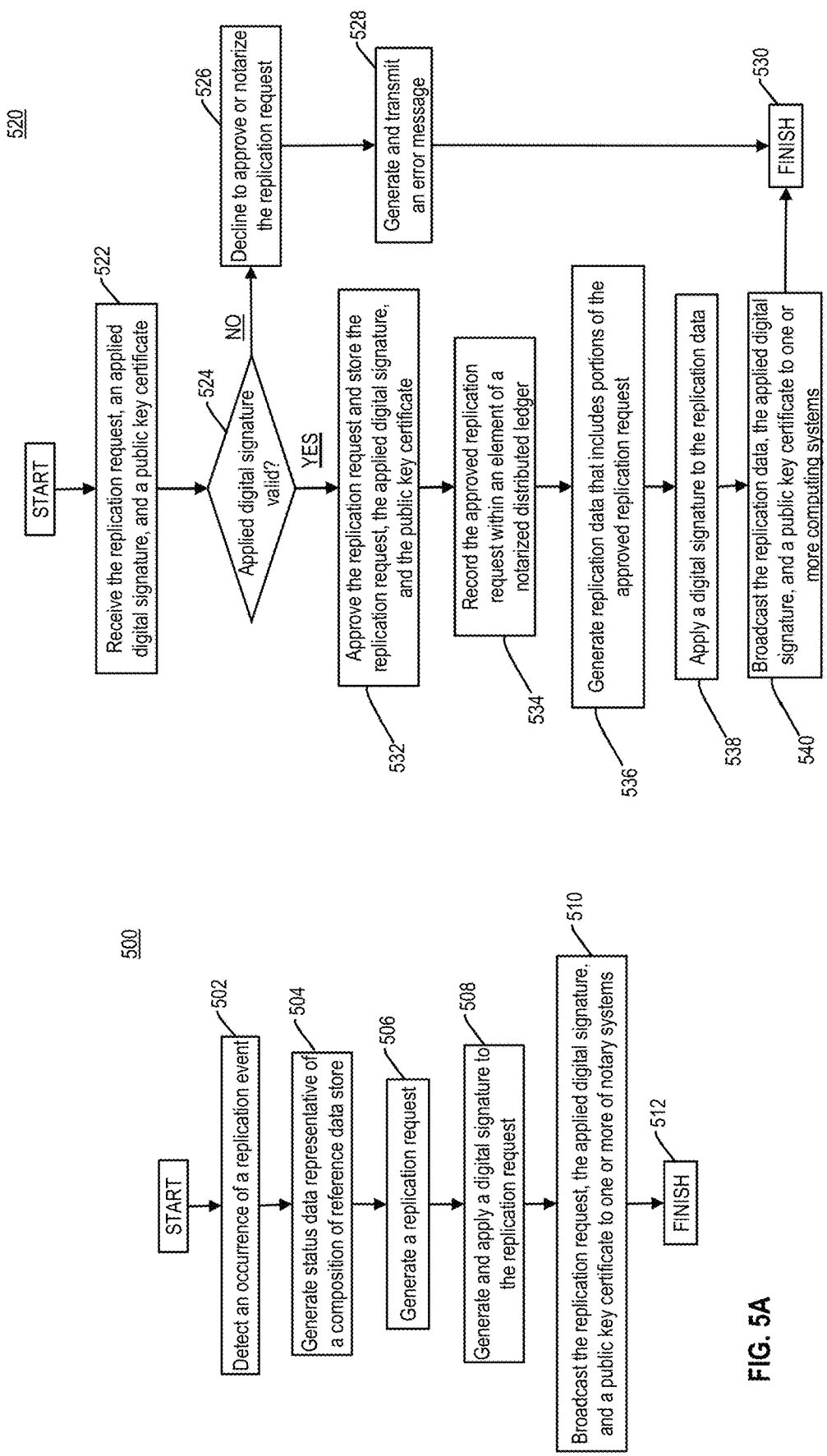

MULTIDIRECTIONAL SYNCHRONIZATION OF CONFIDENTIAL DATA USING DISTRIBUTED LEDGERS

CROSS-REFERENCE TO RELATED APPLICATION

This application claims the benefit of priority under 35 U.S.C. § 119(e) to prior U.S. Application No. 63/055,600, filed Jul. 23, 2020, the disclosure of which is incorporated by reference herein to its entirety.

TECHNICAL FIELD

The disclosed embodiments generally relate to computer-implemented systems and processes that facilitate a multidirectional synchronization of confidential data across computing systems using distributed ledgers.

BACKGROUND

Software-as-a-service (SaaS) represents a widely adopted model for provisioning software and applications on demand to a variety of corporate and institutional customers. Indeed, an increasing prevalence and availability of cloud-based computing resources, coupled with a standardization of the Hypertext Transfer Protocol Secure (HTTPS) protocol within the web stack and an availability of lightweight integration protocols, such as REST and SOAP, facilitate the adoption and integration of SaaS applications across many large organizations and enterprises. Further, these SaaS applications often establish, and operate on, local replicas of elements of reference data maintained within centralized repositories of these organizations and enterprises.

SUMMARY

In some examples, an apparatus includes a memory storing instructions, a communications interface, and at least one processor coupled to the communications interface and the memory. The at least one processor is configured to execute the instructions to receive, from a first computing system via the communications interface, a first request to modify reference data maintained at a second computing system. The at least one processor is further configured to execute the instructions to approve the first requested modification to the reference data based on a notarization criterion maintained within an element of a distributed ledger, and perform operations that record notarization data characterizing the approved modification within an additional element of the distributed ledger. Further, the at least one processor is also configured to execute the instructions to transmit the notarization data to the first computing system via the communications interface. The notarization data causes an application program executed by the first computing system to modify local reference data in accordance with the notarization data.

In other examples, a computer-implemented method includes receiving, using at least one processor, a request from a first computing system to modify reference data, the reference data being maintained at a second computing system. The computer-implemented method also includes, using the at least one processor, approving the requested modification to the reference data based on a notarization criterion maintained within an element of a distributed ledger, and perform operations that record notarization data characterizing the approved modification within an additional element of the distributed ledger. Further, the computer-implemented method includes transmitting, using the at least one processor, the notarization data to the first computing system. The notarization data causes an application program executed by the first computing system to modify local reference data in accordance with the notarization data.

Further, in some examples, an apparatus includes a memory storing instructions, a communications interface, and at least one processor coupled to the communications interface and the memory. The at least one processor is configured to execute the instructions to transmit, via the communications interface, a request to modify an element of local reference data to a first computing system. The first computing system performs operations that approve the requested modification based on a notarization criterion maintained within an element of a first distributed ledger, and that record notarization data characterizing the approved modification within an additional element of the first distributed ledger. The at least one processor is further configured to execute the instructions to receive the notarization data from the first computing system via the communications interface, and to modify a portion of the local reference data in accordance with the notarization data.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1A, 1B, 1C, 2A, 2B, 2C, 2D, 3A, 3B, 4A, and 4B are block diagrams illustrating portions of an exemplary computing environment, in accordance with some exemplary embodiments.

FIGS. 5A, 5B, and 5C are flowcharts of exemplary processes for replicating elements of reference data using notarized distributed ledgers, in accordance with some exemplary embodiments.

Like reference numbers and designations in the various drawings indicate like elements.

DETAILED DESCRIPTION

Figure 1B:
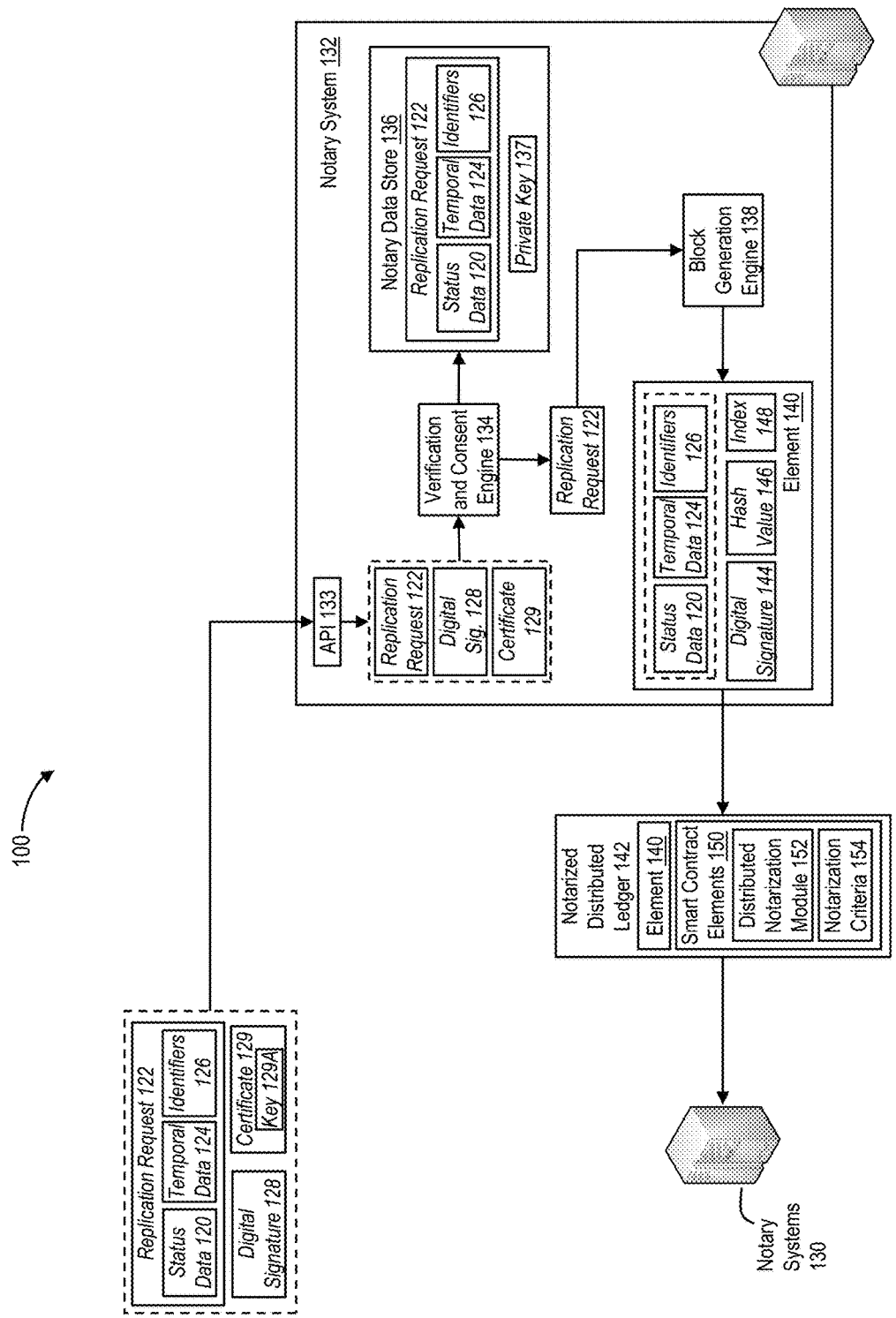

This specification relates to computer-implemented processes that, among other things, establish and maintain a notarized, distributed electronic ledger that records, within one or more data elements, a snapshot of a "current" state of a reference data store of an enterprise. The one or more data elements of the notarized, distributed electronic ledger may also record elements of code that, when executed by one or more network-connected notary computing systems, enable the one or more notary computing systems to perform consensus-based notarization processes that constrain an ability of multiple parties to simultaneously, or near simultaneously, update or modify elements of reference data maintained within the reference data store. Further, and based on a successful application of these notarization processes to a proposed modification to the reference data, the one or more notary computing systems may perform additional consensus-based processes that record a representation of the modified reference data within an additional data element of the notarized, distributed electronic ledger, and that provision the updated reference data not only to a computing system that maintains the reference data store, but also to one or more additional computing systems within the enterprise, which may execute application programs that access or operate on portions of a local replica of that reference data.

For example, the reference data store may be maintained by a computing system associated with, or operated by, a financial institution (e.g., as a computing system of record), and the reference data store may correspond to a relational data store or electronic database that maintains elements of reference data characterizing one or more customers of the financial institution and interactions between these customers and the financial institution. The executed application programs that access or process the reference data may include, but are not limited to, a Software-as-a-Service (SaaS) application that, upon execution, causes the additional computing systems to establish a local replica of one or more of elements of the reference data maintained by the computing system of record. In some instances, the executed SaaS application may also perform operations that generate, and transmit, a proposal to modify one or more of the locally replicated elements of reference data (e.g., based on a request received from a corresponding customer device), and that transmit the proposal to the computing system of record in real-time (e.g., via a synchronous API call) or in batched form with additional, or alternate, batched proposals during a corresponding temporal interval.

In some instances, the computing system of record may receive the proposal from the executed SaaS application, and may perform operations that approve, or reject, the proposal based on an application of one or more approval criteria associated with the reference data store. For example, the computing system of record may perform operations that parse the proposal update to identify an impacted element of reference data, based on an analysis of one or more previously proposed and approved modifications, the computing system of record may determine that the proposal is associated with an element of reference data unrelated to the one or more previously proposed approved updates. As such, the computing system of record may establish that the proposal corresponds to, or in involved in, a unilateral update to the elements of reference data maintained within the reference data store, and as such, may approve the proposal and implemented the associated modification within the reference data store.

Through performance of certain of these processes, the computing system of record may receive, mediate, and implement unilateral updates to one or more elements of reference data maintained within the relational data store, such as those generated by an application program executed at an additional, network-connected computing system (e.g., the executed SaaS application described herein) or by an application program executed at a customer device. In some instances, although effective at resolving unilateral updates, certain of these processes may be ineffective at, or incapable of, resolving bilateral updates to a particular element of reference data maintained within the reference data store.

By way of example, a bilateral update may involve a plurality of distinct, proposed modifications, additions, or updates to a particular element of reference data maintained within the reference data store by the computing system of record during a corresponding temporal interval. For instance, a bilateral update to a customer telephone number maintained within the reference data store may include, but is not limited to, a first proposed update to the customer telephone number received from an application program (e.g., a web browser, a mobile application, etc.) executed at the customer device, and a second, and different, proposed update to the customer telephone number received from the executed SaaS application, each of which may be received within a particular temporal interval. When faced with a bilateral update involving contemporaneously received modifications, updates, or additional to a common element of reference data, certain of these processes may be incapable of resolving potential conflicts between the contemporaneous updates (e.g., to prevent multiple entities or individuals updating the same element of reference data) and may be incapable of generating an accurate replica of the reference data maintained in the reference data store by the computing system of record at any given time, while maintaining an ability to reliably propose changes to the reference data store.

Certain of the exemplary processes described herein, which establish and maintain a notarized, distributed electronic ledger that records a snapshot of a "current" state of a reference data store, and which enable one or more notary computing systems to perform consensus-based notarization processes that constrain an ability of multiple parties to simultaneously, or near simultaneously, modify or update elements of reference data maintained within the reference data store, may be implemented in addition to, or as an alternate to, the processes described herein for resolving unilateral updates to the reference data store. In some examples, the cryptographically secure and immutable character of the notarized distributed ledger may establish an accurate and reliable replica of reference data maintained at the system and record, which may be provisioned to one or more additional, network-computing systems and corresponding executed application programs, such as the executed SaaS application described herein, and may establish an auditable record of a temporal evolution of each modification or update to the reference data maintained at the system of record.

Figure 1C:
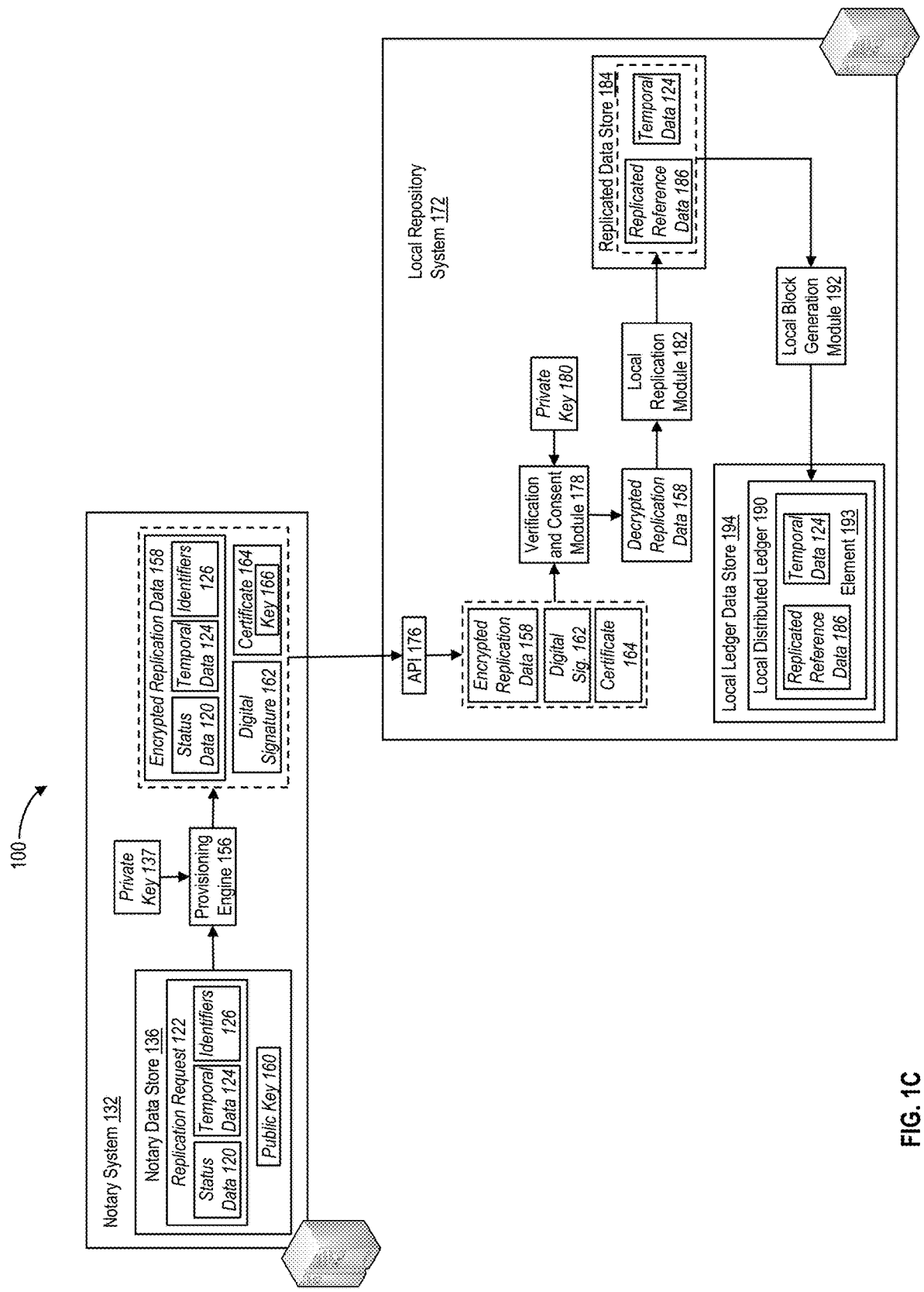

Further, through implementation of one or more of the exemplary, consensus-based notarization processes by the one or more notary computing systems, an executed application program, such as the SaaS application described herein, may generate and transmit, to the computing system of record, a proposed modification the elements of reference data maintained within the reference data store without triggering a response to, or an immediate update of those elements of reference data locally replicated by the executed SaaS application. Certain of these exemplary consensus-based notarization processes, which condition a modification to reference data maintained within the reference data store and to reference data locally replicated within replicated data stores on a successful notarization of that modification by the one or more notary computing systems, may be implemented in addition to, or as an alternate to, the unilateral update processes described herein, through which the computing system of record generates a discrete and corresponding response to each received, and approved, modification to the reference data store.

a. Exemplary Computer-Implemented Processes for Replicating Reference Data Using Notarized Distributed Ledgers FIGS. 1A, 1B, and 1C illustrate components of an exemplary computing environment 100. For example, as illustrated in FIG. 1A, environment 100 may include a repository system 110, one or more notary systems 130, such as, but not limited to, notary system 132, and a local repository system 172, each of which may be interconnected through one or more communications networks, such as communications network 102. Examples of communications network 102 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of repository system 110, notary systems 130 (including notary system 132), and local repository system 172 (may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. Each of repository system 110, notary systems 130 (including notary system 132), and local repository system 172 may also include a communications interface, such as one or more wireless transceivers, coupled to the one or more processors for accommodating wired or wireless internet communication with other computing systems and devices operating within environment 100.

In some instances, repository system 110, notary systems 130 (including notary system 132), and local repository system 172 may each be incorporated into a respective, discrete computing system, although in other instances, one or more of repository system 110, notary systems 130 (including notary system 132), and local repository system 172 may correspond to a distributed computing system having multiple computing components distributed across an appropriate computing network. For example, repository system 110 may be implemented as a distributed system, and may include computing components distributed across communications network 102, such as those described herein, or those provided or maintained by cloud-service providers (e.g., Google Cloud™, Microsoft Azure™, etc.). The disclosed embodiments are, however, not limited to these exemplary distributed systems, and in other instances, one or more of repository system 110, notary systems 130 (including notary system 132), and local repository system 172 may include computing components disposed within any additional or alternate number or type of computing systems or across any appropriate network.

Repository system 110 may be associated with, or operated by a financial institution, and repository system 110 may maintain, within the one or more tangible, non-transitory memories, a reference data store 112 that includes elements 114 of reference data characterizing one or more customers of the financial institution and interactions between these customers and the financial institution. For example, reference data store 112 may correspond to a relational data store or electronic database, and the elements of reference data may include, but are not limited to: (i) elements of customer profile data identifying and characterizing the customers (e.g., a customer name, customer address, a customer phone number, a customer email address, demographic data, etc.); (ii) elements of customer account data identifying one or more financial services accounts or financial products issued to the customers by the financial institution; and/or (iii) elements of transactional data identifying and characterizing one or more transactions involving the issued financial services accounts or financial products. In other examples, the elements of reference data may also include interaction data that characterizes one or more interactions between the customers and the financial institution, such as, but not limited to, data establishing a "do not call" list of customers that elect not to receive telemarketing calls from representatives of the financial institution.

In some instances, reference data store 112 may maintain each of reference data elements 114 in conjunction with, or association with, an identifier of a corresponding one of the customers. For example, as illustrated in FIG. 1A, elements 114A of the reference data may be associated with a particular customer of the financial institution, and reference data store 112 may store elements 114A in conjunction with, or in association with, a customer identifier 114B. For example, customer identifier 114B may include, but is not limited to, a unique alphanumeric identifier assigned to the corresponding customer by the financial institution (e.g., a login credential), a network address of a device operated by the corresponding customer (e.g., an IP or a MAC address), or an element of cryptographic data associated an application program executed at the device operated by the corresponding customer (e.g., a cryptogram associated with an executed mobile banking application, etc.).

Customer identifier 114B may also include a unique, digital identifier associated to the corresponding customer by the financial institution, e.g., upon registration within one or more digital portals or web pages maintained by computing systems of the financial institution, such as repository system 110. Examples of the digital identifier may include, but are not limited to, a cryptogram, token, random number, or other element of cryptographic data, and in some instances, the digital identifier may represent a federated credential that enables the corresponding customer to access one or more additional, or alternate, computing systems associated with or operated by the financial institution, either on an individual basis (e.g., through a corresponding digital portal or web page) or collectively through one or more single sign-on (SSO) protocols. The disclosed embodiments are, however, not limited to these exemplary customer identifiers, and other examples, customer identifier 114B may include any additional, or alternate, element of data that uniquely identifies the corresponding customer and is appropriate to reference data store 112 and to repository system 110, including combinations of the exemplary customers described herein.

In other examples, one or more of reference data elements 114 may identify and characterize not only one or more existing customers of the financial institution, but also one or more prospective customers of the financial institution and the interactions of the prospective customers with the financial institution. For instance, a prospective customer of the financial institution may elect to apply electronically for a mortgage or other financial product offered by the financial institution, and may provide input to a corresponding device (e.g., via an input unit) that triggers an execution of a web browser (not illustrated in FIG. 1A). The prospective customer may also provide, via the input unit, one or more login credentials to the executed web browser, which may authenticate an identity of the prospective customer and enable the prospective customer to "log" into the executed web browser (also not illustrated in FIG. 1A). Based on a successful authentication of the identity of the prospective customer, the executed web browser may establish an authenticated browser session, and may perform operations (e.g., via JavaScript™, etc.) that generate a public key fingerprint, such as a PKI fingerprint, associated with a public cryptographic key of the authenticated prospective customer, the now-authenticated browser session, or the executed web browser, e.g., based on one or more hash-based operations on the public cryptographic key (not illustrated in FIG. 1A).

Through the authenticated browser session, the prospective customer may access a web page associated with an electronic application for the mortgage or other financial product, and may provide an initial portion of application data associated with the electronic application an input to the accessed web page (e.g., via an input unit of the corresponding device). The prospective customer may, however, elect to defer a completion of the electronic application until a later date, and the executed web browser may perform operations that cause the corresponding device to transmit the PKI fingerprint and the initial portion of the application data to one or more computing systems of the financial institution, such as, but not limited to, repository system 110 (also not illustrated in FIG. 1A). For example, repository system 110 may receive the PKI fingerprint and the initial portion of the application data (e.g. one or more computing systems of the financial institution), and may perform operations that package the initial portion of the application data within reference data elements 116A, and that package the PKI fingerprint within prospective customer identifier 116B.

As illustrated in FIG. 1A, repository system 110 may store reference data elements 116A within a corresponding portion of reference data store 112, e.g., in conjunction with or in association with prospective customer identifier 116B, which includes the PKI fingerprint. In some examples, the PKI fingerprint may uniquely identify the prospective customer to the financial institution, and represent a unique, browser-specific and device-specific identifier of the prospective customer, and further, may represent a proof-of-possession on a single device, e.g., the corresponding device operated by the prospective customer.

The disclosed embodiments are, however, not limited to prospective customer identifiers, such as prospective customer identifier 1166, that uniquely identify a prospective customer of the financial institution based on a browser- or device-specific PKI fingerprint, and in additional, or alternate, instances, prospective customer identifier 116B may also uniquely identify the prospective customer based on attribute data characterizing the potential customer's interaction with a communications network. Examples of the elements of attribute data include, but are not limited to, an IP address, one or more digital cookies, a device address, or other PKI fingerprints (e.g., of different web browsers). The association between the prospective customer, the PKI fingerprint, and the elements of attribute data may enable the one or more computing systems of the financial institution, such as repository system 110, to associate together elements of data associated with the prospective customer, but received from different computing devices (e.g., interacting with a single network access point).

In other instances, prospective customer identifier 116B may identify the prospective customer based on a unique, cryptographic identifier of the prospective customer across multiple web browsers (or other application programs) executed at the corresponding device or at other device operated by the prospective customer. For example, the PKI fingerprint (e.g., associated with the corresponding public cryptographic key associated with the executed web browser) may represent a browser-specific, proof-of-possession for the prospective customer. In some instances, to facilitate an identification of the prospective customer across multiple web browsers executed by the corresponding device, prospective customer identifier 1166 may include a split portion of the public cryptographic key associated with the prospective customer, which may be generated through an application of one or more key splitting algorithms to the public cryptographic key associated with executed web browser (e.g., by the one or more computing systems of the financial institution, including repository system 110, or by the corresponding device). The split portion of the public cryptographic key may, for example, be shared among each of the web browsers executed at the corresponding device, and may uniquely identify the prospective customer across the multiple web browsers.

The disclosed embodiments are, however, not limited to these exemplary elements of reference data and associated customer identifiers. In other instances, reference data store 112 may maintain any additional, or alternate, elements of reference data that identify or characterize past, current, and prospective customers of the financial institution and additionally, or alternatively, interactions between the financial institution and one or more of the past, current, and prospective customers. Further, and as described herein, each of the elements of reference data may be associated with, linked to, or stored in conjunction with a customer identifier that unique identifies each of the corresponding past, current, and prospective customers and is appropriate to a prior, current, or prospective relationship between the financial institution and the corresponding past, current, and prospective customer, such as, but not limited to, the exemplary customer identifiers described herein.

Referring back to FIG. 1A, and as described herein, repository system 110 may also maintain, within the one or more tangible, non-transitory memories, one or more elements of executable code executable application programs, or application modules, such as executable replication engine 118. In some instances, when executed by the one or more processors of repository system 110, replication engine 118 may perform operations that, in response to a detected occurrence of a replication event, parse reference data store 112 and generate one or more elements of status data 120 representative of a composition of reference data store 112 during a particular temporal interval, e.g., a "snapshot" of the composition of reference data store 112 during a current temporal interval. As described herein, status data 120 may include all, or a selected portion of the elements of reference data and associated customer identifiers maintained within reference data store 112 (e.g., reference data elements 114A and customer identifier 114B, reference data element 116A and customer identifier 116B, etc.). Additionally, or alternatively, status data 120 may also include a hash value representative of all, or a selected portion, of the reference data elements and associated customer identifiers maintained within reference data store 112, which may be computed by executed replication engine 118 through an application of a cryptographic or non-cryptographic hash function to all, or the selected portion, of the reference data elements and associated customer identifiers.

Further, examples of the replication event may include, but are not limited to, a temporal event that triggers the replication of all, or a subset, of the reference data elements and associated customer identifiers within reference data store 112 at regular, predetermined temporal intervals (e.g., upon expiration of a predetermined temporal interval since a prior replication of reference data store 112), or a network-based event that triggers the replication of all, or a subset, of the reference data elements and associated customer identifiers within reference data store 112 in response to a detection of one or more additional network-connected computing devices or systems operating within environment 100. Additionally, in some examples, the replication event may also include a receipt, by repository system 110, of data from one or more additional computing systems or devices within environment 100 (e.g., local repository system 172) that requests a replication of reference data elements 114. The disclosed embodiments are, however, not limited to these exemplary replication events, and in other examples, the replication event may include any additional, or alternate events that would be appropriate to reference data store 112, the discrete elements of reference data, or any of the computing systems within environment 100 that access or maintained the replicated reference data elements, such as local repository system 172.

Executed replication engine 118 may perform operations that detect the occurrence of the replication event (e.g., the temporal replication event, the network-based replication event, etc.), and may perform operations that access reference data store 112, extract all, or a selected portion, of the reference data elements and associated customer identifiers, and package the extracted reference data elements and associated customer identifiers into corresponding portions of status data 120. Further, although not illustrated in FIG. 1A, status data 120 may also include one or more cryptographic or non-cryptographic representations of the reference data elements and associated customer identifiers, such as, but not limited to, the cryptographic or non-cryptographic hash values described herein.

In some examples, executed replication engine 118 may perform additional operations that generate a replication request 122 that include status data 120, temporal data 124, and one or more unique identifiers 126 of repository system 110 or executed replication engine 118. As described herein, status data 120, and the corresponding reference data elements and associated customer identifiers, may reflect a current snapshot of the composition of reference data store 112 at a particular time or date, and temporal data 124 may specify the particular time or date characterizing the current snapshot of reference data store 112 represented by status data 120. Further, identifiers 126 may include, but are not limited to, a network address of repository system 110 (e.g., an IP address, a MAC address, etc.), a cryptogram or other element of cryptographic data associated with executed replication engine 118, or any combinations thereof.

Additionally, although not illustrated in FIG. 1A, executed replication engine 118 may also perform operations that encrypt one or more elements of replication request 122 (e.g., status data 120, temporal data 124, and/or identifiers 126) using, for example, a public cryptographic key associated with one or more of the network-connected computing systems operating within environment 100, such as, but not limited to, notary systems 130. Executed replication engine 118 may also generate and apply a digital signature 128 to replication request 122 (e.g., in encrypted or unencrypted form) using a private cryptographic key 127 associated with repository system 110 or executed replication engine 118. For example, executed replication engine 118 may generate digital signature 128 based on application of a digital signature algorithm or scheme to one or more portions of replication request 122 and to private cryptographic key 127. Further, as illustrated in FIG. 1A, executed replication engine 118 may perform operations that cause repository system 110 to broadcast replication request 122 (e.g., in encrypted or unencrypted form), digital signature 128, and a public key certificate 129 associated with repository system 110 or executed replication engine 118 (which includes a corresponding public cryptographic key 129A) across network 102 to one or more notary systems 130, including notary system 132.

Referring to FIG. 1B. a programmatic interface established and maintained by each of the one or more of notary systems 130, such as an application programming interface (API) 133 of notary system 132, may receive replication request 122 (e.g., in encrypted or unencrypted form), digital signature 128, and a public key certificate 129 from repository system 110, and may route replication request 122, digital signature 128, and a public key certificate 129 to one or more executed application programs, such a verification and consent engine 134. When executed by the one or more processors of notary system 132 (and each additional or alternate one of notary systems 130), verification and consent engine 134 may perform operations that validate digital signature 128 using public cryptographic key 129A. Based on a successful validation of digital signature 128, executed verification and consent engine 134 may authenticate an identity of repository system 110 or replication engine 118, and further, establish an integrity of the data maintained within replication request 122. Further, in some instances, a successful validation of digital signature 128 by executed verification and consent engine 134 may be indicative of an approval, of a consent, of executed replication engine 118 (and as such, of repository system 110, which may operate as a computing system of record) to the replication of the current snapshot of reference data store 112.

If, for example, executed verification and consent engine 134 were unable to validate digital signature 128, executed verification and consent engine 134 may perform operations (not illustrated in FIG. 1B) that cause notary system 132 (and additional or alternate ones of notary systems 130) to generate and transmit an error message characterizing the failed validation of digital signature 128 across network 102 to repository system 110. Notary system 132 (and additional or alternate ones of notary systems 130) may also discard replication request 122, digital signature 128, and public key certificate 129.

In other examples, and based on the successful validation of digital signature 128, executed verification and consent engine 134 may perform operations that store replication request 122 within a portion one or more tangible, non-tangible memories, e.g., within a portion of notary data store 136. As described herein, replication request 122 may include status data 120 (e.g., which includes all, or a selected portion, of the reference data elements and associated customer identifiers maintained within reference data store 112 of repository system 110), temporal data 124 (e.g., which specifies the particular data and time characterizing the current snapshot of reference data store 112 represented by status data 120), and one or more unique identifiers 126 of repository system 110 or executed replication engine 118. Further, in some instances, all or a selected portion of replication request 122 may be encrypted, and executed verification and consent engine 134 may perform operations that access a private cryptographic key 137 associated with the one or more of notary systems 130 (e.g., as maintained within notary data store 136), and that decrypt the encrypted portions of replication request 122 using private cryptographic key 137 and store the now-decrypted portions of replication request 122 within notary data store 136.

Further, as illustrated in FIG. 1B, executed verification and consent engine 134 may provide replication request 122 (e.g., in unencrypted form) as an input to a block generation engine 138 of notary system 132. In some instances, and upon execution by the one or more processors of notary system 132 that generate an element 140 of a notarized distributed ledger 142 that includes all, or a selected portion, of replication request 122. By way of example, notarized distributed ledger 142 may correspond to a cryptographically secure, immutable, and permissioned distributed electronic ledger (such as, but not limited to, a blockchain ledger) established and maintained through an implementation of one or more consensus-based processes by all, or a subset, of notary systems 130, including notary system 132. The disclosed embodiments are, however, not limited to these exemplary distributed-ledger data structures, and in other instances, notarized distributed ledger 142 may correspond to any additional, or alternate, permissioned, public, or private distributed electronic ledger having elements that include, or record, data representative of a current snapshot of reference data store 112 and any approved and notarized modifications to reference data store by one or more computing systems or devices operating within environment 100.

In some instances, element 140 may include (e.g., may "record") all or a selected portion of status data 120, and as such, may record one or more of the actual elements of reference maintained within reference data store 112 and the corresponding customer identifiers that collectively establish the current "snapshot" of reference data store 112. In other instances, element 140 may also record a representation of the elements of reference maintained within reference data store 112 and the corresponding customer identifiers, and examples of the recorded representation may include, but are not limited to, a cryptographic or non-cryptographic hash value generated by executed block generation engine 138 through an application of a corresponding cryptographic or non-cryptographic hash algorithm or all, or a selected subset, of the actual, elements of reference data maintained within status data 120. Further, and as illustrated in FIG. 1A, element 140 may record temporal data 124, which may specify the particular time or date characterizing the current snapshot, and one or more of identifiers 126 of repository system 110, as described herein.

Executed block generation engine 138 (and the block generation engine executed by additional ones of notary systems 130) may also perform operations that generate and apply a digital signature 144 to the recorded portion of status data 120 (and/or the cryptographic or non-cryptographic representation of the portion of status data 120), temporal data 124, and identifiers 126. For example, executed block generation engine 138 may generate digital signature 144 based on an application of a digital signature algorithm or scheme to the recorded portion of status data 120 (and/or the cryptographic or non-cryptographic representation of the portion of status data 120), temporal data 124, identifiers 126, and to private cryptographic key 137. Further, executed block generation engine 138 may generate a hash value 146 based on an application of one or more appropriate hash algorithms to status data 120 (and/or the cryptographic or non-cryptographic representation of the portion of status data 120), temporal data 124, identifiers 126, and digital signature 144 (and in some instances, to other elements of notarized distributed ledger 142, such as a hash value representative included within a previously recorded element of notarized distributed ledger 142). Executed block generation engine 138 may package digital signature 144 and hash value 146 into corresponding portions of element 140, e.g., in conjunction with the portion of status data 120 (and/or the cryptographic or non-cryptographic representation of the portion of status data 120), temporal data 124, and identifiers 126.

Notary system 132 (and each additional or alternate one of notary systems 130) may perform operations that append element 140 to a prior version of the notarized distributed ledger to generate a latest, longest version of that notarized distributed ledger, e.g., notarized distributed ledger 142, that reflects the current composition, and as such, the current snapshot, of reference data store 112 maintained at repository system 110. In other examples, element 140 may correspond to an initial element, e.g., a "genesis" block, of a new notarized distributed ledger, e.g., notarized distributed ledger 142, that not only establishes the current composition, and as such, the current snapshot, of reference data store 112, but also provides an immutable, cryptographically secure, and temporally evolving record of all modifications to the elements of reference data maintained within the reference data store 112, e.g., modifications initiated at repository system 110 or modifications proposed by one or more additional computing systems operating within environment 100, such as local repository system 172.

In some instances, notary system 132 (and each additional or alternate one of notary systems 130) may perform additional operations that generate and assign an index 148 to element 140, and that incorporate index 148 within a corresponding portion of element 140. Index 148 may, for example, include a positional identifier (e.g., a "block number") that specifies a sequential position of element 140 relative to the existing, prior elements of notarized distributed ledger 142, or alternatively, that specifies an initial position of element 140 within notarized distributed ledger 142, e.g., as the genesis block. These additional operations may, for example, be established through a distributed consensus among additional ones of notary systems 130, and may include, but are not limited to, a calculation of an appropriate proof-of-work or proof-of-stake by a distributed consensus engine 149 executed at notary system 132 prior to a calculation of corresponding proofs-of-work or proofs-of-stake by others of notary systems 130. In certain aspects, notary system 132 may broadcast evidence of the calculated proof-of-work or proof-of-stake to one or more additional ones of notary systems 130 across network 102 (not illustrated in FIG. 1A). Notary system 132 may also broadcast notarized distributed ledger 142, which represents the latest, longest version of the notarized distributed ledger, across network 102 to the additional ones of notary systems 130 operating within environment 100.

Further, as illustrated in FIG. 1A, notarized distributed ledger 142 may also include one or more additional elements, such as smart contract elements 150, that record code or software instructions, such as distributed notarization module 152, and one or more elements of supporting data, such as notarization criteria 154. In some examples, the recorded code or software instruction, including distributed notarization module 152, may establish collectively a distributed smart contract, e.g., a distributed "notarization" contract. Further, when executed by the one or more processors of notary system 132 (and by one or more processors of the other ones of notary systems 130), the recorded code or software instructions, including distributed notarization module 152, may cause notary system 132 (and the other ones of notary systems 130) to perform notarization processes that constrain an ability of multiple parties to simultaneously, or near simultaneously, propose modifications or updates to the elements of reference data maintained within reference data store 112 in accordance with notarization criteria 154.

Notary system 132 (and additional, or alternate ones of notary systems 130) may also perform one or more of the exemplary processes to provision all or a selected portion of the replication request 122, which include elements of reference data (e.g., as maintained in status data 120) and temporal data 124 that collectively establish the current "snapshot" of reference data store 112 recorded onto or included within element 140 of notarized distributed ledger 142, to one or more additional computing systems operating within environment 100 permitted to operate on the elements of reference data maintained within reference data store 112, such as, but not limited to, local repository system 172. For example, local repository system 172, may execute a Software-as-a-Service (SaaS) application 174, and upon execution, SaaS application 174 may cause local repository system 172 to generate one or more elements of locally replicated reference data based on the provisioned portions of replication request 122, e.g., to establish a "local" snapshot of the composition of reference data store 112 at the particular time and date specified by temporal data 124.

Referring to FIG. 1C, a provisioning engine 156 executed by the one or more processors of notary system 132 (and additional, or alternate ones of notary systems 130) may access notary data store 136 (e.g., as maintained within the one or more tangible, non-transitory memories), and may perform operations that extract replication request 122 from accessed notary data store 136. As described herein, replication request includes status data 120, temporal data 124, and identifiers 126 of repository system 110 or executed replication engine 118. In some instances, executed provisioning engine 156 may perform operations that process replication request 122 to obtain all, or a selected portion, of status data 120, temporal data 124, and identifiers 126, and that package the obtained portions of status data 120, temporal data 124, and identifiers 126 within corresponding portions of replication data 158.

In some instances, executed provisioning engine 156 may perform operations that encrypt replication data 158 using a public cryptographic key 160 associated with SaaS application 174 executed at local repository system 172. Executed provisioning engine 156 may also generate and apply a digital signature 162 to encrypted replication data 158 using private cryptographic key 137. Further, as illustrated in FIG. 1C, executed provisioning engine 156 may perform operations that cause notary system 132 (and additional, or alternate, ones of notary systems 130) to transmit encrypted replication data 158, digital signature 162, and a public key certificate 164 associated with notary system 132 (which includes a corresponding public cryptographic key 166) across network 102 to one or more additional computing systems that execute application programs permitted by repository system 110 to operate on the elements of reference data maintained within reference data store 112, such as local repository system 172.

As illustrated in FIG. 1C, a programmatic interface established and maintained by local repository system 172, such as an application programming interface (API) 176 associated with executed SaaS application 174, may receive encrypted replication data 158, digital signature 162, and public key certificate 164 (which includes corresponding public cryptographic key 166), and may route encrypted replication data 158, digital signature 162, and public key certificate 164 to executed SaaS application 174. In some instances, a verification and consent module 178 of executed SaaS application 174 may receive encrypted replication data 158, digital signature 162, and public key certificate 164, and may perform operations that obtain public cryptographic key 166 from public key certificate 164, and that validate digital signature 162 using public cryptographic key 166.

If, for example, executed verification and consent module 178 were unable to validate digital signature 128, executed verification and consent module 178 may perform operations (not illustrated in FIG. 1B) that cause local repository system 172 to discard encrypted replication data 158, digital signature 162, and public key certificate 164. In other examples, and based on the successful validation of digital signature 162, executed verification and consent module 178 may verify the integrity of encrypted replication data 158 and may establish that notary system 132 (and executed provisioning engine 156) represents a valid, trusted source for encrypted replication data 158. Executed verification and consent module 178 may perform operations that access a private cryptographic key 180 associated with executed SaaS application 174 (e.g., as maintained within the one or more tangible, non-transitory memories of local repository system 172), and that decrypt encrypted replication data 158 using private cryptographic key 180. Further, as illustrated in FIG. 1C, executed verification and consent module 178 may provide decrypted replication data 158 as an input to a local replication module 182 of executed SaaS application 174, which may perform operations that store decrypted replication data 158 within a portion of a replicated data store 184.

In some examples, through a storage of replicated reference data 186 within replicated data store 184, executed SaaS application 174 may establish a local replica of the elements of reference data maintained within reference data store 112 at repository system 110, e.g., the system of record for the elements of reference data. Further, and through the storage of replicated reference data 186 in conjunction with temporal data 124, certain of the exemplary processes described herein may enable executed SaaS application 174 to establish that replicated reference data 186 corresponds to, or remains, a current snapshot of the elements of reference data maintained at repository system 110 within reference data store 112.

Further, as illustrated in FIG. 1C, executed local replication module 182 may provide replicated reference data 186 and temporal data 124 as inputs to a local block generation module 192 of executed SaaS application 174, which may perform operations that generate an additional element 193 (e.g., an additional ledger block) of a locally maintained distributed ledger, such as local distributed ledger 190. In some instances, additional elements 193 may include all, or a selected portion, of replicated reference data 186, and may also include temporal data 124, which specifies the time or date characterizing the current snapshot of reference data store 112 represented by replicated reference data 186. In other instances, executed block generation module 192 may compute a cryptographic or non-cryptographic hash value representative of all, or a selected portion, of the reference data elements maintained in replicated reference data 186, and element 193 may include the computed hash value in additional to, or as an alternate to, replicated reference data 186.

Although not illustrated in FIG. 1C, executed local block generation module 192 may perform any of the exemplary processes described herein to: generate an additional digital signature based on an application of a digital signature algorithm or scheme to replicated reference data 186 (and/or the cryptographic or non-cryptographic representation of the portion of status data 120), temporal data 124, and to private cryptographic key 180; and to compute an additional hash value based on an application of one or more appropriate hash algorithms to replicated reference data 186 (and/or the cryptographic or non-cryptographic representation of the portion of status data 120), temporal data 124, and the additional digital signature (and in some instances, to data associated with other elements of local distributed ledger 190, such as a hash value representative of a previously recorded element of local distributed ledger 190). Executed local block generation module 192 may package the additional digital signature and the additional hash value into corresponding portions of element 193, e.g., in conjunction with the portion of replicated reference data 186 (and/or the cryptographic or non-cryptographic representation of the portion of status data 120) and temporal data 124.

In some instances, executed local block generation module 192 may append element 193 to local distributed ledger 190, e.g., to generate a latest, longest version of the immutable, cryptographically secure, local distributed ledger, and executed local block generation module 192 may store local distributed ledger 190 within a portion of the one or more tangible, non-transitory memories of local repository system 172, e.g., within local ledger data store 194. In other instances, not illustrated in FIG. 1C, executed SaaS application 174 may cause local repository system additional operations that append element 193 to local distributed ledger 190 and generate a positional identifier that (e.g., a "block number") that specifies a sequential position of element 193 within local distributed ledger 190, e.g., using any of the exemplary consensus-based processes described herein.

b. Exemplary, Computer-Implemented Processes for Modifying Reference Data Using Notarized Distributed Ledgers In some examples, a notarized, distributed electronic ledger, such as notarized distributed ledger 142 established and maintained via a distributed consensus establish between notary systems 130, may include one or more discrete elements, such as element 140, that include (e.g., "record") data representative of a composition of reference data store 112 during a particular temporal interval, e.g., a "snapshot" of the composition of reference data store 112 during a current temporal interval. Further, and as described herein, the discrete elements of notarized distributed ledger 142 may also record code or application modules (e.g., distributed notarization module 152 of FIG. 1A) that, when executed by the notary systems 130, enable notary systems 130 (including notary system 132) to perform one or more of the exemplary, consensus-based notarization processes described herein, which constrain an ability of multiple parties to simultaneously (or near simultaneously) propose updates to the elements of reference data maintained at the system of record (e.g., within reference data store 112 of repository system 110) and replicated across one or more additional computing systems operating within environment 100 (e.g., within replicated data store 184.

Further, and based on a successful application of these notarization processes to a proposed modification to an element of the reference data (e.g., as proposed by repository system 110 or by local repository system 172), one or more of notary systems 130 may perform additional of the exemplary, consensus-based notarization processes described herein to record information representative of modified element of reference data (e.g., the actual modified reference data element and/or a representative hash value) within an additional element of notarized distributed ledger 142. In some instances, and responsive to the recordation of the information representative of the updated or modified element of reference data onto notarized distributed ledger 142, certain of the exemplary, consensus-based notarization processes described herein may provision the modified element of reference data to not only repository system 110 (e.g., the system of record), but also to application programs executed by local repository system 172, e.g., SaaS application 174.

Figure 2A:
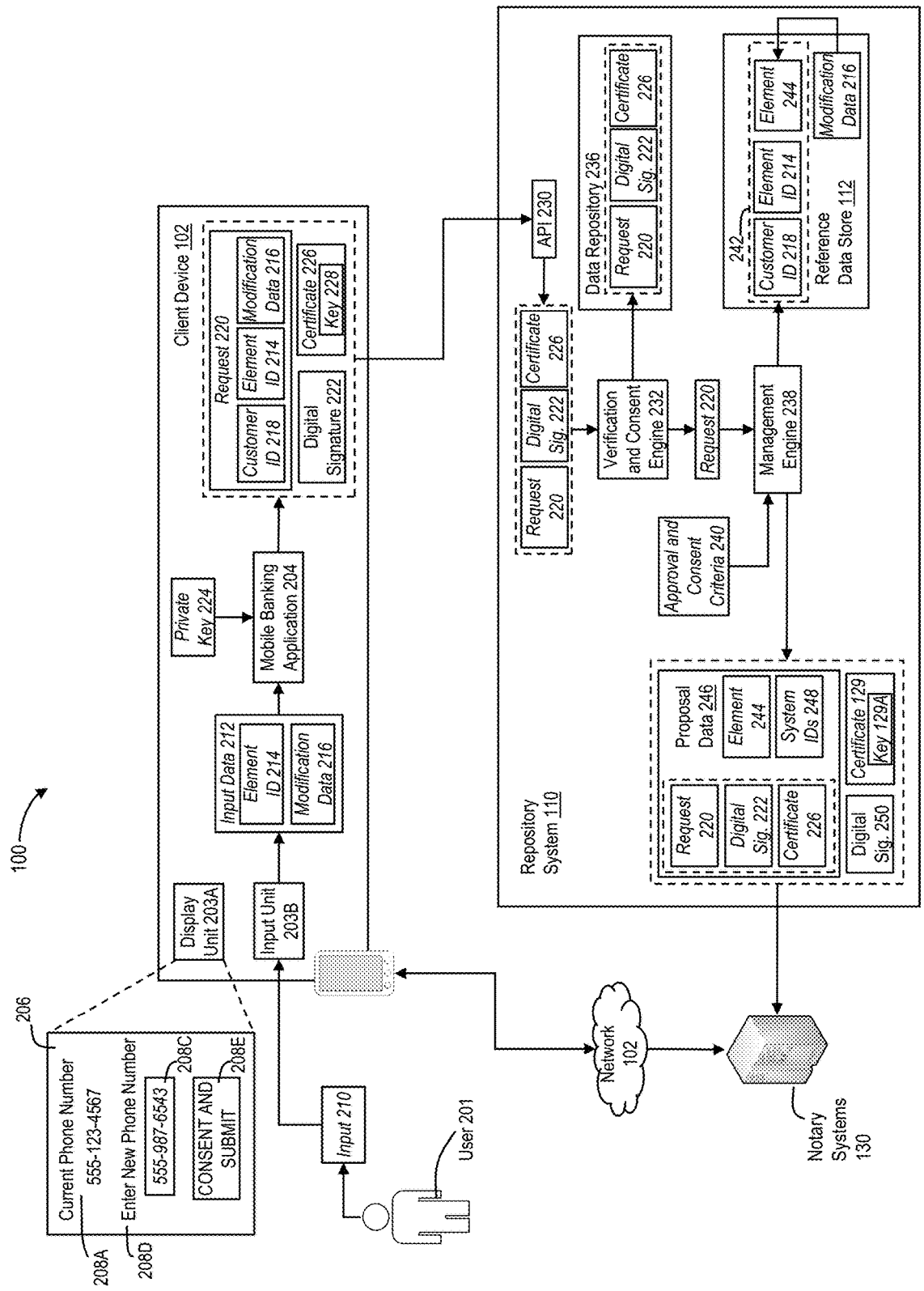

Referring to FIG. 2A, environment 100 may also include one or more computing devices, such as client device 202, interconnected with repository system 110 and local repository system 172, across one or more communications networks, such as communications network 102 described herein. In some instances, client device 202 may include one or more tangible, non-transitory memories that store data and/or software instructions and one or more processors configured to execute the software instructions. Client device 202 may also include a communications interface, such as one or more wireless transceivers, coupled to the one or more processors for accommodating wired or wireless internet communication with the one or more of the computing systems operating within environment 100.

Client device 202 may also include a display unit 203A coupled to the one or more processors and configured to present interface elements to user 201, and one or more additional input units, such as input unit 203B, coupled to the one or more processors and configured to receive input from user 201. By way of example, display unit 203A may include, but is not limited to, an LCD display, a TFT display, and OLED display, or other appropriate type of display unit, and input unit 203B may include, but is not limited to, a keypad, keyboard, touchscreen, fingerprint scanner, stylus, or any other appropriate type of input unit. Further, in some examples, the functionalities of display unit 203A and input unit 203B may be combined into a single device, such as a pressure-sensitive touchscreen display unit that can present interface elements and can detect an input from user 201 via a physical touch.

As described herein, client device 202 may be associated with or operated by a user, such as user 201. By way of example, user 201 may represent an existing customer of the financial institution associated with repository system 110, and may hold one or more one or more financial products or financial services accounts issued by that financial institution (e.g., a deposit account, a credit card account, etc.). In other examples, user 201 may correspond to a prospective customer of the financial institution (e.g., associated with a pending or partially completed application for one or more financial products or financial services accounts) or a prior customer of the financial institution (e.g., associated with one or more inactive financial products or closed financial services accounts).

Further, examples of client device 202 may include, but are not limited to, a smart phone, a mobile phone, a tablet computer, a laptop computer, a notebook computer, a handheld computer, a personal digital assistant, a portable navigation device, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform one or more of the exemplary processes described herein. In some instances, client device 202 may also establish communications with one or more additional computing systems or devices operating within environment 100 across a wired or wireless communications channel, e.g., via the communications interface using any appropriate communications protocol.

The stored software instructions may include one or more application programs, one or more application modules, or other code executable by the one or more processors of client device 202. For instance, client device 202 may store, within the one or more tangible, non-transitory memories, one or more executable mobile applications, such as an executable mobile banking application 204 associated with the financial institution. In some examples, when executed by the one or more processors of client device 202, executed mobile banking application 204 may cause client device 202 to establish a secure, programmatic channel of communications with repository system 110 across network 102, and to generate, and render for presentation via display unit 203A, a digital interface 206 having interface elements that enable user 201 to access, interact with, or modify or update one or more confidential elements of customer-specific reference data maintained by repository system 110 within reference data store 112.

Further, although not illustrated in FIG. 2A, client device 202 may also store, within the one or more tangible, non-transitory memories, one or more executable web browsers and one or more additional mobile applications associate with, or provisioned by other computing systems operating within environment 100 or with application programs executed by these other computing systems, such as SaaS application 174 executed by local repository system 172. For example, upon execution by the one or more processors, the executed web browser may present, within digital interface 206, one or more web pages having corresponding interface elements that enable user 201 to access, interact with, or modify the one or more elements of reference data maintained within reference data store 112. Additionally, in some examples, the executed web browser may also perform any of the exemplary processes described herein to generate one or more unique cryptographic identifiers of user 201 (and other current, prospective, or prior customers of the financial institution), such as, but not limited to, a browser-specific PKI fingerprint associated with a public cryptographic key of user 201, and a split portion of the public cryptographic key associated with user 201 which may be generated through an application of one or more key splitting algorithms to the public cryptographic key by the executed web browser.

In some instances, to facilitate a modification to the reference data maintained within reference data store 112, user 201 may provide input to client device 202 (e.g., via input unit 203B) that requests an execution of mobile banking application 204. Upon execution by the one or more processors of client device 202, executed mobile banking application 204 may perform operations that initiate an authentication process, and may generate and present one or more interface elements within digital interface 206 (not illustrated in FIG. 2A) that prompt user 201 to provide one or more authentication credentials as inputs to client device 202. The one or more authentication credentials may include, but are not limited to, an alphanumeric identifier assigned to user 201 by the financial institution, a corresponding password, or one or more biometric credentials, such as a fingerprint scan or a facial image.

In other instances, the initiated authentication process may be associated with, or implemented in accordance with, one or more single sign-on (SSO) protocols, and the one or more authentication credentials may a unique, digital identifier assigned to user 201 by the financial institution, e.g., upon registration within one or more digital portals or web pages maintained by computing systems of the financial institution. Examples of the digital identifier may include, but are not limited to, a cryptogram, token, random number, or other element of cryptographic data, and in some instances, the digital identifier may represent a federated credential that enables user 201 to access one or more additional, or alternate, computing systems associated with or operated by the financial institution, either on an individual basis (e.g., through a corresponding digital portal or web page) or collectively through one or more single sign-on (SSO) protocols. The disclosed embodiments are, however, not limited to these exemplary authentication credentials, and other examples, customer identifier 114B may include any additional, or alternate, element of data that uniquely identifies user 201 and is appropriate to the financial institution, including combinations of the exemplary customers described herein.

Based on a successful outcome of the authentication process, executed mobile banking application 204 may perform operations that cause client device 202 to establish a secure, programmatic channel of communications with repository system 110, and further, may generate and present, within digital interface 206, additional interface elements that enable user 201 to view, and interact with, and request a modification to the reference data maintained within reference data store 112 at repository system 110. For example, digital interface 206 may include interface elements 208A, which identify a current telephone number associated with user 201 and maintained within reference data store 112 (e.g., "5551234567"), fillable text box 208B, and additional interface elements 208C, which prompt user 201 to enter an updated or modified phone number within fillable text box 208B. Further, and by way of example, digital interface 206 may also include interface element 208D, which upon selection by user 201, confirms a consent of user 201 to the modification of the customer phone number, and requests a submission of the requested modification to repository system 110. The disclosed embodiments are, however, not limited to these exemplary interface elements, and in other instances, executed mobile banking application 204 present any additional, or alternate, number or type of interface elements within digital interface 206 that would be appropriate to the received elements of reference data and that would facilitate corresponding modifications to the received elements of reference data.

As illustrated in FIG. 2A, user 201 may provide, via input unit 203B of client device 202, input 210 to digital interface 206 that specifies the updated phone number of user 201 (e.g., an input of "5559876543" within fillable text box 208B), and that confirms the consent of user 201 to the update and requests the submission of the updated phone number to repository system 110 (e.g., responsive to a selection of selectable interface element 208D). In some instances, and in addition to, or as an alternate to, processes that confirm the consent of user 201 based on the selection of interface element 208D, executed mobile banking application 204 may perform additional operations (not illustrated in FIG. 2A) that present further interface elements within digital interface 206 prompting user 201 to consent affirmatively to the update to the phone number, e.g., based on a re-entry of a password of user 201 and/or based on a successful completion of one or more in-band or out-of-band challenge processes. Input unit 203B may receive input 210, and may route corresponding elements of input data 212, which includes all or a selected portion of input 210, to executed mobile banking application 204. For example, input data 212 may include, but is not limited to, data that identifies the element of reference data subject to modification by user 201, such as element identifier 214 associated with the customer's phone number within reference data store 112, along modification data 216 that specifies the requested modification, (e.g., the updated phone number "555-987-6543").

In some instances, executed mobile banking application 204 may receive input data 212, which includes element identifier 214 and modification data 216, and may load, from the one or more tangible, non-transitory memories, at least one of the authentication credentials associated with user 201, such as customer identifier 218. Further, and responsive to input data 12, executed mobile banking application 204 may perform operations that generate a request 220 to modify reference data store 112, and may package customer identifier 218, element identifier 214, and modification data 216 within corresponding portions of request 220.

Further, executed mobile banking application 204 may also perform operations that generate and apply a customer-specific digital signature 222 to request 220, which includes customer identifier 218, element identifier 214, and modification data 216, using a private cryptographic key 224 associated with executed mobile banking application 204 or client device 202, e.g., as maintained within the one or more tangible, non-transitory memories of client device 202. For example, executed mobile banking application 204 may generate digital signature 222 based on application of a digital signature algorithm or scheme to one or more portions of request 220 and to private cryptographic key 224, and may perform operations that cause client device 202 to transmit request 220, applied digital signature 222, and a public key certificate 226 associated with executed mobile banking application 204 or client device 202 (which includes a corresponding public cryptographic key 228) across network 102 to repository system 110. Further, in some instances (not illustrated in FIG. 2A), executed mobile banking application 204 may also encrypt request 220, digital signature 222, and/or public key certificate 226 using a public cryptographic key associated with repository system 110, e.g., prior to transmission across network 102 by client device 202.

A programmatic interface established and maintained by repository system 110, such as an application programming interface (API) 230, may receive request 220, applied digital signature 222, and a public key certificate 226, and may perform operations that route request 220, applied digital signature 222, and a public key certificate 226 to a verification and consent engine 232 executed by the one or more processors of repository system 110. In some instances, all, or a selected portion, of request 220, digital signature 222, and public key certificate 226 may be encrypted, and executed verification and consent engine 232 may perform operations (not illustrated in FIG. 2A) that decrypt the encrypted portions of request 220, digital signature 222, or public key certificate 226 using a public cryptographic key associated with repository system 110.

Executed verification and consent engine 232 may also perform operations that validate digital signature 222 using public cryptographic key 228, e.g., as obtained from public key certificate 226. If, for example, executed verification and consent engine 232 were unable to validate digital signature 222, executed verification and consent engine 232 may perform operations (not illustrated in FIG. 2A) that cause repository system 110 to generate and transmit an error message characterizing the failed validation of digital signature 222 across network 102 to client device 202, and may discard request 220, digital signature 222, and public key certificate 226.

Alternatively, if executed verification and consent engine 232 were to validate successfully digital signature 222, executed verification and consent engine 134 may perform operations that store request 220, digital signature 222, and public key certificate 226 within a portion one or more tangible, non-tangible memories, e.g., within a portion of data repository 236. Further, and based on the successful validation signature 222, executed verification and consent engine 232 may provide request 220, which includes customer identifier 218, element identifier 214, and modification data 216, as an input to a management engine 238 executed by the one or more processors of repository system 110, which may perform operations that establish a consistency between the requested modification, update, or addition to reference data store 112 and one or more approval or consent criterion, and based on the established consistency, and approve or consent to the requested modification, update, or addition, and modify the elements of reference data maintained within reference data store 112 in accordance with request 220.

In some instances, executed management engine 238 may perform operations that parse request 220 to: (i) obtain customer identifier 218, which uniquely identifies user 201 within reference data store 112; (ii) obtain element identifier 214, which identifies the element of reference data maintained within reference data store 112 and subject to modification in accordance with request 220 (e.g., the customer's telephone number); and (iii) obtain modification data 216, which includes the requested modification, update, or addition to that identified element of reference data (e.g., the updated phone number "5559876543"). Further, as illustrated in FIG. 2A, executed management engine 238 may also obtain, from data repository 236, approval and consent criteria data 240, which identifies and characterizes one or more criterion with which executed management engine 238 approves of, or consents to, the requested modification, update, or addition to the identified element of reference data.

Executed management engine 238 may also determine the request 220 corresponds to a requested update to the customer telephone number maintained within reference data store 112 (e.g., as specified by element identifier 214), and that the requested update includes a linear string of nine numbers corresponding to the updated phone number (e.g., "5559876543" included within modification data 216). Further, approval and consent criteria data 240 may include, but is not limited to, a corresponding approval and consent criterion that specifies an approved format or composition of updates to the customer phone number, e.g., the linear string of nine numbers described herein. In some instances, executed management engine 238 may process modification data 216 and perform operations that establish a consistency between a composition and format or the requested update to the customer phone number within reference data store 112 (e.g., the updated customer telephone number "5559876543") and the approved composition and format specified within approval and consent criteria data 240 (e.g., the linear string of nine numbers). Based on the established consistency between the composition and format or the requested update and the approved composition and format, and based on the successful validation of digital signature 222 (which establishes the approval or consent of executed mobile banking application 204 or user 201 to the requested update), executed management engine 238 may determine to approve, or consent to, the requested update to the customer phone number, and may perform operations that modify one or more elements of reference data associated with user 201 to reflect the requested update, e.g., as specified within request 220.

For example, executed management engine 238 may access reference data store 112, and identify one or more data records 242 that include, or reference, customer identifier 218 and as such, include elements of reference data associated with customer 201. Executed management engine 238 may also perform operations that parse elements of reference data associated with customer 201 (e.g., as included within data records 242), and identify an element 244 of reference data associated with element identifier 214, e.g., the currently maintained customer telephone number "5551234567." Further, executed management engine 238 may perform additional operations that modify the elements of reference data within data records 242 to replace element 244 (e.g., the currently maintained customer telephone number "5551234567") with all, or a selected portion, of modification data 216 (e.g., the updated customer telephone number "5559876543"). In some instances, the exemplary operations performed by executed management engine 238 to access reference data store 112 and to identify or parse one or more of data records 242, may include one or more read operations on those portions of one or more the tangible, non-transitory memories associated with reference data store 112, and the exemplary operations performed by executed management engine 238 to replace element 244 modification data 216 may include one or more write operations on those portions of one or more the tangible, non-transitory memories associated with reference data store 112.

Further, executed management engine 238 may also generate proposal data 246, which identifies and characterizes the requested, and approved and performed modification to the reference data maintained within reference data store 112. In some instances, and for a requested modification to an existing element of reference data maintained within reference data store 112, proposal data 246 may include information associated with or representative of the existing element of reference data (e.g., the actual, existing element of reference data, a cryptographic or non-cryptographic representation of the existing element of reference data, etc.), along with the updated or modified element of reference data. In other instances, and for a requested addition to the existing elements of reference data maintained within reference data store 112, proposal data 246 may include the newly added element of reference data, along with information, e.g., a data flag, indicative of the requested, approved, and performed addition. Further, in some instances, the elements of proposal data 246 may also include additional, or alternate, elements of data that identify user 201 (e.g., the requesting customer), client device 202 or executed mobile banking application 204 (e.g., the requesting device or application), or repository system 110. The disclosed embodiments are, however, not limited to these exemplary elements of proposal data 246, and in other instances, proposal data 246 may include any additional or alternate data identifying or characterizing a request, approved, or implemented modification, update, or addition to the existing elements of reference data maintained within reference data store 112.

In some instances, executed management engine 238 may package request 220 (e.g., that includes customer identifier 218, element identifier 214, and modification data 216), digital signature 222 (e.g., that confirms an approval of the requested update to the customer telephone number by user 201 or executed mobile banking application 204), and public key certificate 226 (e.g., that includes public cryptographic key 228 associated with executed mobile banking application 204) into corresponding portions of proposal data 246. Further, as illustrated in FIG. 2A, executed management engine 238 may package existing element 244 of reference data (e.g., the customer telephone number ("5551234567") maintained currently within reference data store 112) into a corresponding portion of proposal data 246, along with one or more identifiers 248 of repository system 110, such as, but not limited to, a network address of repository system 110 (e.g., an IP address, a MAC address, etc.) or an application cryptogram associated with executed management engine 238.

As illustrated in FIG. 2A, and using any of the exemplary processes described herein, executed management engine 238 also generate and apply a digital signature 250 to proposal data 246 using a private cryptographic key associated with repository system 110, such as private cryptographic key 127 of FIG. 1A. Executed management engine 238 may also perform operations that cause repository system 110 to broadcast proposal data 246, digital signature 250, and a public key certificate associated with repository system 110 (e.g., public key certificate 129 of FIG. 1A, which includes corresponding public cryptographic key 129A) across network 102 to one or more of notary systems 130, including notary system 132. Further, in some instances (not illustrated in FIG. 2A), executed management engine 238 may also encrypt proposal data 246, digital signature 250, and/or public key certificate 129 using a public cryptographic key associated with one or more of notary systems 130, e.g., prior to transmission across network 102 by repository system 110.

Figure 2B:
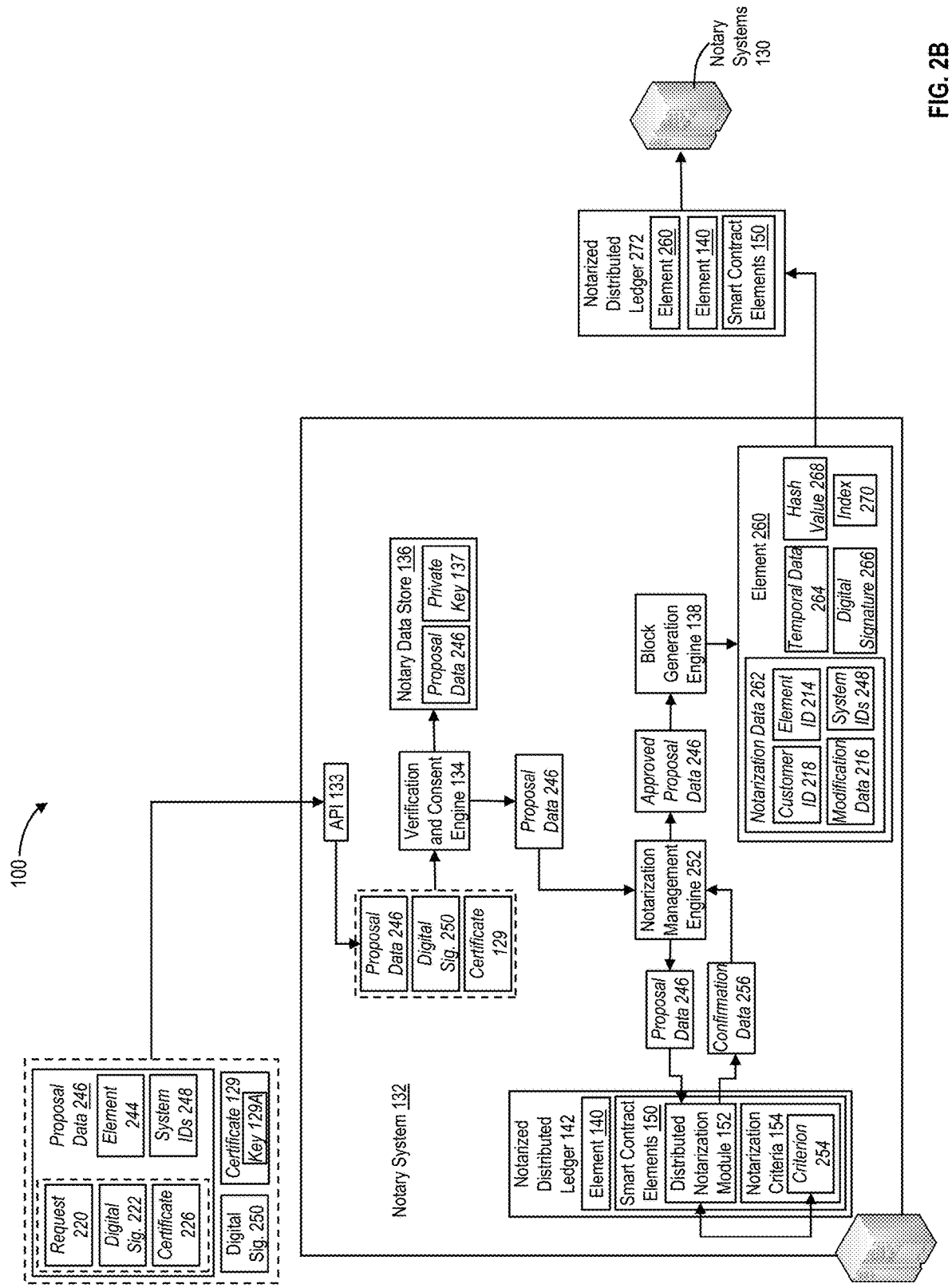

Referring to FIG. 2B, a programmatic interface established and maintained by each of the one or more of notary systems 130, such as API 133 of notary system 132, may receive proposal data 246, digital signature 250, public key certificate 129 (which include corresponding public cryptographic key 129A) from repository system 110, and may route proposal data 246, digital signature 250, public key certificate 129 to executed verification and consent engine 134. As described herein, proposal data 246 may include, among other things, approved request 220, which corresponds to the request, approved by repository system 110, to update a customer phone number associated with user 201 and maintained within reference data store 112. Further, approved request 220 may include, among other things: customer identifier 218, which uniquely identifies user 201 within reference data store 112; element identifier 214, which identifies the element of reference data maintained within reference data store 112 and subject to modification in accordance with request 220 (e.g., the customer's existing telephone number); and modification data 216, which includes the requested modification, update, or addition to that identified element of reference data (e.g., the updated phone number "5559876543").

Further, and as described herein, approved request 220 may also include, but is not limited to: digital signature 222, which may be applied to request 220 by executed mobile banking application 204; public key certificate 226 associated with mobile banking application 204 (including corresponding public cryptographic key 228); existing data element 244, which specifies the existing customer phone number maintained within reference data store 112 prior to modification in accordance with modification data 216); and identifier 248 associated with repository system 110, such as an IP or MAC address. The disclosed embodiments are, however, not limited to these exemplary components of proposal data 246, and in other instances, proposal data 246 may include any additional or alternate elements of data that identify and characterize a proposed modification of, update to, or addition to the elements of reference data maintained within reference data store 112, that establish an approval or consent of repository system to the proposed modification, or that establish an approval or a consent of user 201 or executed mobile banking application 204 to the requested modification.

Executed verification and consent engine 134 may receive proposal data 246, digital signature 250, and public key certificate 129, and in some instances, may perform operations (not illustrated in FIG. 2B) that decrypt the encrypted portions of request 220, digital signature 222, or public key certificate 226 using a private cryptographic key associated with notary systems 130, such as private cryptographic key 137 of notary system 132. Further, executed verification and consent engine 134 may also perform operations that validate digital signature 250 using public cryptographic key 129A (e.g., as obtained from public key certificate 129), and based on a successful validation of digital signature 250, executed verification and consent engine 134 may authenticate an identity of repository system 110, and further, establish an integrity of the data maintained within proposal data 246. In some instances, a successful validation of digital signature 250 by executed verification and consent engine 134 may also be indicative of an approval, or a consent, of repository system 110 (e.g., that operates as the computing system of record for the elements of reference data maintained within reference data store 112) to the requested update to the customer phone number maintained within reference data store 112 and further, may also be indicative of a performance of that requested update to the elements of reference data maintained within reference data store 112.

Additionally or alternatively, executed verification and consent engine 134 may also parse proposal data 246 to obtain request 220, applied digital signature 222, and public key certificate 226 of executed mobile banking application 204 or client device 202, and may perform additional operations that validate digital signature 250 using public cryptographic key 129A, e.g., as obtained from public key certificate 129. In some instances, and through a successful validation of applied digital signature 250, executed verification and consent engine 134 may not only authenticate an identity of executed mobile banking application 204 (and as such, or client device 202) and establish an integrity of request 220, but also confirm an approval of, and a consent to, the now-performed update to reference data store 112 by executed mobile banking application 204 and client device 202.

If, for example, executed verification and consent engine 134 were unable to validate digital signature 250 or were unable to validate digital signature 222, notary system 132 (and additional, or alternate, ones of notary systems 130) may decline to notarize the update to the elements of reference data maintained at repository system 110 using any of the exemplary, consensus-based notarization processes described herein. In response to the unsuccessful validation of digital signature 250 (and/or digital signature 222), executed verification and consent engine 134 may perform operations (not illustrated in FIG. 2B) that cause notary system 132 (and additional or alternate ones of notary systems 130) to generate and transmit an error message characterizing the failed validation across network 102 to repository system 110, and may discard proposal data 246, digital signature 250, and public key certificate 129.

In other examples, and based on the successful validation of digital signature 250 (and additionally, or alternatively, of digital signature 222), executed verification and consent engine 134 may perform operations that store proposal data 246 within a portion one or more tangible, non-tangible memories or notary system 132, e.g., within a portion of notary data store 136. Further, executed verification and consent engine 134 may provide proposal data 246 as an input to a notarization management engine 252 of notary system 132 (and of additional, or alternate, ones of notary systems 130). When executed by the one or more processors of notary system 132 (and each additional, or alternate, one of notary systems 130), notarization management engine 252 may process proposal data 246, extract request 220, existing data element 244, and/or system identifier 248 from proposal data 246, and further, may perform operations that trigger an execution of the one or more elements of code recorded within smart contract elements 150 of notarized distributed ledger 142, such as distributed notarization module 152, in conjunction with corresponding recorded elements of supporting data, such as notarization criteria 154 recorded within smart contract elements 150.

As described herein, the recorded elements of code or software instructions and supporting data, including distributed notarization module 152 and notarization criteria 154, may collectively establish a distributed notarization contract within notarized distributed ledger 142. In some instances, the distributed notarization contract may establish one or more conditions that, when application to proposal data 246 by one or more of notary systems 130 (including notary system 132) through any of the exemplary consensus-based processes described herein, indicate whether the one or more of notary system 130 may approve proposed modification to the elements of reference data maintained within reference data store 112 and record the approved modification within an additional element of notarized distributed ledger 142 (e.g., to "notarize" the requested modification), or alternatively, to reject the proposed modification and notify the requesting computing system or device within environment 100 that proposed the modification, e.g., repository system 110. Through certain of these exemplary, consensus-based processes, the implementation of the distributed notarization contract may prevent or minimize any instances of impermissible "double updates," i.e., simultaneous requests for distinct modifications, updates, or addition to a single element of the reference data maintained within reference data store 112, and may resolve or prioritize requests to modify, update, or add to the elements of reference data received sequentially from various computing systems or devices operating within environment 100.

Referring back to FIG. 2B, and upon execution by the one or more processors of notary system 132 (and by each additional or alternate one of notary systems 130), distributed notarization module 152 may receive proposal data 246. In some instances, executed distributed notarization module 152 may parse proposal data 246, and may perform operations that extract, from proposal data 246, one or more of: (i) customer identifier 218, which identifies user 201 associated with the requested updated to the customer phone number; (ii) element identifier 214 or existing element identifier 244, which identify the element of reference data maintained in reference data store 112 and subject to modification, update, or augmentation, e.g., the customer phone number; (iii) modification data 216, which identifies the requested modification to the customer phone number; or (iv) system identifier 248 of repository system 110, e.g., the system of record that maintains reference data store 112, approved the requested modification, and generated proposal data 246.

Executed distributed notarization module 152 may also access notarization criteria 154 (e.g., as maintained within smart contract elements 150 of notarized distributed ledger 142), and based on customer identifier 218, extracted element identifier 214 or existing element identifier 244, extracted modification data 216, and/or extracted system identifier 248, executed distributed notarization module 152 may identify and obtain one or more discrete notification criteria associated with proposal data 246. The discrete notification criteria may include, but are not limited to, a customer-specific notification criterion, a data-specific notification criterion, a modification-specific notification criterion, or a system-specific notification criterion. Further, each of the discrete notification data obtained from notification criteria may include a corresponding customer-, data-, modification-, or system-specific condition that, when applied to portions of proposal data 246, enable notary system 132 (and additional, or alternate, ones of notary systems 130) to perform any of the consensus-based operations described herein to approve the proposed modification associated with proposal data 246 and generate an additional element of notarized distributed ledger that includes data representative of the approved modification (e.g., to "notarize" the proposed modification to reference data store 112), or alternatively, to perform operations that reject the proposed modification, to reference data store 112 and that notify a computing system or device associated with now-rejected proposal data 246, e.g., repository system 110.

For example, notarization criteria 154 may include a system-based notarization criterion 254 that instructs each of notary systems 130 to notarize any modification, update, or additional to reference data store 112 approved by the corresponding system of record (e.g., repository system 110) using any of the exemplary, consensus-based processes described herein, and that includes one or more unique identifiers of that system of records, such as an IP address or a MAC address of repository system 110. In some instances, executed distributed notarization module 152 may determine that proposal data 246 references a request to notarize an update to a customer phone number maintained within reference data store 112, and that repository system 110, acting as the system of record, approved the update to the customer phone number. Further, executed distributed notarization module 152 may obtain the IP or MAC address of repository system 110 from system identifier 248, and may perform operations identify system-based notarization criterion 254 within notarization criteria 154 based on the IP or MAC address of repository system 110, and that obtain system-based notarization criterion 254 from notification criteria.

Based on an application of system-based notarization criterion 254 to proposal data 246, executed distributed notarization module 152 may determine to approve the modification to the customer phone number previously approved by repository system 110. Executed distributed notarization module 152 may generate confirmation data 256 indicative of the approved modification to the customer phone number associated with proposal data 246, and may perform operations that route confirmation data 256 back to executed notarization management engine 252. In some instances, and based on the approval of the modification associated with proposal data 246 (e.g., by executed distributed notarization module 152), executed notarization management engine 252 may provide all, or a selected portion, of now-approved proposal data 246 as an input to executed block generation engine 138, which may perform any of the exemplary, consensus-based processes described herein to generate an additional element 260 of notarized distributed ledger 142 that includes (e.g., records) data representative of the notarized update to the customer phone number maintained within reference data store 112 (e.g., as associated with proposal data 246), and to generate a latest, longest version of notarized distributed ledger 142 that includes additional element 260.

As illustrated in FIG. 2B, additional element 260 may include, among other things, notarization data 262 that identifies, and characterizes, the notarized update to the customer phone number of user 201 maintained within reference data store 112. For example, notarization data 262 may include the updated phone number of user 201 (e.g., "5559876543," as specified within modification data 216), along with one or more of customer identifier 218, which uniquely identifies user 201 within the data records of reference data store 112, element identifier 214, which uniquely identifies the customer phone number within the data records of reference data store 112, and system identifier 248 that uniquely identifies repository system 112. In some examples, notarization data 262 may include additional, or alternate, data representative of the notarized update, which as, but not limited to, a cryptographic or non-cryptographic hash generated by executed block generation engine 138 through an application of a corresponding cryptographic or non-cryptographic hash algorithm or all, or a selected subset, of the updated phone number of user 201 (e.g., all, or a selected subset, of "5559876543"). Further, and in other examples, notarization data 262 may include the notarized update to the customer phone number of user 201 (e.g., "5559876543," as specified within modification data 216) and the cryptographic or non-cryptographic hash representative of that notarized update, either alone or in conjunction with additional data characterizing the notarized update or the corresponding element of reference data within reference data store 112, such as metadata that characterizes the updated element of reference data (e.g., the customer phone number) or a modification type associated with the notarized update e.g., an update to an existing element of reference data).

In some instances, additional element 260 may also include temporal data 264, which specifies a time or date associated the approval of the notarized update to the customer phone number (e.g., by executed distributed notarization module 152) and/or the generation of additional element 260 (e.g., by executed block generation engine 138). As described herein, an inclusion of temporal data 264 within additional element 260 may facilitate a determination, by notary system 132 (and by other ones of notary systems 130) that the notarized update to the customer phone number maintained within reference data store 112 occurred subsequent to a prior replication of the one or more elements of reference data maintained within reference data store 112 to one or more additional computing systems operating within environment 100, such as, but not limited to, local computing system 172 (e.g., based on corresponding temporal data maintained within a prior element of notarized distributed ledger 142, such as element 140).

Executed block generation engine 138 (and the block generation engine executed by additional ones of notary systems 130) may also perform any of the exemplary processes described herein to generate and apply a digital signature 266 to all, or a selected portion, of notarization data 262. Further, executed block generation engine 138 may generate a hash value 268 based on an application of one or more appropriate hash algorithms to notarization data 262 and digital signature 144 (and in some instances, to other elements of notarized distributed ledger 142, such as a hash value representative included within a previously recorded element of notarized distributed ledger 142, such as hash value 146 of element 140). Executed block generation engine 138 may package digital signature 266 and hash value 268 into corresponding portions of additional element 260, e.g., in conjunction with the portion of notarization data 262.

Notary system 132 may perform further operations, established through a distributed consensus among additional ones of notary systems 130, that generate and assign an index 270 to additional element 260, that incorporate index 270 within a corresponding portion of additional element 260, and that append additional element 260 to a prior version of notarized distributed ledger (e.g., notarized distributed ledger 142) to generate a latest, longest version of notarized distributed ledger 142, e.g., notarized distributed ledger 272. As described herein, index 270 may correspond to a positional identifier (e.g., a "block number") that specifies a sequential position of element 260 relative to the existing, prior elements of notarized distributed ledger 272. Further, in some instances, notarized distributed ledger 272 may reflect reflects the notarized modification to the customer phone number of user 201 maintained within reference data store 112 by repository system 110, and as such, an updated composition, and an "updated" snapshot, of reference data store 112.

These additional operations, established through the distributed consensus among notary systems 130, may include, but are not limited to, a calculation of an appropriate proof-of-work or proof-of-stake by a distributed consensus engine 149 executed at notary system 132 prior to a calculation of corresponding proofs-of-work or proofs-of-stake by others of notary systems 130. In some instances, notary system 132 may broadcast evidence of the calculated proof-of-work or proof-of-stake to one or more additional ones of notary systems 130 across network 102 (not illustrated in FIG. 2B).

Notary system 132 may also broadcast notarized distributed ledger 272, which represents the latest, longest version of the immutable, cryptographically secure, notarized distributed ledger, across network 102 to the additional ones of notary systems 130 operating within environment 100. Further, although not illustrated in FIG. 2B, notary system 132 may also perform operations that generate and transmit a notification indicative of the successful, approved notarization of the update to reference data store 112 associated with proposal data 246 (e.g., the update to the phone number of user 201 within reference data store 112, as previously approved by repository system 110 using any of the exemplary processes described herein) across network 102 to repository system 110.

In some instances, one or more of the notarized distributed ledgers described herein, such as notarized distributed ledger 272, may establish an immutable, time-evolving, and auditable record of not only the elements of reference data (e.g., as maintained within reference data store 112) that are replicated to other computing systems and devices operating within environment 100, but also subsequent, notarized modifications, updated, or additions to each of these elements of reference data. Further, the immutable, time-evolving, and auditable record established by notarized distributed ledger 272 may further establish a queue of notarized modifications, updated, or additions awaiting provisioning to the one or more additional computing systems operating within environment 100, such as, but not limited to, local computing system 172 for replication and local storage, e.g., within replicated data store 184.

Figure 2C:
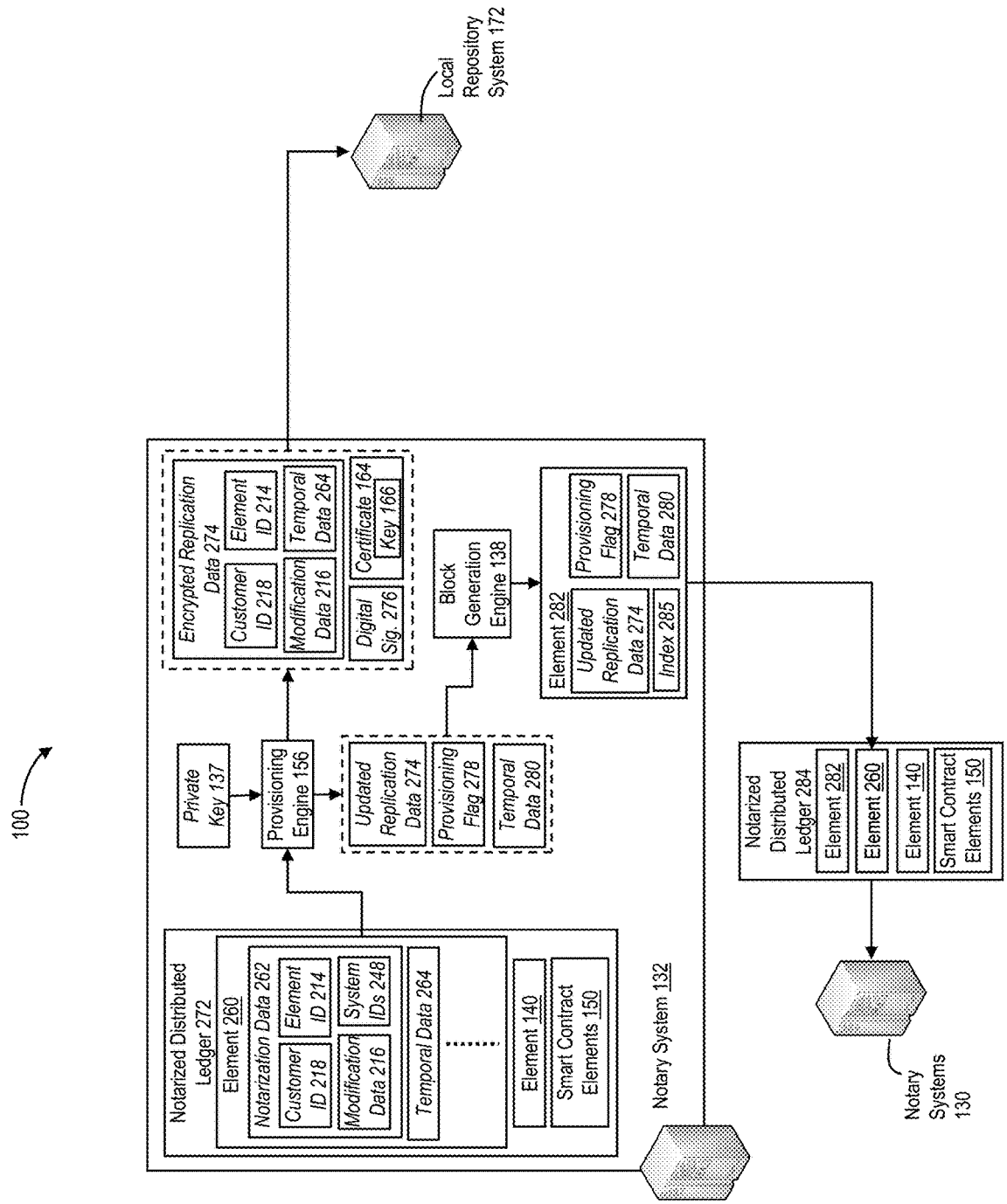

For example, and referring to FIG. 2C, a provisioning engine executed by the one or more processors of notary system 132 (and additionally, or alternatively, by other ones of notary systems 130), such as provisioning engine 156, may perform operations that access notarized distributed ledger 272 and further, that identify and access additional element 260 associated with the newly notarized update to the phone number maintained within reference data store 112 at repository system 110. By way of example, notary system 132 may maintain notarized distributed ledger 272 within one or more tangible, non-transitory memories, such as notary data store 136, and executed provisioning engine 156 may access notary data store 136, obtain notarized distributed ledger 272 from accessed notary data store 136, and identify additional element 260 (e.g., the temporally most recent element of notarized distributed ledger 272) based on temporal data 264 and additionally, or alternatively, based on index 270.

Executed provisioning engine 156 may obtain, from additional element 260, notarization data 262, which includes modification data 216 specifying the modified phone number of user 201 (and additionally, or alternatively, the cryptographic or non-cryptographic hash value representative of the updated phone number), customer identifier 218, element identifier 214, and system identifier 248. Further, executed provisioning engine 156 may also obtain temporal data 264, which specifies the time or date associated the approval of the notarized update to the customer phone number, from additional element 260. In some instances, executed provisioning engine 156 may perform operations that generate updated replication data 274, and that package modification data 216 specifying the updated phone number (and additionally, or alternatively, the cryptographic or non-cryptographic hash value representative of the updated phone number), temporal data 264, and one or more of customer identifier 218, and element identifier 214 into corresponding portions of updated replication data 274.

Further, executed provisioning engine 156 may also perform any of the exemplary processes described herein to generate and apply a digital signature 276 to updated replication data 274 using private cryptographic key 137 associated with notary system 132 and other of notary systems 130. Executed provisioning engine 156 may also perform operations that cause notary system 132 to broadcast updated replication data 274, applied digital signature 276, and public key certificate 164 associated with notary system 132 (which includes a corresponding public cryptographic key 166) across network 102 to one or more additional computing systems within environment 100, such as local repository system 172 that executed SaaS application 174. In some instances, and prior to transmission across network 102 by client device 202, executed provisioning engine 156 may also encrypt updated replication data 274, applied digital signature 276, and/or public key certificate 164 using a public cryptographic key associated with the one or more additional computing systems, such as public cryptographic key 160 associated with SaaS application 174 executed at local repository system 172.

In other examples, and upon completion of the exemplary provisioning processes described herein, executed provisioning engine 156 may generate one or more elements of data, such as provisioning flag 278, indicative a successful provisioning of updated replication data 274 and as such, the updated phone number (e.g., as specified by notification data 262 and temporal data 264 within updated replication data 274) to local repository system 172. As illustrated in FIG. 2C, executed provisioning engine 156 may provide provisioning flag 278 as an input to executed block generation engine 138, along with all, or a selected portion, of updated replication data 274 and additional temporal data 280 that identifies a time or date at which notary system 132 (and additional, or alternate, ones of notary systems 130) broadcast updated replication data 274 to local repository system 172.

Executed block generation engine 138 may, for example, perform any of the exemplary consensus-based processes described herein (e.g., based on a distributed consensus between notary system 132 and one or more others of notary systems 130) to generate a further element 282 of notarized distributed ledger 272 that includes provisioning flag 278, the portions of updated replication data 274, and temporal data 280, and to append further element 282 to notarized distributed ledger 272 and generate a latest, longest version of notarized distributed ledger 272 that includes further element 282, e.g., notarized distributed ledger 284. In some instances, further element 282 may also include information, such as index 285, that identifies or references further element 282 associated with the notarized update to the phone number within reference data store 112 and as such, further element 282 may confirm that notary system 132 (and additionally, or alternatively, others of notary systems 130) provisioned the updated phone number to local computing system 172 for replication and storage, e.g., within replicated data store 184.

In some instances, one or more of the exemplary notarized distributed ledgers described herein, such as notarized distributed ledger 284, may include further elements that identify and characterize additional, or alternate, modifications, updates, or additions to reference data store 112. For example, these elements may be notarized, and recorded onto notarized distributed ledger 284, prior to element 260 (e.g., characterizing the update to the customer phone number of user 201), but subsequent to element 140, which identifies and characterizes the replication of the elements of reference data within reference data store 112 to the one or more computing systems or devices within environment 100, such as, but not limited to, local computing system 172.

Although not illustrated in FIG. 2C, executed provisioning engine 156 may access, in a temporal sequence defined by corresponding positional identifiers and corresponding temporal data, each of these further elements of notarized distributed ledger 284, and may perform any of the exemplary processes described herein to broadcast updated replication data identifying and characterizing corresponding ones of the notarized modifications to reference data store 112, to local repository system 172, and/or to one or more additional computing systems across network 102. Executed provisioning engine 156 may also perform any of the exemplary processes described herein to generate additional data, such as a provisioning flag, indicative of a successful provisioning of the updated replication data associated with each of the corresponding modifications, updates, or additions to reference data store 112, and to record these provisioning flags within one or more elements of a latest, longest version of notarized distributed ledger 284.

In other instances, not illustrated in FIG. 2C, notary system 132 may perform operations that establish, within the one or more tangible, non-transitory memories, a replication queue that includes discrete elements of queued notarization data and corresponding temporal data identifying and characterizing one or more of the modifications to reference data store 112 notarized subsequent to the replication of the elements of reference data within reference data store 112 to the one or more computing systems or devices within environment 100, such as, but not limited to, local repository system 172. For example, the discrete elements of notarization data may be prioritized within the replication queue based on, among other things, one or more temporal criterion (e.g., prioritizing discrete elements of notarization data in according with corresponding a temporal pendency within replication queue), one or more data-specific criterion (e.g., prioritizing discrete elements of notarization data associated with certain types of reference data, such as customer profile data, etc.), or one or more customer-specific criterion (e.g., prioritizing discrete elements of notarization data associated with commercial customers, etc.).

Executed provisioning engine 156 may, for example, access sequentially each of the queued elements of notarization data maintained within the replication queue, and perform any of the exemplary processes described herein to broadcast updated replication data identifying and characterizing corresponding ones of the modifications to reference data store 112 across network 102 to the one or more additional computing systems, including local repository system 172, in accordance with the sequential access (not illustrated in FIG. 2B). Executed provisioning engine 156 may also perform any of the exemplary processes described herein to generate additional data, such as a provisioning flag, indicative of a successful provisioning of the updated replication data associated with each of the corresponding modifications to reference data store 112, and to store these provisioning flags within the replication queue in conjunction, or association, with corresponding ones of the prioritized elements of notarization data. Executed provisioning engine 156 may also perform any of the exemplary processes described herein to record these provisioning flags within one or more elements of a latest, longest version of notarized distributed ledger 284.

Figure 2D:
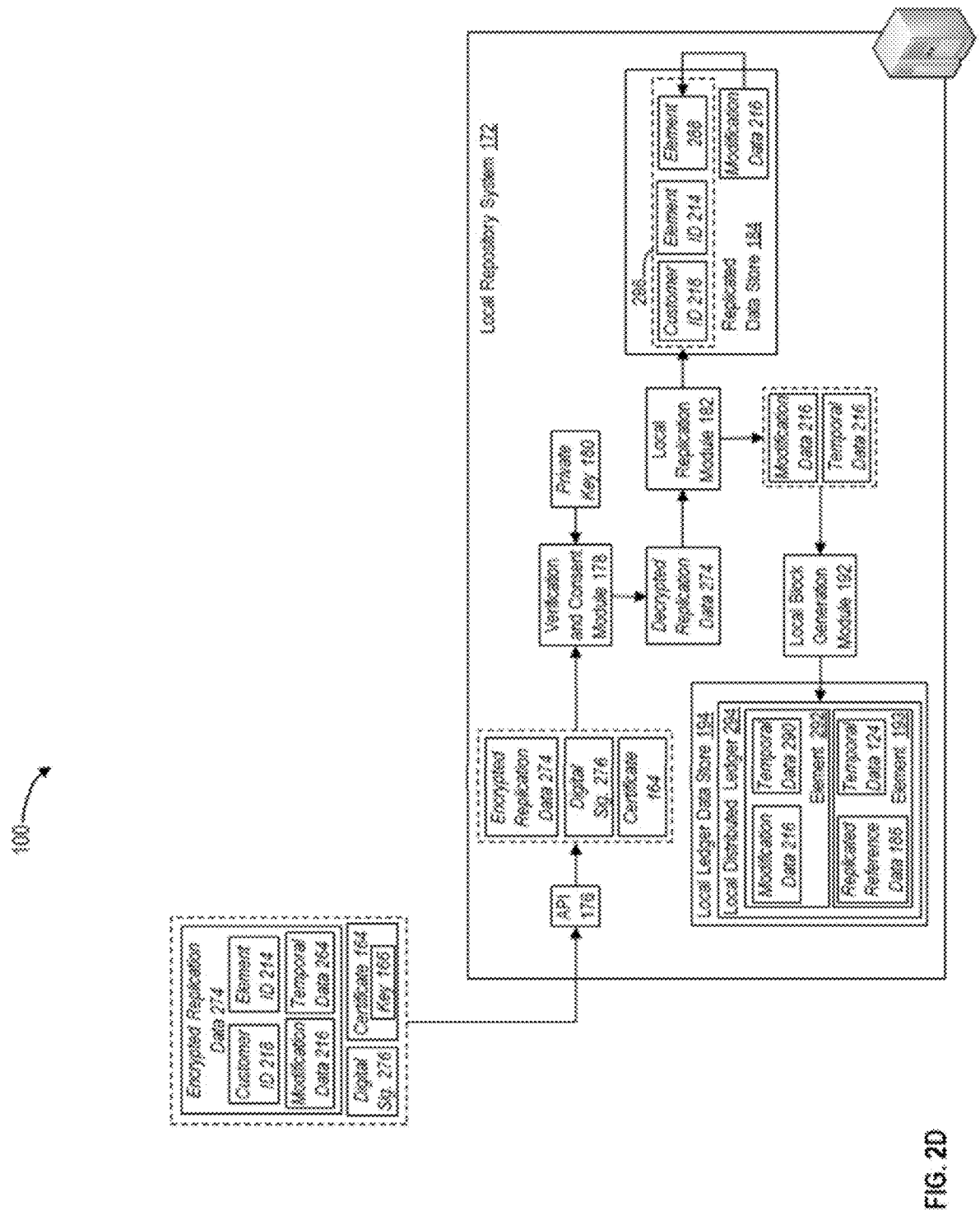

Referring to FIG. 2D, a programmatic interface established and maintained by local repository system 172, such as API 176 associated with executed SaaS application 174, may receive updated replication data 274, digital signature 276, and public key certificate 164 (which includes corresponding public cryptographic key 166), and may route updated replication data 274, digital signature 276, and public key certificate 164 to verification and consent module 178 of executed SaaS application 174. As described herein, all, or a selected portion, of replication data 274, digital signature 276, and public key certificate 164 may be encrypted (e.g., using public cryptographic key 160 associated with SaaS application 174), and executed verification and consent module 178 may perform operations that decrypt the encrypted portions of updated replication data 274, digital signature 276, and public key certificate 164 using a private cryptographic key associated with SaaS application 174, such as private cryptographic key 180.

Executed verification and consent module 178 may also perform operations that validate digital signature 276 using public cryptographic key 166, e.g., as obtained from public key certificate 164. If, for example, executed verification and consent module 178 were unable to validate digital signature 276, executed verification and consent module 178 may generate and transmit an error message characterizing the failed validation of digital signature 276 across network 102 to notary system 132, and may discard updated replication data 274, digital signature 276, and public key certificate 164.

Alternatively, if executed verification and consent module 178 were to validate successfully digital signature 276, executed verification and consent module 178 may provide decrypted replication data 274 as an input to local replication module 182 of executed SaaS application 174. In some instances, executed local replication module 182 may perform any of the exemplary processes described herein to access replicated data store 184, identify the one or more elements of replicated reference data 186 within replicated data store 184 that are referenced by updated replication data 274, and modify each of the one or more identified elements of replicated reference data 186 in accordance with updated replication data 274.

For example, executed local replication module 182 may perform operations that parse updated replication data 274 to: (i) obtain customer identifier 218, which uniquely identifies user 201 within reference data store 112; (ii) obtain element identifier 214, which identifies the element of reference data maintained within reference data store 112 and subject to modification in accordance with updated replication data 274 (e.g., the customer's telephone number); and (iii) obtain modification data 216, which includes the requested modification, update, or addition to that identified element of reference data (e.g., the updated phone number "5559876543"). Further, executed local replication module 182 may access replicated data store 184, and identify one or more data records 286 that include, or reference, customer identifier 218 and as such, include elements of reference data associated with customer 201. Executed local replication module 182 may also perform operations that parse elements of reference data associated with customer 201 (e.g., as included within data records 286), and identify an element 288 of reference data associated with element identifier 214, e.g., the locally replicated customer telephone number "5551234567."

In some instances, executed local replication module 182 may perform additional operations that modify the elements of reference data within data records 286 to replace element 288 (e.g., the locally replicated customer telephone number "5551234567") with all, or a selected portion, of modification data 216 (e.g., the updated customer telephone number "5559876543"). In some instances, the exemplary operations performed by executed local replication module 182 to access replicated data store 184, and to identify or parse one or more of data records 286, may include one or more read operations on those portions of one or more the tangible, non-transitory memories associated with replicated data store 184, and the exemplary operations performed by executed local replication module 182 to replace element 288 with the portion of modification data 216 may include one or more write operations on those portions of one or more the tangible, non-transitory memories associated with replicated data store 184.

Executed local replication module 182 may also perform operations that provide modification data 216, which includes the updated phone number of user 201 (e.g., as updated within data records 286 of replicated data store 184), and temporal data 290, which specifies at time at date at which local replication module 182 updated data records 286 to include the updated phone number, as inputs to local block generation module 192 of executed SaaS application 174. In some instances, executed local block generation module 192 may perform any of the exemplary processes described herein to generate an additional element 292 of local distributed ledger 190 that includes modification data 216 (e.g., the updated customer telephone number "5559876543") and/or information representative of the updated customer telephone number (e.g., a cryptographic or non-cryptographic hash value) and temporal data 290. In some examples, element 292 may be representative of a modified state of the replicated reference data 186 that includes the updated phone number of user 201 maintained in reference data store 112 by repository system 110. Further, executed local block generation module 192 may also perform any of the exemplary processes described herein to append additional element 292 to local distributed ledger 190, and to generate a latest, longest version of the immutable, cryptographically secure, local distributed ledger that includes additional element 292, e.g., local distributed ledger 294.

In some instances, as described herein, user 201 may access, via executed mobile banking application 204 at client device 202, one or more elements of the reference data maintained at repository system 110 within reference data store 112. User 201 may, for instance, provide input to client device 202 requesting a modification to the one or more elements of the reference data, and client device 202 may perform any of the exemplary processes described herein to generate a digitally signed request (e.g., request 220 of FIGS. 2A-2B) that reflects the modification, and to transmit the digitally signed request across network 102 to repository system 110 (e.g., the system of record for the elements of reference data) via a secure, programmatic channel of communications.

In other instances, client device 202 may execute application programs that facilitate an interaction between user 201 and one or more elements of reference data locally replicated by one or more additional or alternate computing systems within environment 100, such as replicated reference data 186 maintained within replicated data store 184 of local repository system 172. By way of example, local repository system 172 may correspond to a customer-relationship management (CRM) system executing one or more application programs, such as SaaS application 174. In some instances, when executed by the one or more processors of local repository system 172, SaaS application 174 may perform operations that receive and respond to customer-specific inquiries received from corresponding computing systems or devices (e.g., client device 202 operable by user 201) based on elements of replicated reference data 186, which establish a "local replica" of the elements of reference data maintained within reference data store 112, and which may be replicated from repository system 110 using any of the exemplary notarization processes described herein. For example, the local repository system 172 may maintain, within replicated data store 184, elements of replicated reference data 186 that collectively a "do not call" registry for customers of the financial institution, and executed SaaS application 174 may perform operations that receive and processes requests or inquiries received from the customers of the financial institution, and from representatives of the financial institution, related to the "do not call" registry.

Further, in some instances, the elements of replicated reference data 186 may include application data characterizing one or more applications for financial products or services fully or partially completed by corresponding prospective customers of the financial institution, e.g., as identified through one or more of the browser-specific PKI fingerprints described herein, one or more split portions of a customer-specific, public cryptographic key described herein, etc. Executed SaaS application 174 may perform operations that, based on requests received from corresponding customer computing devices or systems (e.g., client device 202) provision corresponding elements of partially completed application data to the customer computing devices or systems, and that process fully completed applications for the financial services or products on behalf of the financial institution. The disclosed embodiments are, however, not limited to these examples of locally replicated reference data, or to these exemplary CRM functions performed by executed SaaS application 174, and in other instances, replicated data store 184 may include any additional, or alternate, elements of reference data supporting any a performance of any additional, or alternate, CRM functionality by executed SaaS application 174.

For example, local repository system 172 may receive, across network 102 through a secure, programmatic channel of communications, one or more requests from the customer computing systems or devices to modify the elements of replicated reference data 186 maintained by local repository system 172 within replicated data store 184. In some instances, described below in reference to FIGS. 3A, 3B, 4A, and 4B, executed SaaS application 174 may perform operations that broadcast each of the requested modifications, and an applied digital signature, across network 102 to one or more of notary systems 130, including notary system 132, which may perform any of the exemplary, consensus-based notarization processes described herein to notarize each of the requested modifications, within an element of a notarized distributed ledger, to generate one or more additional elements of the notarized distributed ledger that includes data representative of the notarized modifications. One or more of notary systems 130, such as notary system 132, may also perform operations that transmit information confirming each of the notarized modifications across network 102 to repository system 110 (e.g., the system of record that maintains reference data store 112) and further, to local repository system 172 that maintains replicated data store 184.

As described herein, executed SaaS application 174 at local repository system 172 may receive the information confirming each of notarized modifications, and may modify the locally replicated elements of reference data (e.g., within replicated data store 184 of local repository system 172) in accordance with corresponding ones of the notarized modifications. Further, in some examples, one or more application programs, engines, or modules executed at repository system 110 may receive the information confirming each of notarized modifications, and may perform operations that modify accordingly the elements of reference data maintained within reference data store 112. Certain of these exemplary processes may, for example, may prevent or minimize any instances of impermissible "double updates," i.e., simultaneous requests for distinct modifications, updates, or addition to a single element of the reference data maintained within reference data store 112, and may resolve or prioritize requests to modify, update, or add to the elements of reference data received sequentially from various computing systems or devices operating within environment 100.

Figure 3A:
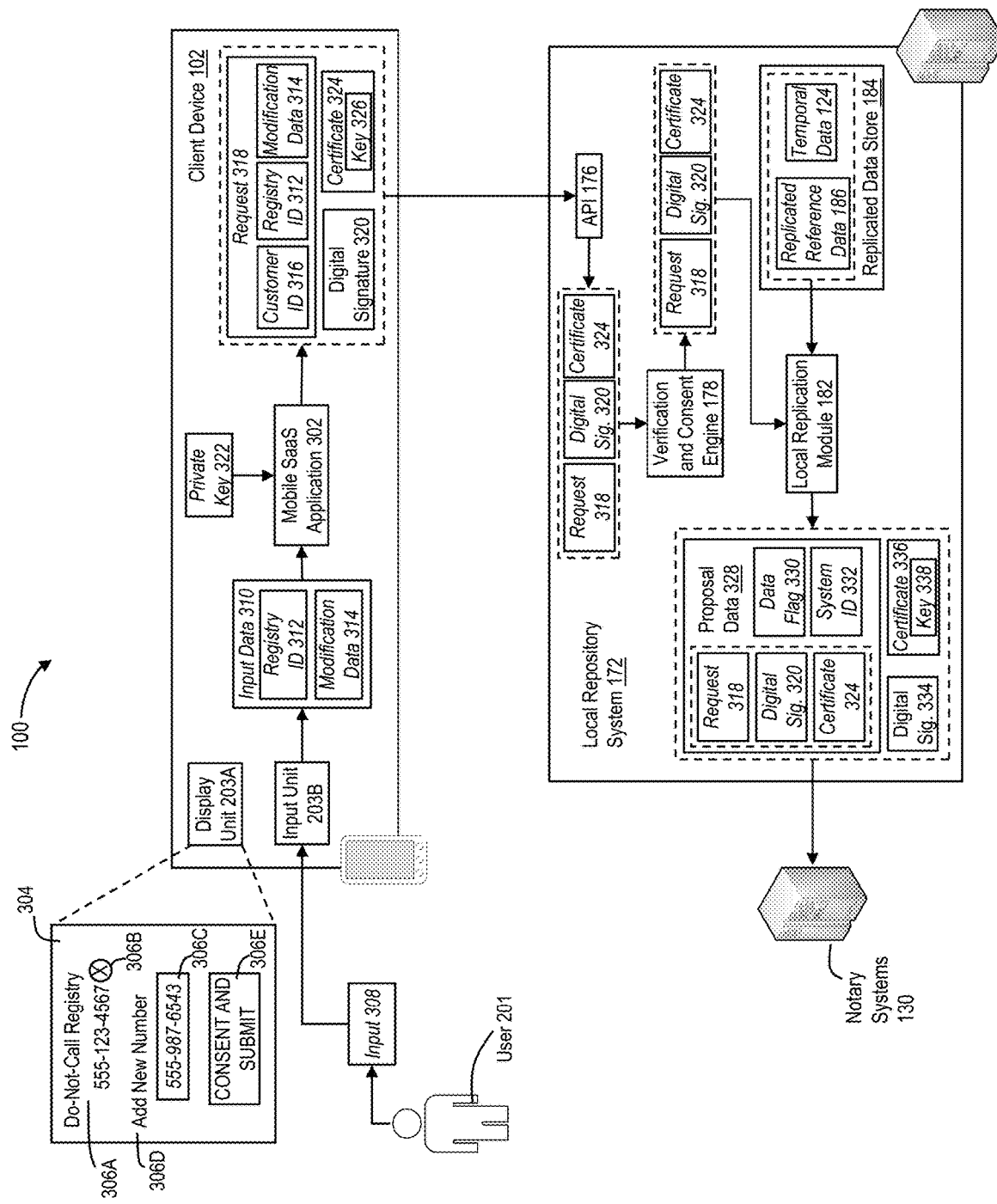

Referring to FIG. 3A, user 201 may elect to add a new customer phone number to the "do-not-call" registry established by the elements of reference data maintained within replicated data store 184 of local repository system 172. In some instances, to facilitate the addition of the customer phone number to the do-not-call registry maintained within replicated data store 184, user 201 may provide input to client device 202 (e.g., via the corresponding input unit) that requests an execution of one or more application programs associated with local repository system 172 or executed SaaS application 174, such as mobile SaaS application 302 (or alternatively, that requests an execution of a corresponding web browser). Upon execution by the one or more processors of client device 202, executed mobile SaaS application 302 (or the executed web browser) may perform operations that initiate one or more of the exemplary authentication processes described herein.

Based on a successful outcome of the authentication process, executed mobile SaaS application 302 may perform operations that cause client device 202 to establish a secure, programmatic channel of communications with local repository system 172, and further, may generate and present, within a digital interface 304, additional interface elements that enable user 201 to view, and interact with, and request a modification or addition to customer-specific portions of the do-not-call registry maintained locally within replicated data store 184. In some instances, and responsive to the successful outcome of the authentication process, executed mobile SaaS application 302 may request and receive, from local repository system 172, one or more elements of replicated reference data 186 associated with user 201 and maintained within replicated data store 184 (e.g., one or more existing phone numbers of user 201 within the do-not-call registry). Executed mobile SaaS application 302 may also perform operations that present all or a selected portion of replicated reference data 186 within digital interface 304, along with additional interface elements that prompt user 201 to provide additional input to client device 202 that updates, modifies, or adds to those portions of the do-not-call registry associated with user 201.

For example, digital interface 304 may include interface elements 306A, which identify an existing telephone number of user 201 within the do-not-call registry maintained by executed SaaS application 174 (e.g., "5551234567") and selectable interface element 306B, which upon selection by user 201, indicates an intention of user 201 to delete the existing telephone number from the do-not-call registry. Further, digital interface 304 may also include a fillable text box 306C and additional interface elements 306D, which prompt user 201 to enter an updated phone number within fillable text box 306C, e.g., for addition onto the do-not-call registry maintained by executed SaaS application 174. Digital interface 206 may also include selectable interface element 306E, which upon selection by user 201, confirms a consent of user 201 to the update to or modification of the do-not-call registry, and requests a submission of the update or modification to local repository system 172. The disclosed embodiments are, however, not limited to these exemplary interface elements, and in other instances, executed mobile SaaS application 302 may present any additional, or alternate, number or type of interface elements within digital interface 304 that would be appropriate to the received elements of replicated reference data.

As illustrated in FIG. 3A, user 201 may provide, via input unit 203B of client device 202, input 308 to digital interface 304 that specifies the updated phone number of user 201 (e.g., an input of "5559876543" within fillable text box 304C), that confirms the consent of user 201 to the addition of the updated phone number to the do-not-call list, and requests the submission of the updated phone number to local repository system 172 (e.g., responsive to a selection of selectable interface element 208E). In some instances, and in addition to, or as an alternate to, processes that confirm the consent of user 201 based on the selection of selectable interface element 208D, executed mobile SaaS application 302 may present additional interface elements within digital interface 206 (not illustrated in FIG. 3A) that prompt user 201 to consent affirmatively to the update or modification to the phone number, e.g., based on a re-entry of a password of user 201 and/or based on a successful completion of one or more in-band or out-of-band challenge processes.

Input device 203 may receive input 308, and may route corresponding elements of input data 310, which includes all or a selected portion of input 308, to executed mobile SaaS application 302. For example, input data 310 may include, but is not limited to, data that identifies the elements of reference data subject to modification, update, or augmentation by user 201, such as registry identifier 312 associated with the do-not-call registry within replicated data store 184 and reference data store 112, along with modification data 314 that specifies the requested addition to the do-not-call registry (e.g., the updated phone number "5559876543")

In some instances, executed mobile SaaS application 302 may receive input data 310, which includes registry identifier 312 and modification data 314, and may load, from the one or more tangible, non-transitory memories, at least one of the authentication credentials associated with user 201, such as customer identifier 316. Executed mobile SaaS application 302 may also perform operations that generate a request 318 to add the updated phone number (e.g., "5559876543) to the do-not-call registry within replicated data store 184, and that package customer identifier 316, registry identifier 312, and modification data 314 into corresponding portions of request 318. In some instances, not illustrated in FIG. 3A, executed mobile SaaS application 302 may also perform operations that package, within corresponding portions of request 318, one or more identifiers of client device 202 (e.g., a network address, such as an IP or MAC address) and/or of executed mobile SaaS application 302 (e.g., an application cryptogram, etc.).

Further, executed mobile SaaS application 302 may also perform any of the exemplary processes described herein to generate and apply a digital signature 320 to request 318, which includes customer identifier 316, registry identifier 312, and modification data 314, using a private cryptographic key 322 associated with executed mobile SaaS application 302 or client device 202. As illustrated in FIG. 3A, executed mobile SaaS application 302 may perform operations that cause client device 202 to transmit request 318, applied digital signature 320, and a public key certificate 324 associated with executed mobile SaaS application 302 or client device 202 (which includes a corresponding public cryptographic key 326) across network 102 to local repository system 172. Further, in some instances (not illustrated in FIG. 3A), executed mobile SaaS application 302 may also encrypt request 318, digital signature 320, and/or public key certificate 324 using a public cryptographic key associated with local repository system 172, e.g., prior to transmission across network 102 by client device 202.

A programmatic interface established and maintained by local repository system 172, such as API 176 associated with executed SaaS application 174, may receive request 318, applied digital signature 320, and a public key certificate 324, and may perform operations that route request 318, applied digital signature 320, and a public key certificate 324 to verification and consent module 178 of executed SaaS application 174. In some instances, all, or a selected portion, of request 318, applied digital signature 320, and a public key certificate 324 may be encrypted (e.g., using the public cryptographic key associated with local repository system 172), and verification and consent module 178 may decrypt the encrypted portions of request 318, applied digital signature 320, and a public key certificate 324 using a private cryptographic key associated with local repository system 172 (not illustrated in FIG. 3A).

Verification and consent module 178 may also perform operations that validate digital signature 320 using public cryptographic key 326, e.g., as obtained from public key certificate 324. If, for example, verification and consent module 178 were unable to validate digital signature 320, verification and consent module 178 may perform additional operations (not illustrated in FIG. 3A) that cause local repository system 172 to generate and transmit an error message characterizing the failed validation of digital signature 320 across network 102 to client device 202, and may discard request 318, applied digital signature 320, and a public key certificate 324.

Alternatively, if verification and consent module 178 were to validate successfully digital signature 320, verification and consent module 178 may not only authenticate the identity of executed mobile SaaS application 302 (or client device 202) and establish the integrity of the data maintained within request 318, but also confirm a consent of executed mobile SaaS application 302 to the requested addition of the updated phone number to the do-not-call registry maintained within replicated data store 184 and within reference data store 112. Based on the successful validation of digital signature 320, verification and consent module 178 may provide request 318 (which includes customer identifier 316, registry identifier 312, and modification data 314), applied digital signature 320, and a public key certificate 324 as inputs to local replication module 182 of executed SaaS application 174

As illustrated in FIG. 3A, local replication module 182 may perform operations that parse request 318 to: (i) obtain customer identifier 316 that uniquely identifies user 201 within replicated data store 184 and reference data store 112; (ii) obtain registry identifier 312 associated with the do-not-call registry within replicated data store 184 and reference data store 112; and (iii) obtain with modification data 314 that specifies the requested addition to the do-not-call registry, e.g., the updated phone number "5559876543." Further, local replication module 182 may also perform operations that access replicated data store 184, and obtain temporal data 124 associated with the one or more elements of replicated reference data 186. As described herein, temporal data 124 may specify the particular time or date at which local repository system 172 received elements of replicated reference data 186 from the one or more of notary systems 130 and store the received elements of replicated reference data 186 within replicated data store 184.

Based on temporal data 124, local replication module 182 may perform operations that determine whether replicated reference data 186 reflects a "current" composition of reference data store 112 and as such, represent a "current" snapshot of the reference data maintained within reference data store 112. For example, local replication module 182 may determine a temporal interval between a current time or date (e.g., as determined by executed SaaS application 174) and the corresponding time or date specified within obtained temporal data 124 (e.g., associated with the replicated reference data 186). In some instances, local replication module 182 may establish that the one or more elements of replicated reference data 186 reflect the current composition of reference data store 112 (and as such, represent the current snapshot of reference data store 112) when the determined temporal interval fails to exceed a threshold interval.

If, for example, local replication module 182 were to establish that the determined temporal interval exceeds the threshold time period, executed SaaS application 174 may determine that the one or more elements of replicated reference data 186 maintained within replication data store 184 no longer reflect the current composition of reference data store 112. Based on the determination that the one or more elements of replicated reference data 186 fail to reflect the current composition of reference data store 112, executed SaaS application 174 may perform operations (not illustrated in FIG. 3A) that generate a request for additional elements of replication data representative of the current composition of reference data store 112, and that cause local repository system 172 to transmit the generated request across network 102 to repository system 110. As described herein, repository system 110 may receive the generated request, and in response to the receipt of the generated request (e.g., a detected occurrence of a corresponding replication event), perform operations that initiate a replication of the elements of reference data currently maintained within reference data store 112.

Alternatively, if local replication module 182 were to establish that the determined temporal interval fails to exceed the threshold time period, executed SaaS application 174 may determine that replicated reference data 186 reflects the current composition of reference data store 112 and as such, represent the current snapshot of reference data store 112. In response to the determination that replicated reference data 186 reflects the current composition of reference data store 112, local replication module 182 may perform operations that generate one or more elements of proposal data 328 that identify and characterize the requested addition of the updated phone number to the do-not-call list maintained within replication data store 184. In some instances, the elements of proposal data 328 may include request 318 (e.g., that includes customer identifier 316, registry identifier 312, and modification data 314 (e.g., the updated phone number "5559876543"), digital signature 320, and public key certificate 324.

Further, proposal data 328 may also include additional data, such as data flag 330, that identifies a data type or characteristic associated with the requested addition, e.g., the updated phone number specified within modification data 314. Further, local replication module 182 may also package, into corresponding portions of proposal data 328, a system identifier 332 associated with local repository system 172, such as, but not limited to, a network address of local repository system 172 (e.g., an IP address, a MAC address, etc.) or an application cryptogram associated with executed SaaS application 174. The disclosed embodiments are, however, not limited to these examples of proposal data 328, and in other instances, proposal data 328 may include any additional or alternate data identifying or characterizing a requested, approved, or implemented modification to the existing elements of reference data maintained within reference data store 112, and replicated locally within replicated data store 184.

Using any of the exemplary processes described herein, local replication module 182 also generate and apply a digital signature 334 to proposal data 246 using a private cryptographic key associated with local repository system 172, such as private cryptographic key 180. Local replication module 182 may also perform operations that cause local repository system 172 to broadcast proposal data 328, digital signature 334, and a public key certificate 336 associated with local repository system 172 or executed SaaS application 174 (e.g., that includes a corresponding public cryptographic key 338) across network 102 to one or more of notary systems 130, including notary system 132. Further, in some instances (not illustrated in FIG. 3A), local replication module 182 may also encrypt proposal data 328, digital signature 334, and/or public key certificate 336 using a public cryptographic key associated with one or more of notary systems 130, e.g., prior to transmission across network 102 by local repository system 172.

In some instances, and as described herein, the generation and application of digital signature 334 to proposal data 328 may enable one or more of notary systems 130, such as notary system 132, to perform operations that, based on a validation of digital signature 334, authenticate an identity of local repository system 172 or executed SaaS application 174, and further, establish an integrity of the data maintained within proposal data 328. In other instances, the generation and application of digital signature 334 to proposal data 328 may be indicative of an approval, of a consent, of executed SaaS application 174 (and as such, of local repository system 172) to requested addition of the updated phone number to the do-not-call registry maintained within replication data store 184 at local repository system 172.

Figure 3B:
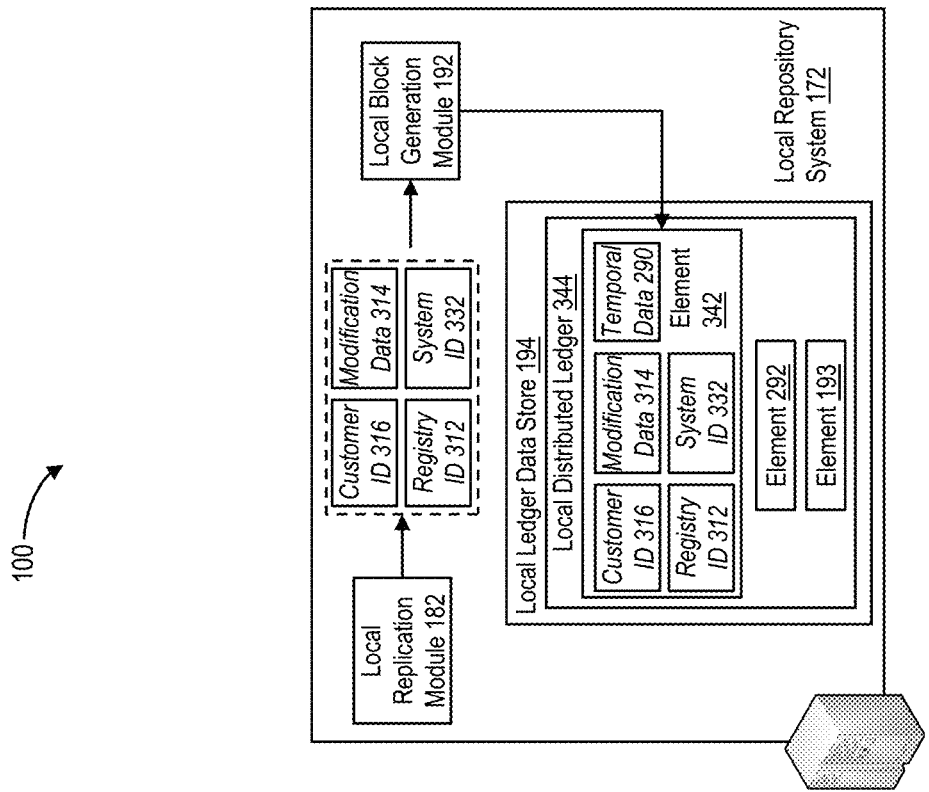

Referring to FIG. 3B, local replication module 182 may also perform operations that provide modification data 314 (e.g., the updated phone number "5559876543"), customer identifier 316, data flag 330, and temporal data 340 identifying a time or date associated with the requested addition to the do-not-call registry as inputs to local block generation module 192 of executed SaaS application 174. In some instances, executed local block generation module 192 may perform any of the exemplary processes described herein to generate an additional element 342 of local distributed ledger 294 that includes customer identifier 316 and the requested addition to the do-not-call registry (e.g., the updated customer telephone number "5559876543," as included within modification data 314) and additionally, or alternatively, information representative of the updated customer telephone number, such as a cryptographic or non-cryptographic hash value. Additional element 342 may also include temporal data 340 and data flag 330, and in some examples, may be representative of a modified state of the replicated reference data 186 that includes the requested addition to the do-not-call registry maintained in reference data store 112 by repository system 110. Executed local block generation module 192 may also perform any of the exemplary processes described herein to append additional element 342 to local distributed ledger 294 and to generate a latest, longest version of the immutable, cryptographically secure, local distributed ledger that includes additional element 342, e.g., local distributed ledger 344.

Figure 4A:
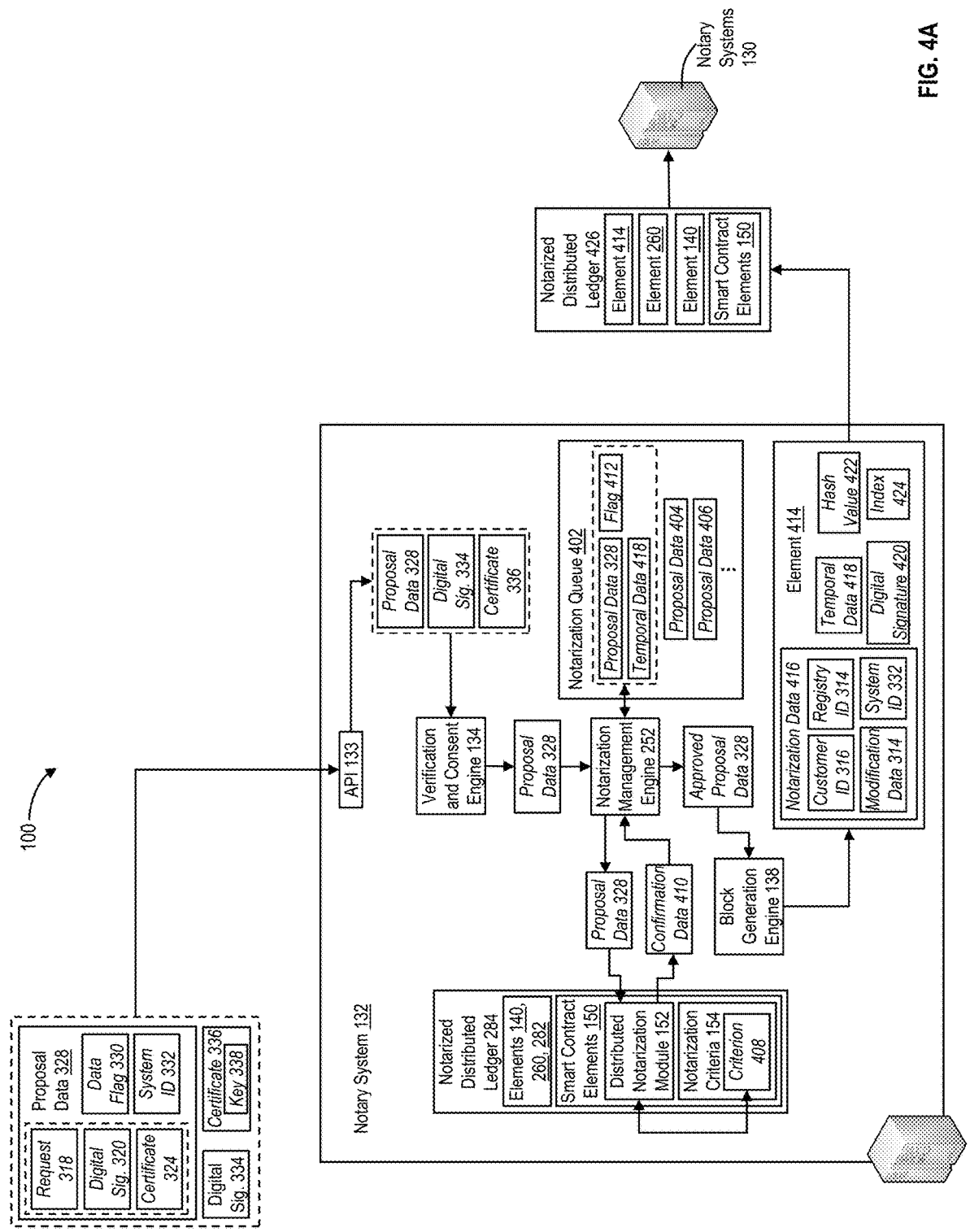

Referring to FIG. 4A, a programmatic interface established and maintained by each of the one or more of notary systems 130, such as API 133 of notary system 132, may receive proposal data 328, digital signature 334, public key certificate 336 (which include corresponding public cryptographic key 338) from local repository system 172, and may route proposal data 328, digital signature 334, and public key certificate 336 to executed verification and consent engine 134. As described herein, proposal data 328 may include, among other things, request 318, which corresponds to the request to add the updated phone number of user 201 (e.g., "5559876543") to the do-not call registry maintained locally within replicated data store 184, and as further maintained within reference data store 112. Further, and as described herein, proposal data 328 may also include, but is not limited to, digital signature 320 applied to request 318 by executed mobile SaaS application 302, public key certificate 324 associated with mobile SaaS application 302 (including corresponding public cryptographic key 326), data flag 330 indicative of the requested additional of the updated phone number to the do-not-call registry, and identifier 332 associated with local repository system 172, such as an IP or MAC address.

As described herein, request 318 may be generated by mobile SaaS application 302 executed by client device 202, (e.g., based on input provisioned by user 201), and approved by executed SaaS application 174. In some instances, request 318 may include, among other things, customer identifier 316 that uniquely identifies user 201 within reference data store 112 and replicated data store 184, registry identifier 312 associated with the do-not-call registry within reference data store 112 and replicated data store 184, and modification data 314 that specifies the requested addition to the do-not-call registry (e.g., the updated phone number "5559876543"). The disclosed embodiments are, however, not limited to these exemplary components of proposal data 328, and in other instances, proposal data 328 may include any additional or alternate elements of data that identify and characterize a proposed modification of, update to, or addition to the elements of reference data maintained within replicated data store 184 and reference data store 112, or that establish an approval or consent of local repository system 172 and/or executed mobile SaaS application 302 to the proposed modification, or that establish an approval or a consent of executed mobile SaaS application 302 to the requested modification.

Executed verification and consent engine 134 may receive proposal data 328, digital signature 334, and public key certificate 336, and in some instances, may perform operations (not illustrated in FIG. 4A) that decrypt the encrypted portions of proposal data 328, digital signature 334, and public key certificate 336 using a private cryptographic key associated with notary systems 130, such as private cryptographic key 137 of notary system 132. Further, executed verification and consent engine 134 may also perform operations that validate digital signature 334 using public cryptographic key 338 (e.g., as obtained from public key certificate 336), and based on a successful validation of digital signature 334, executed verification and consent engine 134 may authenticate an identity of local repository system 172, and further, establish an integrity of the data maintained within proposal data 328. In some instances, a successful validation of digital signature 334 by executed verification and consent engine 134 may also be indicative of an approval, of a consent, of local repository system 172 or executed SaaS application 174 to the requested addition of the updated phone number to the do-not-call registry maintained by replicated data store 184.

Additionally or alternatively, executed verification and consent engine 134 may also parse proposal data 328 to obtain request 318, digital signature 320, and public key certificate 324 of executed SaaS application 302 or client device 202, and may perform additional operations that validate digital signature 320 using public cryptographic key 326, e.g., as obtained from public key certificate 324. In some instances, and through a successful validation of applied digital signature 320, applied digital signature 222 may not only authenticate an identity of executed SaaS application 302 (and as such, or client device 202) and establish an integrity of request 318, but also confirm an approval of, and a consent to, requested additional of the updated phone number to the do-not-call registry by executed mobile SaaS application 302, which generated request 318 in response to input from user 201.

If, for example, executed verification and consent engine 134 were unable to validate digital signature 334 or were unable to validate digital signature 320, notary system 132 (and additional, or alternate, ones of notary systems 130) generate and transmit an error message characterizing the failed validation across network 102 to local repository system 172, and may discard proposal data 328, digital signature 334, and public key certificate 336. In other examples, and based on the successful validation of digital signature 334 (and additionally, or alternatively, of digital signature 320), executed verification and consent engine 134 may perform operations that provide proposal data 328 as an input to notarization management engine 252 of notary system 132 (and of additional, or alternate, ones of notary systems 130). When executed by the one or more processors of notary system 132 (and each additional, or alternate, one of notary systems 130), notarization management engine 252 may perform operations that store proposal data 328 within a portion one or more tangible, non-tangible memories or notary system 132, e.g., within a portion of a notarization queue 402 maintained within notary data store 136. In some instances, notarization queue 402 may maintain one or more additional elements of proposal data awaiting notarization through any of the exemplary, consensus-based notarization processes described herein, such as, but not limited to, pending proposal data 404 and 406 of FIG. 4A.

Each of the queued elements of pending proposal data maintained within notarization queue 402, including pending proposal data 404 and pending proposal data 406, may be associated with a corresponding modification to the elements of reference data maintained within reference data store 112, and may be generated by repository system 110, by local repository system 172 executing SaaS application 174, or by one or more additional computing systems using any of the exemplary processes described herein. Further, although not illustrated in FIG. 4A, each of the pending elements of proposal data maintained within notarization queue 402 may include a unique identifier of a customer associated with the corresponding modification, update, or addition (e.g., customer identifier 316 of proposal data 328), data identifying or characterizing the corresponding modification, update, or addition (e.g., registry identifier 312, modification data 314, or data flag 330 identifying or characterizing the addition of the updated customer phone call of the do-not-call registry, as included within proposal data 328), and data that identifies the computing system or device within environment 100 that requested notarization of the corresponding modification, update, or addition (e.g., identifier 332 associated with local repository system 172, as included within proposal data 328).

In some instances, executed notarization management engine 252 may also perform operations that prioritize each of the elements of pending proposal data maintained within notarization queue 402 (including proposal data 328, pending proposal data 404, and pending proposal data 406) in accordance with one or more temporal, data-specific, or system specific prioritization factors. For example, executed notarization management engine 252 may perform operations that determine, for each of the queued elements of pending proposal data, a period of pendency within notarization queue 402 (e.g., based on temporal data stored in conjunction with the elements of pending proposal data in notarization queue 402, etc.), and that prioritize the queued elements of pending proposal data based on the determined pendency periods, e.g., the element of pending proposal data associated with a maximum pendency period may be prioritized within notarization queue 402, etc.

In other examples, executed notarization management engine 252 may perform operations that prioritize the queued elements of pending proposal data based on, among other things, a particular element of reference data associated with the corresponding modification, a particular modification type, the computing system or device that requested the corresponding modification, update, or addition, or any additional, or alternate, prioritization factor appropriate to the queued elements of pending proposal data. For instance, and in addition to, or as an alternate to, the temporal prioritization described herein, executed notarization management engine 252 may also prioritize the queued elements of pending proposal data generated by repository system 110 (e.g., that maintains reference data store 112) above those queued elements of pending proposal data generated by other computing systems or devices operating within environment 100 (e.g., local repository systems 172, etc.).

Referring back to FIG. 4A, executed notarization management engine 252 may perform operations that load, from the one or more tangible, non-transitory memories of notary system 132, the latest, longest version of the notarized distributed ledger, e.g., notarized distributed ledger 272. As described herein, notarized distributed ledger 272 may include smart contract elements 150, which include (e.g., record) one or more elements of executable code, code modules, or application programs, such as distributed notarization module 152, along with corresponding elements of supporting data, such as notarization criteria 154. In some instances, executed notarization management engine 252 may perform operations that access smart contract elements 150 of notarized distributed ledger 272, and that trigger an execution of distributed notarization module 152 by the one or more processors of notary system 132, e.g., via a corresponding programmatic call, etc. Further, executed notarization management engine 252 may select one of the queued and prioritized elements of pending proposal data maintained within notarization queue 402, such as proposal data 328, and may provide proposal data 328 as an input to executed distributed notarization module 152.

As described herein, the elements of code or software instructions and supporting data, including distributed notarization module 152 and notarization criteria 154, may collectively establish a distributed notarization contract within notarized distributed ledger 272. In some instances, the distributed notarization contract may establish one or more conditions that, when applied to proposal data 328 by one or more of notary systems 130 (including notary system 132) through any of the exemplary consensus-based processes described herein, indicate whether the one or more of notary systems 130 should: (i) approve the requested addition of the updated phone number to the do-not-call registry maintained within reference data store 112 (e.g., by repository system 110 acting as the system of record) and record data representative of the approved addition within an additional element of notarized distributed ledger 272 (e.g., collectively, to notarize the requested addition of the updated phone number to the do-not-call registry); or, alternatively, (ii) reject the requested addition and notify the requesting computing system or device within environment 100 that requested the addition, e.g., local repository system 172. Through certain of these exemplary, consensus-based processes, the implementation of the distributed notarization contract may prevent or minimize any instances of impermissible "double updates," i.e., simultaneous requests for distinct modifications, updates, or additions to a single element of the reference data maintained within reference data store 112, and may resolve or prioritize requests to modify the elements of reference data store 112 received sequentially from computing systems or devices operating within environment 100.

Referring back to FIG. 4A, executed distributed notarization module 152 may receive proposal data 328, and may parse proposal data 328 and obtain customer identifier 316 of user 201, registry identifier 312 associated with the do-not-call registry, and modification data 314 that specifies the requested addition to the do-not-call registry (e.g., the updated phone number "5559876543"). Executed distributed notarization module 152 may also obtain, from proposal data 328, data flag 330 indicative of the requested addition of the updated phone number to the do-not-call registry and identifier 332 associated with local repository system 172, such as an IP or MAC address of local repository system 172 or the application cryptogram associated with executed SaaS application 174.

Executed distributed notarization module 152 also access notarization criteria 154, e.g., as maintained within smart contract elements 150 of notarized distributed ledger 272. Based on one or more of extracted customer identifier 316, extracted registry identifier 312, extracted modification data 314, extracted data flag 330, or extracted identifier 332, executed distributed notarization module 152 select one or more of the discrete notification criteria, such as criterion 408, associated with proposal data 328 and as such, applicable to the notarization of the requested addition of the updated phone number to the do-not call registry.

For example, selected criterion 408 may include an application cryptogram (or other element of cryptographic data) associated with executed SaaS application 174, or a network address associated with local repository system 172 (e.g., an IP or a MAC address), and based on a determined correspondence between extracted identifier 332 and the application cryptogram or network address included within criterion 408, executed distributed notarization module 152 may establish an applicability of criterion 408 to the requested addition of the updated phone number to the do-not-call registry. The disclosed embodiments are, however, not limited to processes that select criterion 408 based on an identity of local repository system 174 or executed SaaS application 174. In other instances, selected criterion 408 may also include additional information that associates criterion 408 with a particular customer (e.g., user 201), a particular element or particular elements of reference data (e.g., the customer phone number, the do-not-call registry, etc.), or with a particular operation on that element or those elements of reference data (e.g., the requested addition, etc.). Based on a determined correspondence between the additional information and a corresponding one, or more, of extracted customer identifier 316, registry identifier 312, and extracted data flag 330, executed distributed notarization module 152 may establish an applicability of criterion 408 to the requested addition of the updated phone number to the do-not-call registry.

As illustrated in FIG. 4A, executed distributed notarization module 152 may perform operations that obtain selected criterion 408 from notification criteria 154. Based on an application of selected criterion 408 to portions of proposal data 328, notary system 132 (and additional, or alternate, ones of notary systems 130) to perform any of the consensus-based operations described herein to: (i) approve the requested addition of the updated phone number to the do-not-call registry and generate an additional element of notarized distributed ledger 272 that includes information representative of the approved addition (e.g., to "notarize" the requested addition of the updated phone number to the do-not-call registry); or alternatively, (ii) reject the requested addition of the update phone number to the do-not-call registry and to transmit notification data indicative of the rejected addition to local repository system 172, e.g., for ingestion by executed SaaS application 174 and provisioning to client device 202.

For example, executed distributed notarization module 152 may parse selected criterion 408 to identify and obtain one or more elements of permissioning data, which indicate a permission granted to executed SaaS application 174, or local repository system 172, to modify all, or a selected portion of the elements of reference data maintained within reference data store 112, e.g., those elements associated with the do-not-call registry, In some instances, and based on registry identifier 312, data flag 330, and/or identifier 332 extracted from proposal data 328, executed distributed notarization module 152 may determine that proposal data 328 corresponds to an addition to the do-not-call registry requested by local repository system 172 (or executed SaaS application 174). Further, based on portions of permissioning data, executed distributed notarization module 152 may also determine that local repository system 172 (or executed SaaS application 174) is permitted to modify the do-not-call registry maintained within reference data store 112, and executed distributed notarization module 152 may approve the requested addition of the updated phone number to the do-not-call registry. As illustrated in FIG. 4A, executed distributed notarization module 152 may generate confirmation data 410 indicative of the approved modification, and may perform operations that route confirmation data 410 back to executed notarization management engine 252.

In other instances, selected criterion 408 may also include one or more elements of the conditional data, which identify and characterize one or more conditions imposed upon, or associated with, the notarization of the requested addition of the updated phone number to the do-not-call registry, e.g., as characterized by proposal data 328. As described herein, and based on the application of the one or more conditions to portions of proposal data 328, to one or more of the queued elements of pending proposal data within notarization queue 402, and additionally, or alternatively, to one or more of the elements of notarized distributed ledger 284, executed distributed notarization module 152 may determine to approve and notarize, or to reject, the requested addition of the updated phone number to the do-not-call registry, and to generate and route confirmation data, e.g., confirmation data 410, indicative of the approval and notarization, or the rejection, back to executed notarization management engine 252.

For example, the conditional data may include information that conditions the notarization of the requested addition of the updated phone number to the do-not-call registry on a determination, by executed distributed notarization module 152, that the requested additional conflicts with neither: (i) a previously requested modification to the existing elements of reference data maintained within reference data store 112; nor (ii) a previously notarized modification to the existing elements of reference data maintained within reference data store 112. In some instances, and in accordance with the conditional data, executed distributed notarization module 152 may perform operations that access notarization queue 402, and parse each of the queued elements of pending proposal data (e.g., pending proposal data 404, pending proposal data 406, etc.) to determine whether one or more of the queued elements of pending proposal data include a customer identifier that references user 201 or other information that references the do-not-call registry maintained within reference data store 112 (e.g., a corresponding registry identifier, etc.). Further, in accordance with the conditional data, executed distributed notarization module 152 may also perform operations the access one or more elements recorded onto notarized distributed ledger 284 (e.g., elements 260 and 282, as described herein, etc.), and that parse each of the accessed elements to determine whether any of the accessed elements include notarization data referencing user 201 (e.g., a corresponding customer identifier, etc.) and the do-not-call registry maintained within reference data store 112 (e.g., a corresponding registry identifier, etc.).

In some examples, executed distributed notarization module 152 may determine that none of the queued elements of pending proposal data within notarization queue 402 reference portions of do-not-call registry associated with user 201, and additionally, or alternatively, that none of the additional recorded elements of notarized distributed ledger 284 reference the portions of do-not-call registry associated with user 201. Based on this determination, executed distributed notarization module 152 may establish that the requested addition of the updated phone number to the do-not-call registry, as specified within proposal data 328, fails to represent an impermissible instance of a "double modification" that conflicts with previously requested modifications to the do-not-registry maintained within reference data store 112. In some instances, and in accordance with the conditional data, executed distributed notarization module 152 may approve the requested addition of the updated phone number to the do-not-call registry, and may generate and route confirmation data, e.g., confirmation data 410, back to executed notarization management engine 252.

Alternatively, and based on the parsing of the queued elements of pending proposal data within notarization queue 402, or on the parsing of the additional recorded elements of notarized distributed ledger 284, executed distributed notarization module 152 may confirm that at least one of the queued elements of pending proposal data or the additional recorded elements reference the portions of do-not-call registry associated with user 201. In some examples, and consistent with the conditional data, executed distributed notarization module 152 may establish that the requested addition of the updated phone number to the do-not-call registry, as specified within proposal data 328, represents an impermissible instance of a "double modification" that conflicts with previously requested, or notarized, modifications to the do-not-registry, and executed distributed notarization module 152 may reject the requested addition of the updated phone number to the do-not-call registry. In some instances, executed distributed notarization module 152 generate and route confirmation data, e.g., confirmation data 410, back to executed notarization management engine 252.

In other examples, the conditional data may also include one or more temporal conditions that, when applied to proposal data 328 and to the at least one of the queued elements of pending proposal data or the additional recorded elements that reference the portions of do-not-call registry associated with user 201, enable executed distributed notarization module 152 to approve and notarize, or alternatively, reject, the requested addition of the updated phone number to the portions of the do-not-call registry associated with user 201 despite the existence of the previously requested, or notarized, modifications to the do-not-registry. For instance, the conditional data may specify that the requested addition of the updated phone number to the do-not-call registry does not represent an impermissible "double modification" when, among other things, a temporal interval between (i) a time of date associated with the requested addition (e.g., as included within proposal data 328) and (ii) a time or date associated with each of the queued elements of pending proposal data or the additional recorded elements that reference the portions of do-not-call registry associated with user 201 exceeds a predetermined temporal interval.

For instance, and through any of the exemplary processes described herein, executed distributed notarization module 152 may establish an additional recorded element of notarized distributed ledger 284 includes notarization data that references the portions of do-not-call registry associated with user 201, and that the notarization data characterizes a modification notarized seventy-two hours prior to the generation of proposal data 328 by executed SaaS application 174 (e.g., based on temporal data within the additional recorded element and on corresponding portions of proposal data 328). Further, in some instances, executed distributed notarization module 152 may parse the conditional data to obtain the predetermined temporal interval associated with the requested addition to the do-not-call registry, e.g., twenty-four hours.

Based on a determination that the seventy-two-hour interval between the generation of proposal data 328 and the notarization of the previously requested modification exceeds the predetermined temporal interval (e.g., the twenty-four-hour interval), executed distributed notarization module 152 may establish that the requested addition of the updated phone number to the do-not-call registry does not represent an impermissible "double modification" to reference data store 112, and may perform any of the exemplary processes described herein to approve the requested addition and route one or more elements of confirmation data back to executed notarization management engine 252. In other instances, and based on a determination that the predetermined temporal interval exceeds the interval between the generation of proposal data 328 and the notarization of the previously requested modification, executed distributed notarization module 152 may reject the requested addition to the do-not-call registry (e.g., as an instance of an impermissible "double modification" to the do not call registry), and route one or more additional elements of confirmation data back to executed notarization management engine 252.

The conditional data may also specify one or more velocity conditions that, among other things, impose limitations on a number of modifications to a particular element of the reference data during a predetermined temporal interval, or impose limitations on a number of modifications requested by a particular computing device or system within environment 100 (e.g., local repository system 172, etc.) during that predetermined temporal interval. For instance, the conditional data may include, for the particular element of the reference data, or for the particular computing device or system, the predetermined temporal interval and a maximum number of modifications permitted during that prior temporal interval. Examples of the prior temporal interval may include, but are not limited to, one hour, twenty-four hours, one week, or any additional or alternate temporal interval appropriate to the particular element of the reference data to for the particular computing device or system.

In some instances, and based on the parsing of the queued elements of pending proposal data within notarization queue 402, or on the parsing of the additional recorded elements of notarized distributed ledger 284, executed distributed notarization module 152, executed distributed notarization module 152 may determine a number of prior modifications to the portion of the do-not-call registry associated with user 201 that were requested by local repository system 172 (e.g., via executed SaaS application 174) during the predetermined temporal interval, or alternatively, that were approved and notarized during the predetermined temporal interval.

Further, executed distributed notarization module 152 may also determine whether the addition of the updated phone number to the portions of the do-not-call registry associated with user 201, as specified within proposal data 328, would increase a total number of modifications during the predetermined temporal interval beyond the maximum number of permitted modifications to that portion of the do-not-call registry, or alternatively, the maximum number of modifications requested by local repository system 172. Based on this determination, executed distributed notarization module 152 may perform operations, consistent with the conditional data, that approve and notarize the requested addition (e.g., when the total number of modification fail to exceed the maximum number of permitted and/or requested modifications) or that reject the requested addition (e.g., when the total number of modification exceeds the maximum number of permitted and/or requested modifications).

As described herein, notarization queue 402 may include multiple, queued elements of pending proposal data that reference the portions of do-not-call registry associated with user 201, such as, but not limited to, proposal data 328 and one or more additional queued elements of pending proposal data. Additionally, and as described herein, proposal data 328 may be associated with the requested additional of the updated phone number of user 201 to the do-not call registry, and each of the one or more additional elements of pending proposal data may be associated with a corresponding modification to the portions of the do-not-call registry associated with user 201. In some examples, executed distributed notarization module 152 may perform operations that determine an impact of the requested modification, update, or addition associated with proposal data 328 and with each of the additional queued elements on those portions of the do-not-call registry associated with user 201 (e.g., on a status of user 201 within the do-not-call registry).

Based on these determined impacts, and in accordance with the conditional data, executed distributed notarization module 152 may perform further operations that approve and notarize, or reject, the requested addition of the update customer number to the do-not-call registry. In some instances, and consistent with the conditional data, executed distributed notarization module 152 may elect to approve the notarization of the requested addition of the update customer number to the do-not call registry (e.g., as specified by proposal data 328) when that the requested addition is associated with a minimal, or least restrictive, impact on the status of user 201 within the do-not-call registry, e.g., in comparison with the determined impacts of the requested modifications referenced by the additional queued elements of pending proposal data.

For example, notarization queue 402 may include an additional queued element of pending proposal data (not illustrated in FIG. 4A) that references a requested deletion of a phone number of user 201 from the do-not call registry maintained within reference data store 112, and in some instances, and consistent with the conditional data, executed distributed notarization module 152 may determine that requested deletion of the existing phone number of user 201 is associated with a greater impact of the status of user 201 within the do-not-call registry than the requested addition of the updated customer number, as specified by proposal data 328. As such, executed distributed notarization module 152 may establish that the requested addition is associated with a minimal, or least restrictive, impact on the status of user 201 within the do-not-call registry, and may perform any of the exemplary processes described herein to approve the notarization of the requested addition and to route confirmation data indicative of the approved notarization back to executed notarization management engine 252.

The disclosed embodiments are, however, not limited to these exemplary processes for approving and notarizing proposed modifications, updates, or additions to the elements of reference data maintained within reference data store 112, including but not limited to, the elements of confidential profile data associated with user 201 or those portions of the do-not-call registry associated with user 201, as described herein. In other examples, executed distributed notarization module 152 may perform any additional, or alternate, operations that, consistent with permissioning data, the conditional data, or other elements to supporting data within smart contract elements 150, approve and notarize, or reject, the requested modification, addition, or update to the elements of confidential data specified within proposal data 246, proposal data 328, or other elements of proposal data broadcast to notary systems 130 by repository system 110 or local repository system 172.

Referring back to FIG. 4A, executed notarization management engine 252 may receive, from executed distributed notarization module 152, one or more elements of confirmation data 410 indicative of an approval and notarization, or a rejection, of the requested addition of the update customer number to those portions of the do-not-call registry associated with 201. In some instances, executed notarization management engine 252 may process confirmation data 410 and determine that distributed notarization module 152 rejected the requested addition, e.g., using any of the exemplary processes described herein. In response to the determined rejection, executed notarization management engine 252 may perform operations (not illustrated in FIG. 4A) that cause notary system 132 (or additional, or alternate, ones of notary system 30) to delete proposal data 328 from notarization queue 402, and to generate and transmit an error message across network 102 to local repository system 172, which may receive the error message through a corresponding programmatic interface, such as API 176.

In some instances, at local repository system 172, executed local block generation module 192 may perform any of the exemplary processes described herein to generate an additional element of local distributed ledger 344 that includes the error message, and to generate a latest, longest version of local distributed ledger 344 that includes the additional element (not illustrated in FIG. 4A. In some instances, the recordation of the additional element onto the updated version of local distributed ledger 344 may, in conjunction with previously recorded element 342 (e.g., that characterizes the requested addition of the updated customer number to the portions of the do-not-call registry associated with user 101) establish a cryptographically secure and immutable audit trail for the requested addition and the subsequent rejection of that requested addition. Local repository system 172 may also perform operations that route the error message across network 102 to client device 202, e.g., for presentation within digital interface 304 by executed mobile SaaS application 302 or by the executed web browser (also not illustrated in FIG. 4A).

In other examples, illustrated in FIG. 4A, executed notarization management engine 252 may process confirmation data 410 and determine that distributed notarization module 152 approved the requested addition, e.g., using any of the exemplary processes described herein. In response to the determined approved, executed notarization management engine 252 may perform operations that generate a notarization flag 412 indicative of the approved notarization of the requested addition (e.g., a value of unity, etc.) and that store notarization flag 412 within a corresponding portion of notarization queue 402, e.g., in associated with proposal data 328. Further, and based on the approval of the requested addition associated with proposal data 328, executed notarization management engine 252 may provide all, or a selected portion, of proposal data 328 as an input to executed block generation engine 138. In some instances, executed block generation engine 138 may perform any of the exemplary, consensus-based processes described herein to generate an additional element 414 of notarized distributed ledger 284 that includes (e.g., records) data representative of the notarized addition of the updated customer number to the portions of the do-not-call registry maintained within reference data store 112 (e.g., as associated with proposal data 328), to append additional element 414 to notarized distributed ledger 284, and to generate a latest, longest version of notarized distributed ledger 272, e.g., notarized distributed ledger 426.

As illustrated in FIG. 4A, additional element 414 may include, among other things, notarization data 416 that identifies, and characterizes, the notarized addition of the updated customer number to the do-not-call registry maintained within reference data store 112. For example, notarization data 416 may include the now-notarized addition to the do-not-call registry (e.g., the updated phone number of user 201, "5559876543," as specified within modification data 314) and additionally, or alternatively, data representative of the notarized addition, which as, but not limited to, a cryptographic or non-cryptographic hash value. Additional element 414 may also include, among other things, customer identifier 316, registry identifier, and system identifier 332 that uniquely identifies local repository system 172 or executed SaaS application 174, and temporal data 418, which specifies a time or date associated the approval of the notarized addition (e.g., by executed distributed notarization module 152) and/or the generation of additional element 414 (e.g., by executed block generation engine 138). Further, although not illustrated in FIG. 4A, executed block generation engine 138 or executed notarization management engine 252 (e.g., based on input from executed block generation engine 138) may store temporal data 418 within of notarization queue 402, e.g., in associated with proposal data 328 and notarization flag 412.

Executed block generation engine 138 (and the block generation engine executed by additional ones of notary systems 130) may also perform any of the exemplary processes described herein to generate and apply a digital signature 420 to all, or a selected portion, of notarization data 416 and temporal data 418, and to generate a hash value 422 based on an application of one or more appropriate hash algorithms to notarization data 416, temporal data 418, and digital signature 420 (and in some instances, to other elements of notarized distributed ledger 272, such as a hash value representative included within a previously recorded element of notarized distributed ledger 272, such as hash value 146 of element 140). Executed block generation engine 138 may package digital signature 420 and hash value 422 into corresponding portions of additional element 414, e.g., in conjunction with the portions of notarization data 416 and temporal data 418. Notary system 132 may perform operations, established through a distributed consensus among additional ones of notary systems 130, that generate and assign an index 424 to additional element 414, that incorporate index 424 within a corresponding portion of additional element 414.

Notary system 132 may also broadcast notarized distributed ledger 426, which represents the latest, longest version of the immutable, cryptographically secure, notarized distributed ledger, across network 102 to the additional ones of notary systems 130 operating within environment 100. In some instances, notarized distributed ledger 426 of FIG. 4A establish an immutable, time-evolving, and auditable record of not only the elements of reference data (e.g., as maintained within reference data store 112) that are replicated to other computing systems and devices operating within environment 100, but also subsequent, notarized modifications, updated, or additions to each of these elements of reference data.

Figure 4B:
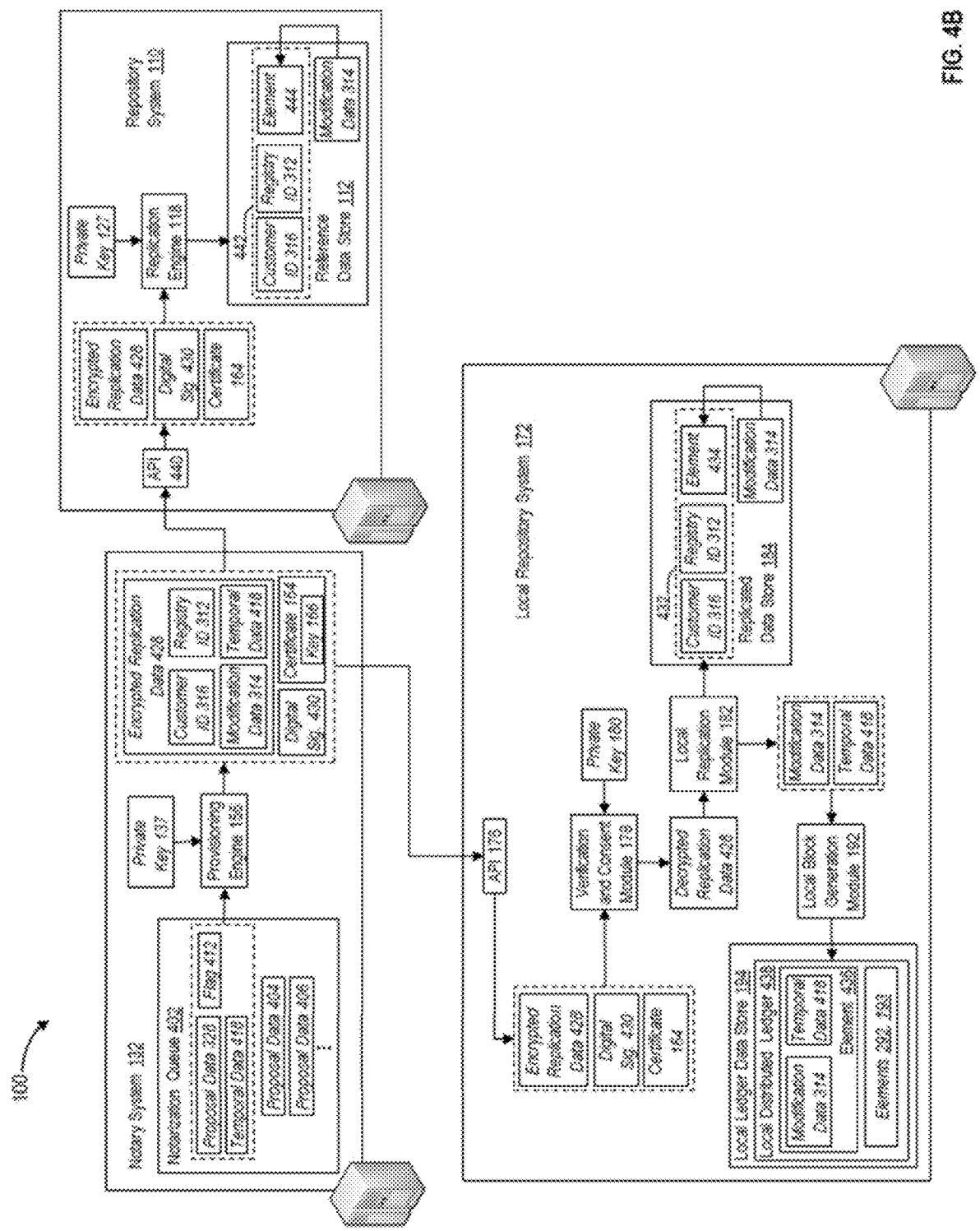

Referring to FIG. 4B, executed provisioning engine 156 (and additionally, or alternatively, similar provisioning engines executed by other ones of notary systems 130) may perform operations that access notarization queue 402, and determine that proposal data 328 is associated with notarization flag 412, which indicates of the notarization of the requested addition of the updated phone number to the do-not-call registry and confirms the recordation of data characterizing the notarized addition within notarized distributed ledger 426. In some instances, executed provisioning engine 156 may perform operations that extract proposal data 328 and temporal data 418 (e.g., that specifies the time or date associated with the approval of the addition and/or the generation of additional element 414) from notarization queue 402, and that generate replication data 428 that includes all, or a selected portion, of proposal data 328 and temporal data 418.

For example, executed provisioning engine 156 may obtain, from proposal data 328, modification data 314 that specifies the now-notarized addition to the do-not-call registry (e.g., the updated phone number of user 201, "555987654") and one or more of customer identifier 316 that identifies user 201 within the data records of reference data store 112 and replicated data store 184, registry identifier 312 associated with the do-not-call registry within reference data store 112 and replicated data store 184, and system identifier 332 that identifies local repository system 172 or executed SaaS application 174. In some instances, executed provisioning engine 156 may package registry identifier 312, modification data 314, and customer identifier 316 into corresponding portions of replication data 428, along with temporal data 418, Further, executed provisioning engine 156 may also perform any of the exemplary processes described herein to generate and apply a digital signature 430 to replication data 428 using private cryptographic key 137 associated with notary system 132 and other of notary systems 130. Executed provisioning engine 156 also perform operations that cause notary system 132 to broadcast replication data 428, applied digital signature 430, and public key certificate 164 associated with notary system 132 (which includes public cryptographic key 166) across network 102 to local repository system 172 that executes SaaS application 174 (e.g., that requested the now-notarized addition) and to repository system 110 (e.g., that operates as a computing system of record and maintains reference data store 112).

In some instances, and prior to transmission across network 102 to local repository system 172, executed provisioning engine 156 may encrypt replication data 428, applied digital signature 430, and/or public key certificate 164 using public cryptographic key 160 associated with SaaS application 174 executed at local repository system 172. Additionally, and prior to transmission across network 102 to repository system 110, executed provisioning engine 156 may also encrypt replication data 428, applied digital signature 430, and/or public key certificate 164 using a public cryptographic key associated with the repository system 110, such as public cryptographic key 129A.

Further, although not illustrated in FIG. 4B, and upon completion of the exemplary provisioning processes described herein, executed provisioning engine 156 may generate one or more elements of data, such as a provisioning flag, indicative a successful provisioning of replication data 428 to local computing system 172. Executed provisioning engine 156 may provide the provisioning flag as an input to executed block generation engine 138, along with all, or a selected portion, of replication data 428, and executed block generation engine 138 may perform any of the exemplary, consensus-based processes described herein to generate an additional element of notarized distributed ledger 426 that confirms the successful provisioning of replication data 428 to local computing system 172, and to append that generated additional element to notarized distributed ledger 426 and generate a latest, longest version of notarized distributed ledger 426.

Referring back to FIG. 4B, a programmatic interface established and maintained by local repository system 172, such as API 176 associated with executed SaaS application 174, may receive replication data 428, digital signature 430, and public key certificate 164 (which includes corresponding public cryptographic key 166), and may route updated replication data 428, digital signature 430, and public key certificate 164 to verification and consent module 178 of executed SaaS application 174. As described herein, all, or a selected portion, of replication data 428, digital signature 430, and public key certificate 164 may be encrypted, and executed verification and consent module 178 may perform operations (not illustrated in FIG. 4B) that decrypt the encrypted portions of replication data 428, digital signature 430, and public key certificate 164 using a private cryptographic key associated with SaaS application 174, such as private cryptographic key 180.

Executed verification and consent module 178 may also perform operations that validate digital signature 430 using public cryptographic key 166, e.g., as obtained from public key certificate 164. If, for example, executed verification and consent module 178 were unable to validate digital signature 430, executed verification and consent module 178 may discard decrypted replication data 428, digital signature 430, and public key certificate 164. Alternatively, if executed verification and consent module 178 were to validate decrypted digital signature 430, executed verification and consent module 178 may provide replication data 428 as an input to executed local replication module 182. In some instances, executed local replication module 182 may perform any of the exemplary processes described herein to access replicated data store 184, identify elements of replicated reference data 186 within replicated data store 184 that are referenced by decrypted replication data 428, and modify each of the one or more elements of replicated reference data 186 in accordance with decrypted replication data 428.

For example, executed local replication module 182 may perform operations that parse replication data 428 to obtain customer identifier 316, replicated data store 184, and modification data 314, which includes the notarized addition to the portions of the do-not-call registry associated with user 201 (e.g., the updated phone number "5559876543"). Further, executed local replication module 182 may access replicated data store 184, and identify one or more data records 432 that include, or reference, registry identifier 312 and as such, include elements of reference data that establish the do-not-call registry. Executed local replication module 182 may also perform operations that parse elements of reference data within data records 432 and identify elements 434 of reference data associated with customer identifier 316, which correspond to the portion of the do-not-call registry associated with user 201.

In some instances, executed local replication module 182 may perform operations that modify the elements 434 of reference data within data records 432 to include all, or a selected portion of modification data 314 (e.g., the updated customer telephone number "5559876543"), and as such, augment the do-not-call list to include the updated number of user 201 (e.g., to implement the notarized addition to the do-not-call registry). In some instances, the exemplary operations performed by executed local replication module 182 to access replicated data store 184, and to identify or parse one or more of data records 432, may include one or more read operations on those portions of one or more the tangible, non-transitory memories associated with replicated data store 184, and the exemplary operations performed by executed local replication module 182 to include the updated phone number of user 201 within data records 432 may include one or more write operations on those portions of one or more the tangible, non-transitory memories associated with replicated data store 184.

Executed local replication module 182 may also perform operations that provide modification data 314, which includes the notarized addition to the portions of the do-not-call registry associated with user 201 (e.g., the updated phone number "5559876543" added to data records 432), and temporal data 418, which specifies which specifies a time or date associated the approval of the notarized addition and/or the generation of additional element 414, as inputs to executed local block generation module 192. In some instances, executed local block generation module 192 may perform any of the exemplary, consensus-based processes described herein to generate an additional element 436 of local distributed ledger 344 that includes modification data 314, temporal data 418, and/or information representative of the notarized addition (e.g., the updated phone number "5559876543" added to data records 432), such as a cryptographic or non-cryptographic hash value representative of the updated phone number. In some examples, additional element 436 may be representative of a modified state of the replicated reference data 186 that includes the updated phone number of user 201 within the portions of the do-not-call registry associated with user 201. Further, executed local block generation module 192 may perform any of the exemplary, consensus-based processes described herein to append additional element 436 to local distributed ledger 344, and to generate a latest, longest version of the immutable, cryptographically secure, local distributed ledger that includes additional element 436, e.g., local distributed ledger 438.

Further, in some examples, a programmatic interface established and maintained by repository system 110, such as an application programming interface (API) 440 associated with executable replication engine 118, may receive replication data 428, digital signature 430, and public key certificate 164 (which includes corresponding public cryptographic key 166), and may route updated replication data 428, digital signature 430, and public key certificate 164 to executable replication engine 118. As described herein, all, or a selected portion, of replication data 428, digital signature 430, and public key certificate 164 may be encrypted, and executable replication engine 118 may perform operations (not illustrated in FIG. 4B) that decrypt the encrypted portions of replication data 428, digital signature 430, and public key certificate 164 using a private cryptographic key associated with repository system 110 or executable replication engine 118, such as private cryptographic key 127.

Executed replication engine 118 may also perform operations that validate digital signature 430 using public cryptographic key 166, e.g., as obtained from public key certificate 164. If, for example, executed replication engine 118 were unable to validate digital signature 430, executed replication engine 118 may perform additional operations (not illustrated in FIG. 4D) that cause repository system 110 to discard decrypted replication data 428, digital signature 430, and public key certificate 164. Alternatively, if executed replication engine 118 were to validate successfully digital signature 430, executed replication engine 118 may perform any of the exemplary processes described herein to access reference data store 112, identify one or more elements of reference data identified by, or referenced within, replication data 428, and modify each of the one or more identified elements of reference data in accordance with replication data 428.

For example, executed replication engine 118 may perform operations that parse replication data 428 to obtain customer identifier 316, registry identifier 312, and modification data 314, which includes the notarized addition to the portions of the do-not-call registry associated with user 201 (e.g., the updated phone number "5559876543"). Further, executed replication engine 118 may access local reference data store 112, and identify one or more data records 442 that include, or reference, registry identifier 312 and as such, include elements of reference data that establish the do-not-call registry. Executed replication engine 118 may also perform operations that parse elements of reference data within data records 442 and identify elements 444 of reference data associated with customer identifier 316, which correspond to the portion of the do-not-call registry associated with user 201. Executed replication engine 118 may perform additional operations that modify the elements 444 of reference data to include all, or a selected portion of modification data 314 (e.g., the updated customer telephone number "5559876543"), and as such, augment the portion of the do-not-call list to include the updated phone number of user 201 (e.g., to implement the notarized addition to the do-not-call registry).

Through an application of one or more exemplary, consensus-based notarization processes described herein to the proposed addition of the updated phone number to the portion of the do-not-call registry associated with user 201 (e.g., as specified by proposal data 328 maintained within notarization queue 402), one or more of notary systems 130, including notary system 132, may approve the proposed addition to the do-not-call registry, and perform operations that record the approved addition (e.g., the updated phone number of user 101), or data representative of that proposed addition (e.g., a hash value, etc.) within an additional element of a cryptographically secure and immutable notarized distributed ledger, e.g., within element 414 of notarized distributed ledger 426. Further, and as described herein, the one or more of notary systems 130, including notary system 132, may perform additional operations that provision data identifying and characterizing the now-notarized update (e.g., replication data 428) to not only an executed application program that requested the now-notarized update (e.g., SaaS application 174 executed at local repository system 172), but also to repository system 110, which maintains reference data store 112.

The one or more of notary systems 130, including notary system 132, may apply one or more of the exemplary, consensus-based notarization processes described herein to each of the additional, or alternate, elements of pending proposal data queued within notarization queue 402, including, but not limited to, pending proposal data 404 and 406. In some examples, and based on a successful outcome of the exemplary, consensus-based notarization processes, the one or more of notary systems 130, including notary system 132, may provision replication data identifying and characterizing a notarized modification, update, or additional to reference data store 112 associated with one or more of the elements of pending proposal data across network 102 to repository system 110 (e.g., for inclusion within reference data store 112) and additionally, or alternatively, to local repository system 172 (e.g., for inclusion within replication data store 184). In some instances, the one or more of notary systems 130, including notary system 132, may provision the replication data associated with each of the queued elements of pending proposal data on a streaming, element-by-element basis. In additional, or alternate, instances, the one or more of notary systems 130, including notary system 132, may perform operations that provision the replication data associated with each of the queued elements of pending proposal data on a batch basis (e.g., at predetermined temporal intervals or in accordance with a predetermined temporal schedule), which may reduce traffic across network 102 and reduce an exposure of confidential data to potential attack or unauthorized access by malicious third parties.

Certain of these exemplary, consensus-based notarization processes may constrain an ability of multiple parties to simultaneously (or near simultaneously) propose updates to the elements of reference data maintained by a system of record, reference data store 112 of repository system 110. Further, one or more of these exemplary consensus-based notarization processes, when implemented by one or more of notary systems 130 in conjunction with repository system 110 and local repository system 172, may establish and maintain a notarized distributed ledger that provides a cryptographically secure, immutable, and auditable record of not only each modification proposed by repository system 110 or local repository system 172 to the elements of reference data maintained within reference data store 112, but also of an outcome of the consensus-based, notarization processing applied to each of the proposed modifications, and, of a provisioning of replication characterizing notarized ones of the proposed modifications, updates, or additions to one or more computing systems operating within environment 100, including, but not limited to, repository system 110 and local repository system 172.

Further, and through an implementation of certain of the exemplary processes described herein, repository system 110 and local repository system 172 may establish and verify a consent and/or approval of a customer to a requested modification, to the elements of reference data maintained within reference data store 112 or replicated within replicated data store 184. For example, and as described herein, one or more application programs executed at a device operable by the customer (e.g., mobile banking application 204 or mobile SaaS application 302 executed by the one or more processors of client device 202) may perform operations that, based on a successful authentication of the user 201, apply a customer-specific digital signature to information characterizing a requested modification, update, or addition to the elements of reference data maintained within reference data store 112 (e.g., digital signature 222 applied to request 220 by executed mobile banking application 204) or replicated within replicated data store 184 (e.g., digital signature 320 applied to request 318 by executed mobile SaaS application 302).

As described herein, the application of digital signatures 222 and 320 to respective ones of requests 220 and 318 may be indicative of a consent, granted by user 201, to the requested modification, update, or addition to the elements of reference data maintained within reference data store 112 or replicated within replicated data store 184, and further, of an ownership by user 201 of the underlying elements of reference data subject to modification (e.g., that user 201 is permitted to request the modification, update, or addition). Based on a validation of applied digital signatures 222 and 320, respective ones of repository system 110 and local repository system 172 may perform any of the exemplary processes described herein to establish and verify the consent granted by user 201 to the requested modification to the elements of reference data. Responsive to the verification of the granted consent, and based on a determination that the requested modification, update, or addition comports with one or more modification requirements or guidelines (e.g., a determination by executed SaaS application 174 to establish that replicated reference data 186 corresponds to, or remains, a current snapshot of the elements of reference data maintained at repository system 110 within reference data store 112), respective ones of repository system 110 and local repository system 172 may perform operations that apply an additional, system-specific digital signature to corresponding ones of the requests and her applied customer-specific digital signature (e.g., digital signature 250 applied to request 220 and digital signature 222 by repository system 110, or digital signature 334 applied to request 318 and digital signature 320 by local repository system 172).

In some instances, the application of the system-specific digital signatures to both the information characterizing the requested modification to the elements of reference data and the corresponding customer-specific digital signature may be indicative of a consent, by a corresponding one of repository system 110 and local repository system 172, to the modification to the elements of reference data requested by the corresponding customer, e.g., user 201. Further, and as described herein, one or more of notary systems 130, such as notary system 132, may receive the information characterizing the requested modification, update, or addition, and the corresponding customer- and system-specific digital signatures from a corresponding one of repository system 110 and local repository system 172, and using any of the exemplary processes described herein, may validate each of the customer- and system-specific digital signatures prior to initiating the exemplary notarization processing described herein. Based on a successful validation of both the customer- and system-specific digital signatures, the one or more of notary systems 130, including notary system 132, may verify not only an integrity of the received information characterizing the requested modification, update, or addition, but also that the requested modification represents, and is associated with, a valid request approved by user 201 (e.g., the customer) and a respective one of repository system 110 and local repository system 172, and that user 201 possesses ownership sufficient to request the modification, update, or addition to the underlying elements of reference data.

As described herein, repository system 110 may maintain, within reference data store 112, elements of reference data identifying and characterizing customers of a financial institution and interactions between these customers and the financial institution. Further, notary systems 130 may perform any of the exemplary consensus-based notarization processes described herein to establish and maintain a notarized distributed ledger that provides a cryptographically secure, immutable, and auditable record of each notarized modification, update, or addition to the elements of reference data maintained within reference data store 112 on behalf of the financial institution. In some examples, as described herein, reference data store 112 may represent the sole repository for reference data associated with the financial institution and its customers, and the notarized distributed ledger established and maintained by notary systems 130 may represent the sole, auditable record of the notarized modifications, updated or additions to the reference data.

In other examples, and consistent with the disclosed exemplary embodiments, environment 100 may include one or more additional repository systems, each of which maintain elements of reference data within corresponding reference data stores. Further, each of the additional repository systems may also be associated with a corresponding set of notary systems operating within environment 100, which may perform any of the exemplary, consensus-based notarization processes described herein to establish and maintain an additional notarized distributed ledger that records notarized modifications, updates or additions to the reference data maintained at that additional or alternate repository system. For example, the financial institution may include a plurality of discrete business units, and due to certain imposed regulatory or privacy policies, each of the business units may be associated with a corresponding repository system maintaining elements of reference data within a corresponding, business-unit-specific reference data store, and corresponding notary systems that establish and maintain a business-unit-specific notarized distributed ledger that records notarized modifications, updates or additions to business-unit-specific reference data store.

As described herein, executed mobile banking application 204 may perform any of the exemplary processes described herein to generate a request to modify, update, or add to the elements of reference data maintained on behalf of user 201 by the financial institution (e.g., request 220) and to apply a customer-specific digital signature to that request (e.g., digital signature 222) indicative of a consent of user 201 to the requested modification, update, or addition and an ownership of the impacted element of reference data. In some examples, executed mobile banking application 204 may perform operations that cause client device 202 to transmit the generated request and the applied, customer-specific digital signature, among other things, to repository system 110, which may perform any of the exemplary processes described herein to verify the customer-specific digital signature and as such, the consent and ownership of user 201, to approve of and consent to the requested modification, to broadcast the request, the customer-specific digital signature, and an applied system-specific digital signature indicative of the consent of repository system 110 across network 102 to notary systems 130 for notarization and recordation within the corresponding notarized distributed ledger, as described herein.

In other examples, executed mobile banking application 204 may also perform operations that cause client device 202 to broadcast, across network 102, the generated request and the applied, customer-specific digital signature, among other things, to each of the additional repository systems associated with the discrete business units of the financial institution. Each of these additional repository systems may perform any of the exemplary processes described herein (e.g., with respect to repository system 110) to verify the customer-specific digital signature and as such, the consent and ownership of user 201, to approve of and consent to the requested modification, to implement the requested modification, update, or addition within the elements of reference data maintained within the corresponding, business-unit-specific reference data store, and to broadcast the request, the customer-specific digital signature, and an applied system-specific digital signature indicative of the consent of repository system 110 across network 102 to corresponding, business-unit-specific notary systems. The notary systems associated with each of the business units may also perform any of the exemplary, consensus-based notarization processes described herein (e.g., in reference to notary system 132) to validate the customer- and system-specific digital signatures, to notarize the requested modification, and to record that notarized modification within a corresponding element of the business-unit-specific notarized distributed ledger.

Further, in some examples, one or more of notary systems 130, such as notary system 132, may perform processes that apply an additional digital signature to portions of notarization data characterizing a notarized modification to the elements of reference data maintained within reference data store 112, and to broadcast the notarization data and the additional applied digital signature across network 102 to each of the additional business-unit-specific repository systems, or to each of the additional, business-unit-specific notary systems. The additional, applied digital signature may be indicative of the approval of the notarization of the modification, update, or addition to the elements of reference data, and the notarization data may include the customer- and system-specific digital signatures indicative of the consent and ownership of the underlying customer (e.g., user 201) and the consent of repository system 110. In some instances, the business-unit-specific repository systems and/or the business-unit-specific notary systems may validate the customer-specific, system-specific, and additional applied digital signature to verify the consent and ownership of user 101, the consent of repository system 110, and the approval and notarization of the requested modification, update, or addition by notary systems 130. Further, and based on a successful outcome of these validation and verification processes, the business-unit-specific repository systems and notary systems may perform any of the exemplary processes described herein, individually or collectively, to implement the requested modification within the elements of reference data maintained within the corresponding, business-unit-specific reference data store, and to notarize and record the modification within a corresponding element of the business-unit-specific notarized distributed ledger.

Figure 5C:
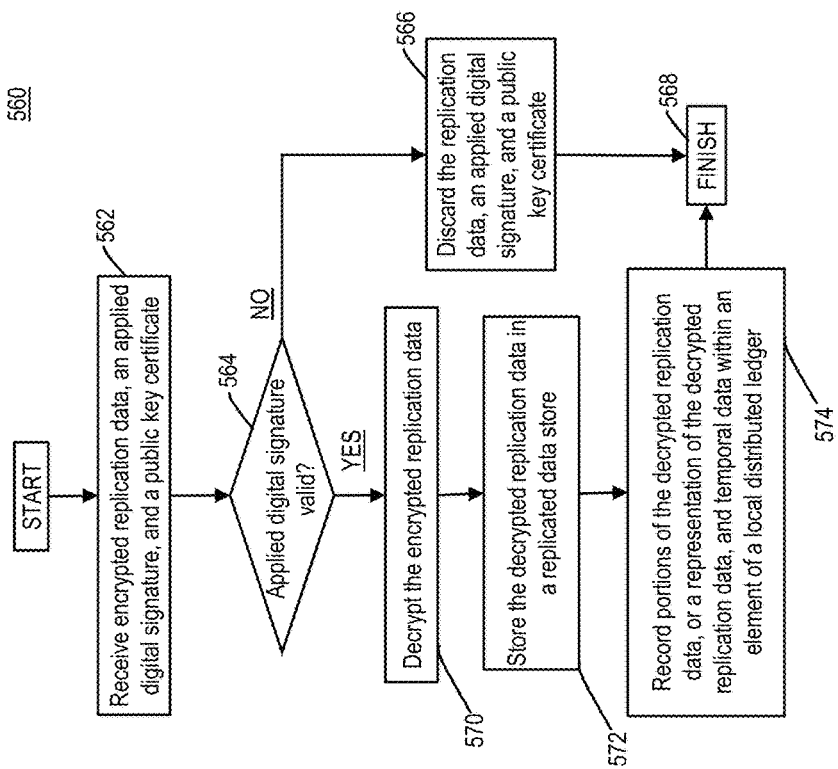

FIGS. 5A, 5B, and 5C are flowcharts of exemplary processes for replicating elements of reference data using notarized distributed ledgers, in accordance with the disclosed embodiments. For example, the computing system of record associated with a reference data store that maintains the elements of reference data, such repository system 110 that maintains reference data store 112, may perform one or more of the exemplary steps of exemplary process 500, as described below in reference to FIG. 5A. Further, one or more computing systems configured to perform consensus-based operations that establish, maintain, and broadcast a notary distributed ledger, such as notary system 132, may perform one or more of the exemplary steps of process 520, as described below in reference to FIG. 5B. Additionally, in some examples, a computing system that maintains locally replicated elements of reference data within a replicated data store, such as local repository system 172, may perform one or more of the exemplary steps of process 560, as described below in reference to FIG. 5C.

Referring to FIG. 5A, repository system 110 may perform any of the exemplary processes described herein to detect an occurrence of an event (e.g., a "replication" event) that triggers a replication of all, or a subset, of the elements of reference data elements and corresponding customer identifiers maintained within reference data store 112 (e.g., in step 502 of FIG. 5A). In response to the detected occurrence of the replication event, repository system 110 may perform any of the exemplary processes described herein to parse reference data store 112 and generate elements of status data 120 representative of a composition of reference data store 112 during a particular temporal interval (e.g., in step 504 of FIG. 5A). For example, and as described herein, the status data may be representative of a "snapshot" of the composition of reference data store 112 during a current temporal interval (e.g., a current snapshot), and the elements of status data may include all, or a selected portion of the elements of reference data and associated customer identifiers maintained within reference data store 112. Additionally, or alternatively, the elements of status data may include a hash value representative of all, or a selected portion, of the reference data elements and associated customer identifiers maintained within reference data store 112, which may be computed by repository system 110 through an application of a cryptographic or non-cryptographic hash function to all, or the selected portion, of the reference data elements and associated customer identifiers.

In some examples, executed replication engine 118 may perform additional operations that generate a replication request that includes, but is not limited to, the elements of status data, temporal data that specifies a date or time characterizing the current snapshot of reference data store 112 represented by the elements of status data, and one or more unique identifiers of repository system 110 and/or an application program executed by repository system 110 (e.g., in step 506 of FIG. 5A). Further, in some instances, repository system 110 may also perform operations that encrypt all or a portion of the replication request 122 using, for example, a public cryptographic key associated with one or more of the network-connected computing systems operating within environment 100 (e.g., a public cryptographic key associated with one or more of notary systems 130, including notary system 132).

Repository system 110 may also perform any of the exemplary processes described herein to generate and apply a digital signature to the replication request (e.g., in encrypted or unencrypted form) using a corresponding private cryptographic key (e.g., in step 508 of FIG. 5A). In some instances, repository system 110 may perform operations that broadcast the replication request (e.g., in encrypted or unencrypted form), the applied digital signature, and a public key certificate (which includes a corresponding public cryptographic key) across network 102 to one or more of notary systems 130, including notary system 132 (e.g., in step 510 of FIG. 5A). Exemplary process 500 is then complete in step 512 of FIG. 5A.

Referring to FIG. 5B, the one or more of notary systems 130, including notary system 132, may receive the replication request (e.g., in encrypted or unencrypted form), the applied digital signature, and the public key certificate (e.g., in step 522 of FIG. 5B). In some instances, notary system 132 (and additional, or alternate, ones of notary systems 130) may perform any of the exemplary processes described herein to validate the applied digital signature using the public cryptographic key maintained within the public key certificate (e.g., in step 524 of FIG. 5B). As described herein, and based on a successful validation of the applied digital signature in step 524, notary system 132 (and additional, or alternate, ones of notary systems 130) may authenticate an identity of repository system 110 (or the application program(s) executed at repository system 110), and further, establish an integrity of the data maintained within the replication request. Further, a successful validation of the applied digital signature in step 524 may be indicative of an approval, or a consent, of repository system 110 to the replication of the current snapshot of the composition of reference data store 112, e.g., using any of the exemplary, consensus-based processes described herein.

If, for example, notary system 132 (and additional, or alternate, ones of notary systems 130) were unable to validate the applied digital signature (e.g., in step 524; NO), notary system 132 (and additional, or alternate, ones of notary systems 130) may decline to approve or notarize the requested replication of the elements of reference data maintained within reference data store 112 (e.g., in step 526 of FIG. 5B). Further, notary system 132 (and additional or alternate ones of notary systems 130) may generate and transmit an error message characterizing the failed validation across network 102 to repository system 110, and may discard the replication request, the applied digital signature, and the public key certificate (e.g., in step 528 of FIG. 5B). Exemplary process 520 is then complete in step 530.

Alternatively, if notary system 132 (and additional, or alternate, ones of notary systems 130) were to validate successfully the applied digital signature (e.g., in step 524; YES), notary system 132 (and additional, or alternate, ones of notary systems 130) may approve the requested replication of the elements of reference data maintained within reference data store 112, and may store the replication request, the applied digital signature, and the public key certificate within a portion one or more tangible, non-tangible memories (e.g., in step 532 of FIG. 5B). As described herein, all or a selected portion of the replication request may be encrypted (e.g., using the public cryptographic key associated with the one or more of notary systems 130), and in step 532, notary system 132 (and additional, or alternate, ones of notary systems 130) may perform any of the exemplary processes described herein to decrypt the encrypted portions of the replication request using a private cryptographic key associated with notary systems 130, and store the now-decrypted portions of the replication request within the one or more tangible, non-transitory memories (e.g., also in step 532 of FIG. 5B).

In some instances, notary system 132 (and additional, or alternate, ones of notary systems 130) may perform any of the exemplary, consensus-based processes described herein to generate an element of a notarized distributed ledger (e.g., a ledger block) that includes or records all, or a selected portion, of the now-approved replication request, and to generate a latest, longest version of that notarized distributed ledger that includes the generated element and as such, that reflects the current composition of reference data store 112 maintained at repository system 110 (e.g., in step 534 of FIG. 5B). By recording the now-approved replication request within the generated element of the latest, longest version of the notarized distributed ledger (e.g., in step 534), notary system 132 (and additional, or alternate, ones of notary systems 130) may "notarize" the requested replication of the elements of reference data maintained within reference data store 112, and may perform any of the exemplary processes described herein to provision portions of the now-approved replication request, which establishes the current "snapshot" of reference data store 112, to one or more additional computing systems operating within environment 100 permitted to operate on the elements of reference data maintained within reference data store 112, such as, but not limited to local repository system 172 (e.g., in steps 536, 538, and 540 of FIG. 5B).

For example, notary system 132 (and additional, or alternate, ones of notary systems 130) may perform any of the exemplary processes described herein to generate replication data that includes all, or a selected portion, of the now-approved replication request (e.g., in step 536 of FIG. 5B), and to generate and apply a digital signature to the replication data (in encrypted, or unencrypted, form) using the private cryptographic key associated with notary systems 130 (e.g., in step 538 of FIG. 5B). In some examples, notary system 132 (and additional, or alternate, ones of notary systems 130) may broadcast the replication data (in encrypted or unencrypted form), the applied digital signature, and a public key certificate associated with notary systems 130 (which includes a corresponding public cryptographic key) across network 102 to the one or more additional computing systems permitted by repository system 110 to operate on the elements of reference data maintained within reference data store 112, such as local repository system 172 (e.g., in step 540 of FIG. 5B). Exemplary process 520 is then complete in step 542.

Referring to FIG. 5C, local repository system 172 may receive the replication data (in encrypted or unencrypted form), the applied digital signature, and the public key certificate broadcast by one or more of notary systems 130 (e.g., in step 562 of FIG. 5C). In some instances, local repository system 172 may perform any of the exemplary processes described herein to validate the applied digital signature using the public cryptographic key maintained within the public key certificate (e.g., in step 564 of FIG. 5C). If, for example, local repository system 172 were unable to validate the applied digital signature (e.g., step 564; NO), local repository system 172 may perform operations that cause local repository system 172 to discard the replication data, the applied digital signature, and the public key certificate (e.g., in step 566 of FIG. 5C). Exemplary process 560 is then complete in step 568 of FIG. 5C.

Alternatively, and based on the successful validation of the digital signature (e.g., step 564; YES), local repository system 172 may verify the integrity of the replication data and may establish that notary system 132 (or the additional, or alternate, ones of notary systems 130) represents a valid, trusted source for the replication data, and may perform any of the exemplary processes described herein to decrypt the replication data using a private cryptographic key associated with local repository system 172 (e.g., in step 570 of FIG. 5C). In some examples, local repository system 172 may perform any of the exemplary processes described herein to that store the decrypted replication data within a portion of a local replicated data store (e.g., in step 572 of FIG. 5C).

As described herein, the decrypted replication data may include the elements of status data (e.g., which includes all, or a selected portion, of the reference data elements and associated customer identifiers maintained within reference data store 112 of repository system 110), the temporal data (e.g., which specifies the particular data and time characterizing the current snapshot of reference data store), and one or more unique identifiers associated with repository system 110. In some instances, and in step 572 of FIG. 5C, local repository system 172 may perform any of the exemplary processes described herein to store the reference data element and the associated customer identifiers (e.g., as replicated reference data) within corresponding portions of the local replicated data store in conjunction with the temporal data.

Further, as illustrated in FIG. 5C, local repository system 172 may also perform any of the exemplary processes described herein to record all, or a selected portion, of the replicated reference data, or a representation of the portions of the replicated reference data (e.g., a cryptographic or non-cryptographic hash value), and the temporal data within an element of a latest, longest version of a local distributed ledger (e.g., in step 574 of FIG. 5C). Local repository system 172 may store locally the latest, longest version of local distributed ledger within one or more tangible, non-transitory memories, and in some instances, may broadcast the latest, longest version of the local distributed ledger across network 102 to one or more additional computing systems operating within environment 100. Exemplary process 560 is then complete in step 568.

Figure 6A:
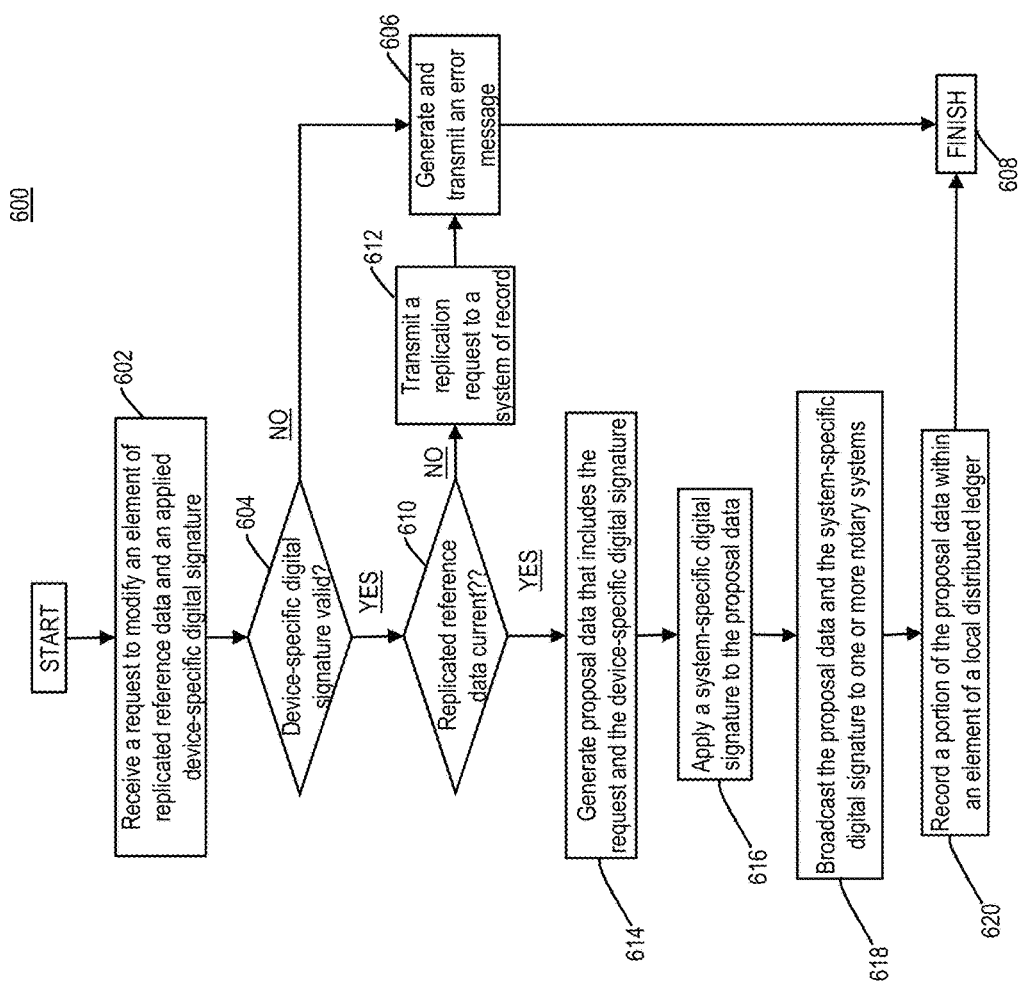
FIGS. 6A, 6B, and 6C are flowcharts of exemplary processes for notarizing a requested modification to elements of reference data, in accordance with some exemplary embodiments.
Figure 6B:
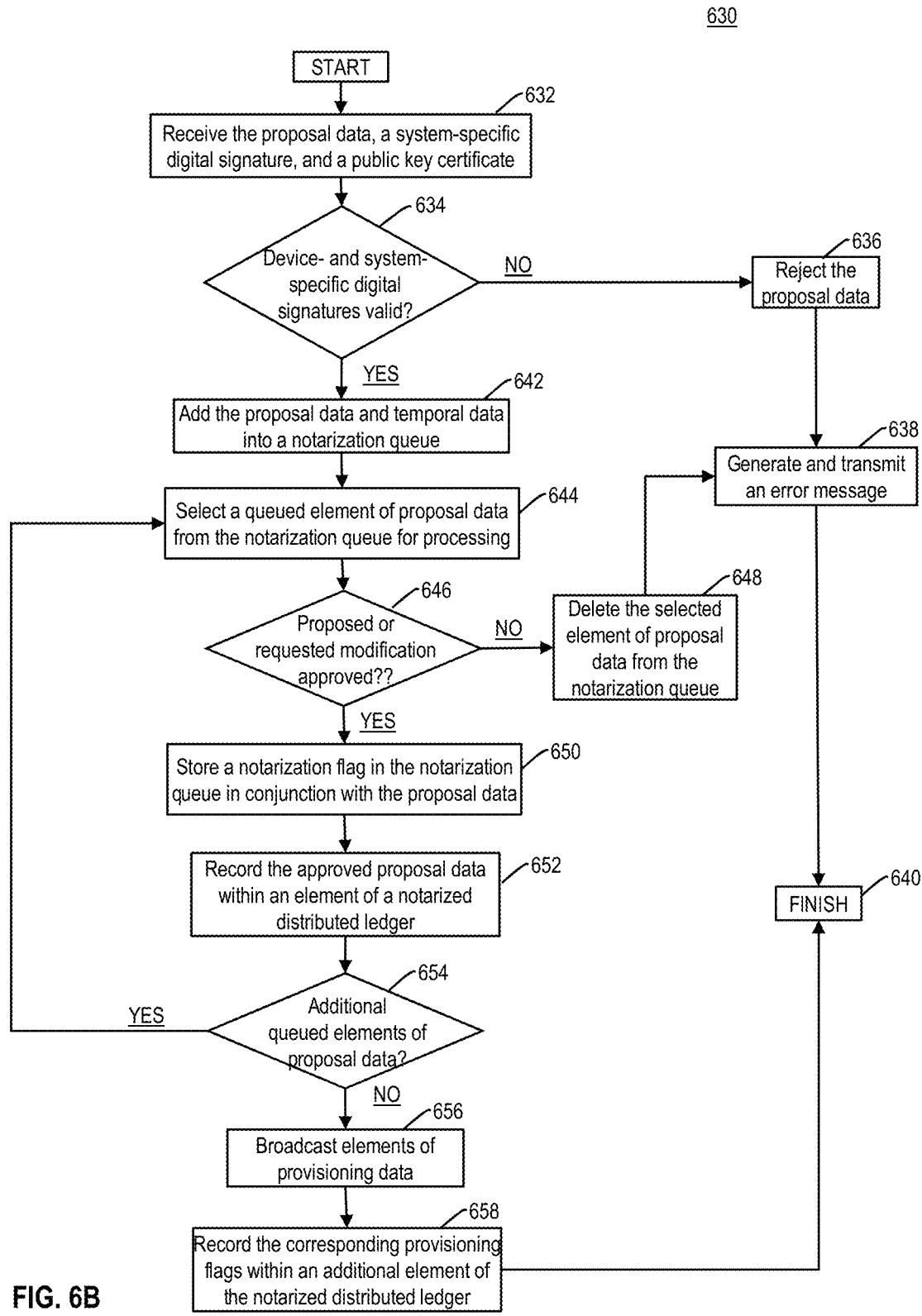
Figure 6C:
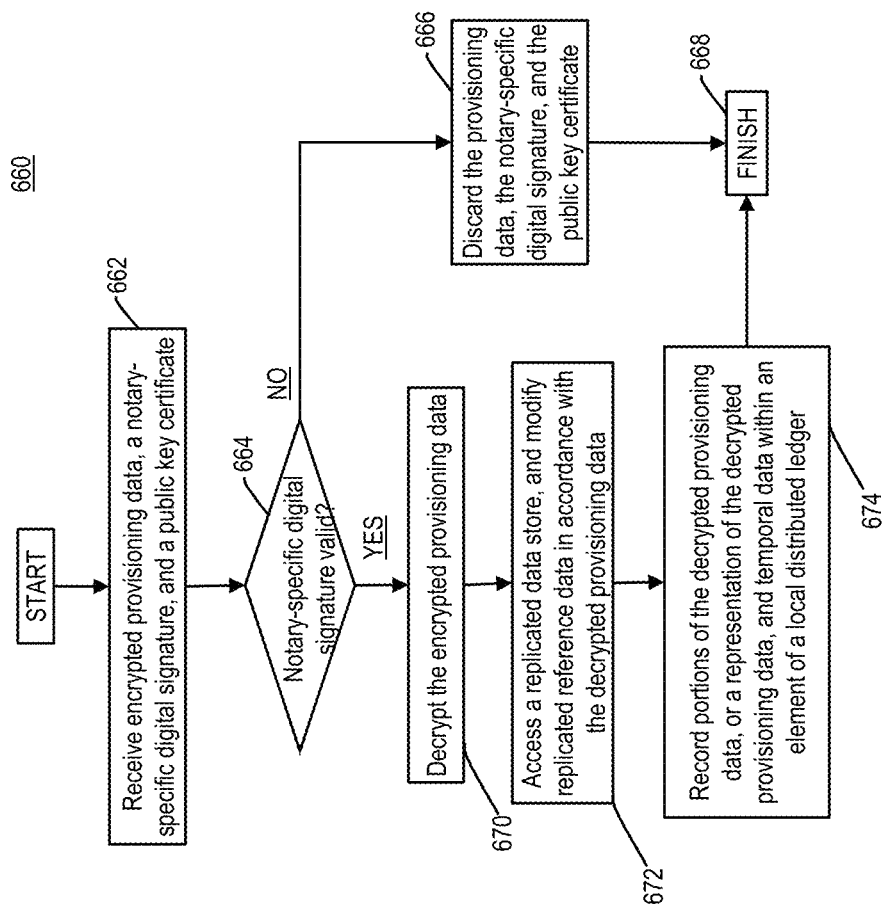

FIGS. 6A, 6B, and 6C are flowcharts of exemplary processes for notarizing a requested modification to elements of reference data maintained at a computing system of record, or replicated locally at one or more additional computing systems, using notarized distributed ledgers, in accordance with the disclosed embodiments. For example, a computing system that maintains locally replicated elements of reference data within a corresponding replicated data store, such as local repository system 172, may perform one or more of the exemplary steps of process 600, as described below in reference to FIG. 6A. Further, one or more computing systems configured to perform consensus-based operations that establish, maintain, and broadcast a notary distributed ledger, such as notary system 132, may perform one or more of the exemplary steps of process 630, as described below in reference to FIG. 6B. Additionally, in some examples, a computing system that maintains the locally replicated reference data within the replicated data store, such as local repository system 172, may perform one or more of the exemplary steps of process 660, as described below in reference to FIG. 6C.

Referring to FIG. 6A, local repository system 172 (or repository system 110) may receive, from client device 202, a request to modify the locally replicated elements of reference data within the corresponding replicated data store, an applied, customer-specific digital signature, and a public key certificate associated with client device 202 (e.g., in step 602).

In some examples, the received request may include an identifier of a customer associated with client device 202 (e.g., a login credential of user 201, etc.) and an identifier associated with client device 202 (e.g., an IP or MAC address, an application cryptogram associated with mobile SaaS application 302, etc.). The received request may also include, but is not limited to, modification data that characterizes the requested modification (e.g., the updated phone number of user 201, registry identifier 312 of the do-not-call list, etc.), and additional data that identifies a data type, characteristic, or operation associated with the requested modification (e.g., data type 330, etc.). In some instances, as described herein, all or a portion of the received request, the applied digital signature, and the public key certificate may be encrypted by client device 202 (e.g., using a public cryptographic key associated with local repository system 172), and local repository system 172 may perform operations that decrypt the encrypted portions of the received request, the applied digital signature, and the public key certificate using a corresponding private cryptographic key.

Referring back to FIG. 6A, local repository system 172 may perform any of the exemplary processes described herein to validate the customer-specific digital signature using a public cryptographic key obtained from the received public key certificate (e.g., in step 604 of FIG. 6A). Based on the failed validation of the customer-specific digital signature (e.g., step 604; NO), local repository system 172 may perform operations that generate and transmit an error message characterizing the failed validation across network 102 to client device 202, and may discard the received request, the applied digital signature, and the public key certificate (e.g., in step 606 of FIG. 6A). Exemplary process 600 is then complete in step 608.

Alternatively, if local repository system 172 were to validate successfully the customer-specific digital signature (e.g., step 604; YES), local repository system 172 may not only authenticate the identity of client device 202 (or executed mobile SaaS application 302) and establish the integrity of the data maintained within the received request, but also confirm a consent of user 201 and executed mobile SaaS application 302 to the requested modification. In some instances, local repository system 172 may perform any of the exemplary processes described herein to establish whether the one or more elements of replicated reference data (e.g., as maintained within the replicate data store) reflect a current composition of reference data store 112 and as such, represent a current snapshot of the elements of reference data maintained within reference data store 112 (e.g., in step 610).

For example, and as described herein, the one or more elements of locally replicated reference data may be maintained within the replicated data store in conjunction with temporal data, which may specify a time or date at which notary systems 130 provisioned the one or more elements of replicated reference data using any of the exemplary processes described herein. In some instances, in step 610, local repository system 172 may obtain the temporal data from the replicated data store, determine a temporal interval between a current time or date and the corresponding time or date specified within obtained temporal data, and establish that the one or more elements of replicated reference data reflect the current composition of reference data store 112 (and as such, represent the current snapshot of reference data store 112) when the determined temporal interval fails to exceed a threshold time period.

If local repository system 172 were to establish that the one or more elements of replicated reference data fail to reflect a current composition of reference data store 112 (e.g., step 610; NO), local repository system 172 may perform operations that generate and transmit a replication request across network 102 to repository system 110 (e.g., in step 612). In some instances, the receipt of the replication request by repository system 110 may correspond to an occurrence of a replication event that, as described herein, causes repository system 110 to perform any of the exemplary processes described herein to initiate a replication of the elements of reference data maintained within reference data store 112. As illustrated in FIG. 6A, exemplary process 600 may pass back to step 606, and local repository system 172 may generate and transmit an error message across network 102 to client device 202, and may discard the received request, the applied digital signature, and the public key certificate. Exemplary process 600 is then complete in step 608.

Alternatively, if local repository system 172 were to establish that the one or more elements of replicated reference data reflect the current composition of reference data store 112 (e.g., step 610; YES), local repository system 172 may perform any of the exemplary processes described herein to generate proposal data that identifies and characterizes the requested modification to the elements of replicated reference data (e.g., in step 614 of FIG. 6A). In some instances, the generated proposal data may include all, or a selected portion, of the received request (e.g., the identifiers of the customer and of client device 202, the modification data, the additional data that identifies the data type, characteristic, or operations associated with the requested modification, etc.) and the device-specific digital signature.

Further, in some examples, local repository system 172 may perform any of the exemplary processes described herein to generate and apply a system-specific digital signature to the proposal data using a private cryptographic key associated with local repository system 172 (e.g., in step 616 of FIG. 6A). Local repository system 172 may also perform operations that broadcast the proposal data, system-specific digital signature 334, and a public key certificate associated with local repository system 172 (e.g., that includes a corresponding public cryptographic key) across network 102 to one or more of notary systems 130, including notary system 132 (e.g., in step 618). Further, in some instances (not illustrated in FIG. 6A), local repository system 172 may also encrypt the proposal data, the system-specific digital signature, and/or public key certificate 336 using a public cryptographic key associated with one or more of notary systems 130, e.g., prior to transmission by local repository system 172.

Further, local repository system 172 may also perform any of the exemplary processes described herein to record all, or a selected portion, of the received request, or a representation of the portions of the received request (e.g., a cryptographic or non-cryptographic hash value), and temporal data characterizing a time or date of a receipt of the request by local repository system 172 within an element of a latest, longest version of a local distributed ledger (e.g., in step 618 of FIG. 6A). Local repository system 172 may store locally the latest, longest version of local distributed ledger within one or more tangible, non-transitory memories. Exemplary process 600 is then complete in step 608.

Referring to FIG. 6B, one or more of notary systems 130, including notary system 132, may receive the proposal data (e.g., in encrypted or unencrypted form), the system-specific digital signature, and the public key certificate associated with local repository system 172 (e.g., in step 632 of FIG. 6B). In some examples, not illustrated in FIG. 6B, notary system 132 (and additional, or alternate, ones of notary systems 130) may decrypt the encrypted portions of the proposal data, the system-specific digital signature, and the public key certificate using a corresponding private cryptographic key.

Notary system 132 (and additional, or alternate, ones of notary systems 130) may perform any of the exemplary processes described herein to validate the system-specific digital signature using the public cryptographic key associated with local repository system 172, and to validate the customer-specific digital signature maintained within the proposal data using the public cryptographic key associated with client device 202 (in step 634 of FIG. 6B). As described herein, and based on a successful validation of the system-specific digital signature in step 634, notary system 132 (and additional, or alternate, ones of notary systems 130) may authenticate an identity of local repository system 172 (or the application program(s) executed at repository system 110, such as SaaS application 174), and further, establish an integrity of the received proposal data. Further, a successful validation of the each of the customer- and system-specific digital signature in step 634 may be indicative of an approval, or a consent, of not only user 201 (or mobile SaaS application executed at client device 202, but also of local repository system 172, to the requested modification of the elements of replicated reference data.

If, for example, notary system 132 (and additional, or alternate, ones of notary systems 130) were unable to validate the customer- or system-specific digital signatures (e.g., in step 634; NO), notary system 132 (and additional, or alternate, ones of notary systems 130) may decline to approve or notarize the requested modification to the elements of replicated reference data, and reject the proposal data (e.g., in step 636 of FIG. 5B). Further, notary system 132 (and additional or alternate ones of notary systems 130) may generate and transmit an error message characterizing the failed validation across network 102 to local repository system 172, and may discard the proposal data, the system-specific digital signature, and the public key certificate (e.g., in step 638 of FIG. 6B). Exemplary process 630 is then complete in step 640.

Alternatively, if notary system 132 (and additional, or alternate, ones of notary systems 130) were to validate successfully each of the customer- and system-specific digital signatures (e.g., in step 634; YES), notary system 132 (and additional, or alternate, ones of notary systems 130) may perform any of the exemplary processes described herein to add the received proposal data, along with corresponding temporal data indicate of a time or date of receipt of the proposal data, into a corresponding portion of a notarization queue (e.g., in step 642). In some instances, the queued elements of proposal data maintained within the notarization queue, including newly queued proposal data received from local repository system 172, may be prioritized, or ordered, in accordance with one or more prioritization factors, such as, but not limited to, the those described herein.

In some instances, notary system 132 (and additional, or alternate, ones of notary systems 130) may perform operations that select one of the queued elements of proposal data within the notarization queue, and extract the selected element of proposal data from the notarization queue (e.g., in step 644 of FIG. 6B). The selected elements of proposal data may, for example, represent a corresponding one of the queued elements of proposal data characterized by an initial position, and a maximum priority, within the notarization queue. Further, notary system 132 (and additional, or alternate, ones of notary systems 130) may perform any of the exemplary processes described herein to approve, or alternatively, to reject, a proposed or requested modification identified and characterized by the selected element of proposal data extracted from the notarization queue (e.g., in step 646 of FIG. 6B).

By way of example, and as described herein, notary system 132 (and additional, or alternate, ones of notary systems 130) may perform operations in step 646 that that load, from one or more tangible, non-transitory memories, a latest, longest version of the notarized distributed ledger. As described herein, the notarized distributed ledger may include one or more smart contract elements, which include or record executable code, code modules, or application programs (e.g., distributed notarization module 152) along with corresponding elements of supporting data, such as notarization criteria 154 described herein. In some instances, and using any of the exemplary processes described herein, notary system 132 (and additional, or alternate, ones of notary systems 130) may execute the code, code modules, or application programs, and the executed code, code modules, or application programs may identify one or more of the recorded notarization criteria applicable to the selected element of proposal data (e.g., criterion 408), and may apply the one or more identified notarization criteria to the selected element of proposal data (e.g., also in step 646). Based on the application of the one or more identified notarization criteria to the selected element of proposal data, notary system 132 (and additional, or alternate, ones of notary systems 130) may determine whether to approve and notarize the modification associated with selected element of proposal data or alternatively, to reject the modification (e.g., also in step 646).

If, for example, notary system 132 (and additional, or alternate, ones of notary systems 130) were to reject the modification associated with selected element of proposal data (e.g., step 646; NO), notary system 132 (and additional, or alternate, ones of notary systems 130) may delete the selected element of proposal data from the notarization queue (e.g., in step 648 of FIG. 6A), and may generate and transmit an error message across network 102 to local repository system 172 (e.g., in step 638 of FIG. 6B). Alternatively, if notary system 132 (and additional, or alternate, ones of notary systems 130) were to approve the modification associated with selected element of proposal data (e.g., step 646; YES), notary system 132 (and additional, or alternate, ones of notary systems 130) may perform any of the exemplary processes described herein to generate a notarization flag indicative of the approved modification and that store the notarization flag within the notarization queue in association with the selected element of proposal data (e.g., in step 650 of FIG. 6A). In some examples, notary system 132 (and additional, or alternate, ones of notary systems 130) may perform any of the exemplary, consensus-based processes described herein to generate an element of a notarized distributed ledger (e.g., a ledger block) that includes or records notarization data characterizing the approved modification to the replicated reference data, and to generate a latest, longest version of that notarized distributed ledger that includes the generated element (e.g., in step 652 of FIG. 6B).

For example, in step 652, notary system 132 (and additional, or alternate, ones of notary systems 130) may perform any of the exemplary, consensus-based processes described herein to access a prior version of the notarized distributed ledger (e.g., as maintained locally within the one or more tangible, non-transitory memories) and to append the generated element to that prior version to generate the latest, longest version of the notarized distributed ledger. In some instances, by recording the now-approved modification, e.g., as proposed by local repository system 172, notary system 132 (and additional, or alternate, ones of notary systems 130) may "notarize" the proposed modification to the replicated reference data, and provision data indicative of the notarized modification to not only local computing system 172 (which maintains the replicated reference data within a corresponding replicated data store), but also to repository system 110 (which maintains reference data store 112) and to additional or alternate computing systems permitted to replicate the reference data maintained within reference data store 112.

Referring back to FIG. 6B, notary system 132 (and additional, or alternate, ones of notary systems 130) may parse the notification queue to determine whether additional queued elements of proposal data require processing (e.g., in step 654 of FIG. 6B). If, for example, notary system 132 (and additional, or alternate, ones of notary systems 130)

were to determine that additional queued elements of proposal data require processing (e.g., step 654; YES), exemplary process 630 may pass back to step 644, and notary system 132 (and additional, or alternate, ones of notary systems 130) may select an additional one of the queued elements of proposal data for processing and notarization using any of exemplary processes described herein. Alternatively, if no further additional queued elements of proposal data require processing (e.g., step 654; NO), notary system 132 (and additional, or alternate, ones of notary systems 130) may perform any of the exemplary processes described herein to provision identify, within the notarization queue, each of the queued elements of proposal data associated with a corresponding notarization flag (e.g., "notarized" elements of proposal data), and to broadcast elements of provisioning data identifying and characterizing the modifications associated with each of the notarized elements of proposal data, a respective, notary-specific digital signature, and a public key certificate of notary systems 130 to local repository system 172, to repository system 110, and further, to additional, or alternate, computing systems permitted to replicate the reference data maintained within reference data store 112 (e.g., in step 656 of FIG. 6B).

As described herein, the one or more of notary systems 130, including notary system 132, may provision the digitally signed elements of provisioning data associated with each of the notarized elements of pending proposal data on a streaming, element-by-element basis. In additional, or alternate, instances, the one or more of notary systems 130, including notary system 132, may perform operations that provision the digitally signed elements of provisioning data associated with each of the notarized elements of pending proposal data on a batch basis (e.g., at predetermined temporal intervals or in accordance with a predetermined temporal schedule), which may reduce traffic across network 102 and reduce an exposure of confidential data to potential attack or unauthorized access by malicious third parties. In some examples, and prior to transmission across network 102 to the local repository system 172, repository system 110, or the one or more additional computing systems, notary system 132 (and additional, or alternate, ones of notary systems 130) may perform any of the exemplary processes described herein to encrypt each of the digitally signed elements of provisioning data using a public cryptographic key (or other encryption key) appropriate to corresponding ones of local repository system 172, repository system 110, or the one or more additional computing systems.

In some examples, notary system 132 (and additional, or alternate, ones of notary systems 130) may perform operations that generate one or more elements of data, such as a provisioning flag, indicative a successful provisioning of each of the digitally signed elements of provisioning data to the corresponding ones of local repository system 172, repository system 110, or the one or more additional computing systems, and may perform any of the exemplary consensus-based processes described herein to record the provisioning flags within one or more elements of a latest, longest version of the notarized distributed ledger (e.g., in step 658 of FIG. 6B). Exemplary process 630 is then complete in step 640.

Referring to FIG. 6C, local repository system 172 may receive an element of provisioning data (in encrypted or unencrypted form), the notary-specific digital signature, and the public key certificate broadcast by one or more of notary systems 130, such as notary system 132 (e.g., in step 662 of FIG. 6C). As described herein, the element of provisioning data may be associated with a modification to the replicated reference data previously proposed by local repository system 172 using any of the exemplary processes described herein, and the element of provisioning data may confirm an approval and a notarization of the proposed modification by the one or more of notary systems 130 using any of the exemplary processes described herein.

In some instances, local repository system 172 may perform any of the exemplary processes described herein to validate the notary-specific digital signature using the public cryptographic key maintained within the public key certificate (e.g., in step 664 of FIG. 6C). If, for example, local repository system 172 were unable to validate the applied digital signature, local repository system 172 may perform operations that cause local repository system 172 to discard the element of provisioning data (in encrypted or unencrypted form), the applied digital signature, and the public key certificate (e.g., in step 666 of FIG. 6C). Exemplary process 660 is then complete in step 668 of FIG. 6C.

Alternatively, and based on the successful validation of the notary-specific digital signature, local repository system 172 may verify the integrity of the element of provisioning data and may establish that notary system 132 (or the additional, or alternate, ones of notary systems 130) represents a valid, trusted source for the provisioning data, and may perform any of the exemplary processes described herein to decrypt the provisioning data using a private cryptographic key associated with local repository system 172 (e.g., in step 670 of FIG. 6C). In some examples, local repository system 172 may perform any of the exemplary processes described herein to access the elements of replicated reference data maintained within the replicated data store, to identify at least one of those elements impacted by the notarized modification characterized by the decrypted element of provisioning data, and to modify the at least one identified element of the replicated reference data in accordance with the notarized modification (e.g., in step 672 of FIG. 6C).

Further, as illustrated in FIG. 6C, local repository system 172 may also perform any of the exemplary processes described herein to record at least a portion of the element of provisioning data that characterizes the notarized modification to the replicated reference data, or a representation of that notarized modification (e.g., a cryptographic or non-cryptographic hash value), and temporal data specifying a time or date associated with the notarized modification, within an element of a latest, longest version of a local distributed ledger (e.g., in step 674 of FIG. 6C). Local repository system 172 may store locally the latest, longest version of local distributed ledger within one or more tangible, non-transitory memories, and in some instances, may broadcast the latest, longest version of the local distributed ledger across network 102 to one or more additional computing systems operating within environment 100. Exemplary process 660 is then complete in step 668.

c. Exemplary Computing Architectures

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including replication engine 118, SaaS application 174, application programming interfaces (APIs) 133, 176, 230, and 440, verification and consent engine 134, block generation engine 138, distributed notarization module 152, provisioning engine 156, verification and consent module 178, local replication module 182, local block generation module 192, mobile banking application 204, verification and consent engine 232, management engine 238, notarization management engine 252, mobile SaaS application 302, can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination thereof.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit (CPU). Generally, a CPU will receive instructions and data from a read-only memory or a random-access memory or both. Further, a computer may include a CPU for performing or executing instructions and one or more memory devices for storing instructions and data. In some instances, a computer will also include, or be operatively coupled to receive data from or transfer data to, or both, one or more mass storage devices for storing data, such as magnetic, magneto-optical disks, or optical disks. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the customer can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the customer; for example, by sending web pages to a web browser on a customer's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a customer can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a customer device, such as for purposes of displaying data to and receiving customer input from a customer interacting with the customer device, which acts as a client. Data generated at the customer device, such as a result of the customer interaction, can be received from the customer device at the server.

While this specification includes many specifics, these should not be construed as limitations on the scope of the exemplary embodiments or of what may be claimed, but rather as descriptions of features specific to particular embodiments of the invention. Certain features that are described in this specification in the context of separate exemplary embodiments may also be implemented in combination in a single exemplary embodiment. Conversely, various features that are described in the context of a single exemplary embodiment may also be implemented in multiple exemplary embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all exemplary embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

What is claimed is:

1. An apparatus, comprising:
  a memory storing instructions;
  a communications interface; and
  at least one processor coupled to the communications interface and the memory, the at least one processor being configured to execute the instructions to:
    receive, from a first computing system via the communications interface, a first request to modify a local replica of reference data, the local replica being maintained at the first computing system, the reference data being maintained at a second computing system, and the first request comprising first temporal data associated with the first requested modification;
    determine a first request time associated with the first request based on the first temporal data, approve the first requested modification to the local replica based on a notarization criterion maintained within an element of a distributed ledger and based on the first request time, and perform operations that record notarization data characterizing the approved modification within an additional element of the distributed ledger; and
    transmit the notarization data to the first computing system via the communications interface, the notarization data causing an application program executed by the first computing system to modify the local replica in accordance with the notarization data.

2. The apparatus of claim 1, wherein the at least one processor is further configured to execute the instructions to:
  receive, from the first computing system via the communications interface, a first digital signature applied to the first request, the first digital signature being generated by the first computing system; and
  approve the first requested modification to the local replica of the reference data based on a validation of the first digital signature, based on the notarization criterion, and based on the first request time.

3. The apparatus of claim 2, wherein:
  the first request comprises a second digital signature generated by a device in communication with the first computing system; and
  the at least one processor being configured to execute the instructions to approve the first requested modification to the local replica of the reference data based on the validation of the first digital signature, based on the validation of the second digital signature, based on the notarization criterion, and based on the first request time.

4. The apparatus of claim 1, wherein:
  the first request comprises an identifier of an element of the reference data and the first requested modification; and
  the at least one processor is further configured to execute the instructions to obtain second requests to modify the local replica of the reference data maintained at the second computing system, each of the second requests comprising second temporal data associated with a corresponding one of the second requested modifications.

5. The apparatus of claim 4, wherein the at least one processor is further configured to execute the instructions to approve the first requested modification based on a determination that each of the second requests fails to include the identifier.

6. The apparatus of claim 4, wherein:
  the notarization criterion comprises a threshold temporal interval; and
  the at least one processor is further configured to execute the instructions to:
    when at least one of the second requests includes the identifier of the element of reference data, determine (i) the first request time associated with the first request based on the first temporal data and (ii) a second request time associated with the at least one second request based on the corresponding second temporal data; and
    approve the first requested modification when a temporal difference between the first and second request times exceeds the threshold temporal interval.

7. The apparatus of claim 4, wherein:
  the notarization criterion comprises a threshold request number and a corresponding temporal interval;
  the at least one processor is further configured to execute the instructions to approve the first requested modification when at least one of:

a number of the first and second requests that include the identifier of the element of reference data fails to exceed the threshold request number during the corresponding temporal interval; or an additional number of the first and second requests that include a system identifier of the first computing system fails to exceed the threshold request number during the corresponding temporal interval.

8. The apparatus of claim 1, wherein:
the notarization criterion comprises permissioning data associated with at least one of the first computing system or the second computing system; and
the at least one processor is further configured to execute the instructions to approve the first requested modification based on the permissioning data.

9. The apparatus of claim 8, wherein the at least one processor is further configured to execute the instructions to:
receive, from the second computing system via the communications interface, a second request to modify one or more additional elements of the reference data;
approve the second requested modification based on the permissioning data, and perform operations that record additional notarization data characterizing the second requested modification within a further element of the distributed ledger; and
transmit the additional notarization data to the first computing system via the communications interface, the additional notarization data causing the application program executed by the first computing system to modify the local replica of the reference data in accordance with the additional notarization data.

10. The apparatus of claim 1, wherein:
the first request comprises a first identifier of an element of the reference data and a second identifier of the first computing system; and
the at least one processor is further configured to execute the instructions to:
load at least the element of the distributed ledger from the memory, the element of the distributed ledger comprising a plurality of candidate notarization criteria;
based on at least one of the first identifier or the second identifier, determine that a corresponding one of the candidate notarization criteria is associated with the first request; and
establish the corresponding one of the candidate notarization criteria as the notarization criterion.

11. The apparatus of claim 1, wherein:
the element of the distributed ledger comprises additional instructions; and
the at least one processor is further configured to execute the additional instructions to approve the first requested modification to the local replica of the reference data based on the notarization criterion.

12. The apparatus of claim 1, wherein the at least one processor is further configured to execute the instructions to:
receive, from the second computing system via the communications interface, a request to replicate the reference data maintained at the second computing system;
approve the replication request, and perform operations that record replication information characterizing the approved replication request within a further element of the distributed ledger; and
transmit the replication data to the first computing system via the communications interface, the replication data causing the application program executed by the first computing system to store at least a portion of the replication information within a replicated data store.

13. The apparatus of claim 1, wherein the at least one processor is further configured to execute the instructions to:
generate confirmation data indicative of the transmission of the notarization data to the first computing system; and
perform operations that record the confirmation data within a further element of the distributed ledger.

14. The apparatus of claim 1, wherein:
the notarization criterion comprises a threshold temporal interval; and
the at least one processor is further configured to execute the instructions to:
determine a second request time associated with a queued or notarized request to modify the local replica of the reference data; and
approve the first requested modification when a temporal difference between the first request time and the second request time exceeds the threshold temporal interval.

15. A computer-implemented method, comprising:
receiving, using at least one processor, a request from a first computing system to modify a local replica of reference data, the local replica being maintained at the first computing system, the reference data being maintained at a second computing system, and the request comprising temporal data associated with the requested modification;
using the at least one processor, determining a request time associated with the request based on the temporal data, approving the requested modification to the local replica of the reference data based on a notarization criterion maintained within an element of a distributed ledger and based on the request time, and perform operations that record notarization data characterizing the approved modification within an additional element of the distributed ledger; and
transmitting, using the at least one processor, the notarization data to the first computing system, the notarization data causing an application program executed by the first computing system to modify the local replica in accordance with the notarization data.

16. An apparatus, comprising:
a memory storing instructions;
a communications interface; and
at least one processor coupled to the communications interface and the memory, the at least one processor being configured to execute the instructions to:
transmit, to a first computing system via the communications interface, a request to modify an element of a local replica of reference data maintained at a second computing system, the request including temporal data associated with the requested modification, and the first computing system performing operations that determine a request time associated with the request based on the temporal data, that approve the requested modification based on a notarization criterion maintained within an element of a first distributed ledger and based on the request time, and that record notarization data characterizing the approved modification within an additional element of the first distributed ledger;
receive the notarization data from the first computing system via the communications interface; and access the local replica of the reference data, and modify a portion of the local replica of the reference data in accordance with the notarization data.

17. The apparatus of claim 16, wherein:
the second computing system is in communication with the first computing system; and
the at least one processor is further configured to receive at least a portion of the local replica of the reference data from the first computing system via the communications interface, and to store the local replica of the reference data within the memory.

18. The apparatus of claim 16, wherein the at least one processor is further configured to execute the instructions to:
receive, via the communications interface, information associated with the requested modification and a first digital signature from a device;
based on a validation of the first digital signature, perform operations that generate the request and apply a second digital signature to the request using a corresponding private cryptographic key, the generated request comprising at least a portion of the received information and the second digital signature; and
transmit the request and the second digital signature to the first computing system via the device.

19. The apparatus of claim 18, wherein the at least one processor is further configured to execute the instructions to:
load, from the memory, a replication time associated with the local replica of the reference data; and
when a temporal difference between a current time and the replication time fails to exceed a threshold temporal interval, transmit the request and the second digital signature to the first computing system via the device.

20. The apparatus of claim 16, wherein the at least one processor is further configured to execute the instructions to:
perform operations that record data characterizing the requested modification to the local replica of the reference data within an element of a second distributed ledger;
perform additional operations that record at least a portion of the notarization data within an additional element of the second distributed ledger; and
store the second distributed ledger within at a portion of the memory.

* * * * *